US006010841A

United States Patent [19]

Farid et al.

[11] Patent Number: 6,010,841

[45] **Date of Patent: *Jan. 4, 2000**

[54] SILVER HALIDE LIGHT SENSITIVE EMULSION LAYER HAVING ENHANCED PHOTOGRAPHIC SENSITIVITY

[75] Inventors: Samir Y. Farid, Rochester; Jerome R. Lenhard, Fairport; Chin H. Chen, Mendon; Annabel A. Muenter, Rochester; Ian R. Gould, Pittsford; Stephen A. Godleski, Fairport; Paul A. Zielinski, Rochester, all of N.Y.

[73] Assignee: Eastman Kodak Company, Rochester, N.Y.

[ * ] Notice: This patent is subject to a terminal disclaimer.

[21] Appl. No.: 08/739,911

[22] Filed: Oct. 30, 1996

Related U.S. Application Data

[63] Continuation-in-part of application No. 08/592,166, Jan. 26, 1996, abandoned.

[51] Int. Cl.[7] .................... G03C 1/08

[52] U.S. Cl. .................... 430/583; 430/584; 430/588; 430/595; 430/599; 430/600; 430/603; 430/607; 430/611

[58] Field of Search .................... 430/570, 583, 430/584, 588, 595, 599, 600, 611, 607, 581, 577, 572

[56] References Cited

U.S. PATENT DOCUMENTS

| | | | |
|---|---|---|---|
| 2,419,975 | 5/1947 | Trivelli et al. | 95/6 |
| 2,875,058 | 2/1959 | Carroll et al. | 96/104 |
| 2,937,089 | 5/1960 | Jones et al. | 96/100 |
| 3,457,078 | 7/1969 | Riester | 96/104 |
| 3,458,318 | 7/1969 | Brooks | 96/104 |
| 3,615,632 | 10/1971 | Shiba et al. | 96/122 |
| 3,695,888 | 10/1972 | Hiller et al. | 96/123 |
| 3,706,567 | 12/1972 | Hiller | 96/126 |
| 3,809,561 | 5/1974 | Ulbing et al. | 96/84 |
| 4,297,441 | 10/1981 | Kaneko et al. | 430/543 |
| 4,367,279 | 1/1983 | Herz et al. | 430/234 |
| 4,607,006 | 8/1986 | Hirano et al. | 430/572 |
| 4,897,343 | 1/1990 | Ikeda et al. | 430/570 |
| 4,917,997 | 4/1990 | Ikeda | 430/572 |
| 4,971,890 | 11/1990 | Okada et al. | 430/264 |
| 4,985,351 | 1/1991 | Matejec et al. | 430/598 |
| 5,059,516 | 10/1991 | Sato et al. | 430/599 |
| 5,190,855 | 3/1993 | Toya et al. | 430/599 |
| 5,192,654 | 3/1993 | Hioki et al. | 430/576 |
| 5,212,056 | 5/1993 | Beltramini | 430/572 |
| 5,213,952 | 5/1993 | Kuwashima et al. | 430/378 |
| 5,244,779 | 9/1993 | Asami et al. | 430/503 |
| 5,298,383 | 3/1994 | Mihayashi et al. | 430/557 |
| 5,306,612 | 4/1994 | Philip, Jr. et al. | 430/572 |
| 5,478,719 | 12/1995 | Hioki et al. | 430/581 |
| 5,747,236 | 5/1998 | Farid et al. | 430/583 |

FOREIGN PATENT DOCUMENTS

| | | |
|---|---|---|
| 0 554 856 A1 | 8/1993 | European Pat. Off. . |
| 0 652 470 A1 | 5/1995 | European Pat. Off. . |
| 4343622 A1 | 6/1994 | Germany . |
| 1 064 193 | 4/1967 | United Kingdom . |
| 1 255 084 | 11/1971 | United Kingdom . |

OTHER PUBLICATIONS

R. K. Ahrenkiel et a., "The Theory of the Photographic Process", 4th Edition, T. H. James Editor, pp. 265–266, Macmillan 1977.

Naoki Obi et al., "A New High Contrast System Using Pyridinium Salts", May 1994, pp. 322–325, IS&T's 47th Annual Conference/ICPS 1994.

Corwin Hansch et al., "A survey of Hammett Substituent Constants and Resonance and Field Parameters", American Chem. Society, 1991, pp. 165–196.

*Primary Examiner*—Thorl Chea
*Attorney, Agent, or Firm*—Edith A. Rice

[57] ABSTRACT

A photographic element comprises at least one silver halide emulsion layer in which the silver halide is sensitized with a compound of formula $$Z\text{-}(L\text{-}XY)_k$$

wherein:

Z is a light absorbing group;

L is a linking group containing a least one C, N, S, or O atom; and k is 1 or 2; and XY represents a fragmentable electron donor moiety wherein:

1) XY has a an oxidation potential between 0 and about 1.4 V;
2) X is an electron donor group;
3) Y is a leaving group other than hydrogen; and
4) the oxidized form of XY undergoes a bond cleavage reaction to give the radical $X^•$ and the leaving fragment Y.

In a preferred embodiment the radical $X^•$ has an oxidation potential of $\leqq -0.7$ V.

28 Claims, No Drawings

SILVER HALIDE LIGHT SENSITIVE EMULSION LAYER HAVING ENHANCED PHOTOGRAPHIC SENSITIVITY

CROSS-REFERENCE TO RELATED APPLICATION

This is a continuation-in-part of application Ser. No. 08/592,166, filed Jan. 26, 1996, abandoned, entitled "Silver Halide Light Sensitive Emulsion Having Enhanced Photographic Sensitivity" by Samir Farid et al., the entire disclosures of which are incorporated herein by reference.

FIELD OF THE INVENTION

This invention relates to a photographic element comprising at least one light sensitive silver halide emulsion layer which has enhanced photographic sensitivity.

BACKGROUND OF THE INVENTION

A variety of techniques have been used to improve the light-sensitivity of photographic silver halide materials.

Chemical sensitizing agents have been used to enhance the intrinsic sensitivity of silver halide. Conventional chemical sensitizing agents include various sulfur, gold, and group VIII metal compounds.

Spectral sensitizing agents, such as cyanine and other polymethine dyes, have been used alone, or in combination, to impart spectral sensitivity to emulsions in specific wavelength regions. These sensitizing dyes function by absorbing long wavelength light that is essentially unabsorbed by the silver halide emulsion and using the energy of that light to cause latent image formation in the silver halide.

Many attempts have been made to further increase the spectral sensitivity of silver halide materials. One method is to increase the amount of light captured by the spectral sensitizing agent by increasing the amount of spectral sensitizing agent added to the emulsion. However, a pronounced decrease in photographic sensitivity is obtained if more than an optimum amount of dye is added to the emulsion. This phenomenon is known as dye desensitization and involves sensitivity loss in both the spectral region wherein the sensitizing dye absorbs light, and in the light sensitive region intrinsic to silver halide. Dye desensitization has been described in The Theory of the Photographic Process, Fourth Edition, T. H. James, Editor, pages 265–266, (Macmillan, 1977).

It is also known that the spectral sensitivity found for certain sensitizing dyes can be dramatically enhanced by the combination with a second, usually colorless organic compound that itself displays no spectral sensitization effect. This is known as the supersensitizing effect.

Examples of compounds which are conventionally known to enhance spectral sensitivity include sulfonic acid derivatives (U.S. Pat. Nos. 2,937,089 and 3,706,567), triazine compounds described in U.S. Pat. Nos. 2,875,058 and 3,695,888, mercapto compounds described in U.S. Pat. No. 3,457,078, thiourea compounds described in U.S. Pat. No. 3,458,318, pyrimidine derivatives described in U.S. Pat. No. 3,615,632, dihydropyridine compounds described in U.S. Pat. No. 5,192,654, aminothiatriazoles as described in U.S. Pat. No. 5,306,612 and hydrazines as described in U.S. Pat. Nos. 2,419,975, 5,459,052 and 4,971,890 and European Patent Application No. 554,856 A1. The sensitivity increases obtained with these compounds generally are small, and many of these compounds have the disadvantage that they have the undesirable effect of deteriorating the stability of the emulsion or increasing fog.

Various electron donating compounds have also been used to improve spectral sensitivity of silver halide materials. U.S. Pat. No. 3,695,588 discloses that the electron donor ascorbic acid can be used in combination with a specific tricarbocyanine dye to enhance sensitivity in the infrared region. The use of ascorbic acid to give spectral sensitivity improvements when used in combination with specific cyanine and merocyanine dyes is also described in U.S. Pat. No. 3,809,561, British Patent No. 1,255,084, and British Patent No. 1,064,193. U.S. Pat. No. 4,897,343 discloses an improvement that decreases dye desensitization by the use of the combination of ascorbic acid, a metal sulfite compound, and a spectral sensitizing dye.

Electron-donating compounds that are convalently attached to a sensitizing dye or a silver-halide adsorptive group have also been used as supersensitizing agents. U.S. Pat. Nos. 5,436,121 and 5,478,719 disclose sensitivity improvements with the use of compounds containing electron-donating styryl bases attached to monomethine dyes. Spectral sensitivity improvements are also described in U.S. Pat. No. 4,607,006 for compounds containing an electron-donative group derived from a phenothiazine, phenoxazine, carbazole, dibenzophenothiazine, ferrocene, tris(2,2'-bipyridyl)ruthenium, or a triarylamine skeleton which are connected to a silver halide adsorptive group. However, most of these latter compounds have no silver halide sensitizing effect of their own and provide only minus-blue sensitivity improvements when used in combination with a sensitizing dye.

In our co-pending application filed concurrently herewith (attorney's docket No. 69500), we have disclosed a new class of organic electron donating compounds that, when incorporated into a silver halide emulsion, provide a sensitizing effect alone or in combination with dyes. These compounds donate at least one electron and are fragmentable, i.e., they undergo a bond cleavage reaction other than deprotonation. In this application we describe the attachment of such electron donors to sensitizing dyes. The attachment of such electron donors to sensitizing dyes would promote adhesion to the silver halide grain surface. Because sensitizing dyes are required to be present to impart spectral sensitivity in specific spectral regions, use of a sensitizing dye as the adsorbing moiety allows the fragmentable electron donating compound to be close to the surface of the silver halide without displacing the spectral sensitizing agent.

Problem to be Solved by the Invention

There is a continuing need for materials which, when added to photographic emulsions, increase their sensitivity. Ideally such materials should be usable with a wide range of emulsion types, their activity should be controllable and they should not increase fog beyond acceptable limits. This invention provides such materials.

SUMMARY OF THE INVENTION

We have now discovered that attachment of materials which improve sensitivity of photographic emulsions to a spectral sensitizing dye provides the added advantage of increased emulsion efficiency at relatively low concentrations.

In accordance with this invention, a silver halide emulsion layer of a photographic element is sensitized with a fragmentable electron donor moiety that upon donating an electron, undergoes a bond cleavage reaction other than deprotonation. The term "sensitization" is used in this patent application to mean an increase in the photographic response of the silver halide emulsion layer of a photographic element. The term "sensitizer" is used to mean a compound that provides sensitization when present in a silver halide emulsion layer.

One aspect of this invention comprises a photographic element comprising at least one silver halide emulsion layer in which the silver halide is sensitized with a compound of the formula:

$Z\text{-}(L\text{-}XY)_k$ wherein Z is a light absorbing group including for example cyanine dyes, complex cyanine dyes, merocyanine dyes, complex merocyanine dyes, homopolar cyanine dyes, styryl dyes, oxonol dyes, hemioxonol dyes, and hemicyanine dyes, and L represents a linking group containing at least one C, N, S or O atom, k is 1 or 2 and XY is a fragmentable electron donor moiety in which X is an electron donor group and Y is a leaving group other than hydrogen, and wherein:

1) XY has an oxidation potential between 0 and about 1.4 V; and
2) the oxidized form of XY undergoes a bond cleavage reaction to give the radical $X^\bullet$ and the leaving fragment Y.

Another aspect of this invention comprises a photographic element comprising at least one silver halide emulsion layer in which the silver halide is sensitized with a compound of the formula:

$Z\text{-}(L\text{-}XY)_k$ wherein Z is a light adsorbing group including for example cyanine dyes, complex cyanine dyes, merocyanine dyes, complex merocyanine dyes, homopolar cyanine dyes, styryl dyes, oxonol dyes, hemioxonol dyes, and hemicyanine dyes, and L represents a linking group containing at least one C, N, S or O atom and XY is a fragmentable electron donor moiety in which X is an electron donor group, k is 1 or 2 and Y is a leaving group other than hydrogen, and wherein:

1) XY has an oxidation potential between 0 and about 1.4 V;
2) the oxidized form of XY undergoes a bond cleavage reaction to give the radical $X^\bullet$ and the leaving fragment Y; and
3) the radical $X^\bullet$ has an oxidation potential $\leqq -0.7$ V (that is, equal to or more negative than about $-0.7$ V).

Compounds which meet criteria (1) and (2) but not (3) are capable of donating one electron and are referred to herein as fragmentable one-electron donors. Compounds which meet all three criteria are capable of donating two electrons and are referred to herein as fragmentable two-electron donors.

In this patent application, oxidation potentials are reported as "V" which represents "volts versus a saturated calomel reference electrode".

ADVANTAGEOUS EFFECT OF THE INVENTION

This invention provides a silver halide photographic emulsion containing an organic electron donor capable of enhancing both the intrinsic and spectral sensitivity of the silver halide emulsion. The activity of these compounds can be easily varied with substituents to control their speed and fog effects in a manner appropriate to the particular silver halide emulsion in which they are used. An important feature of these compounds is that they contain a sensitizing dye moiety, so as to minimize the amount of additive needed to produce a beneficial effect in the emulsion.

DETAILED DESCRIPTION OF THE INVENTION

The photographic element of this invention comprises a silver halide emulsion layer which contains a fragmentable electron donating sensitizer molecule represented by the formula:

$Z\text{-}(L\text{-}XY)_k$ which when added to a silver halide emulsion, alone or in combination with a second spectral sensitizing dye, can increase the photographic sensitivity of the silver halide emulsion. The molecule $Z\text{-}(L\text{-}XY)_k$ is comprised of three parts:

The linkage group represented by L which connects the light absorbing group to the fragmentable electron donating group XY by a covalent bond is preferably an organic linking group containing a least one C, N, S, or O atom. It is also desired that the linking group not be completely aromatic or unsaturated, so that a pi-conjugation system cannot exist between the Z and XY moieties. Preferred examples of the linkage group include, an alkylene group, an arylene group, —O—, —S—, —C═O, —$SO_2$—, —NH—, —P═O, and —N═. Each of these linking components can be optionally substituted and can be used alone or in combination. Examples of preferred combinations of these groups are:

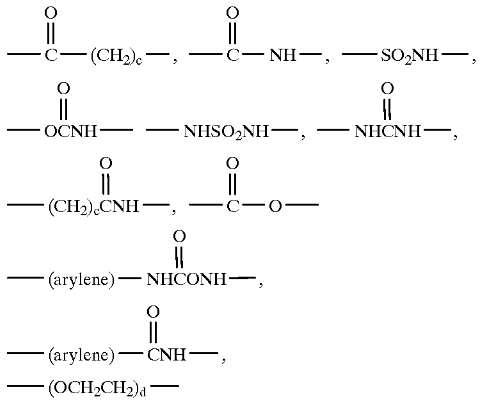

where c=1–30, and d=1–10

The length of the linkage group can be limited to a single atom or can be much longer, for instance up to 30 atoms in length. A preferred length is from about 2 to 20 atoms, and most preferred is 3 to 10 atoms. Some preferred examples of L can be represented by the general formulae indicated below:

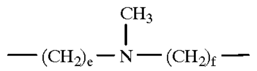

$—(CH_2)_e—SO_2—NH—(CH_2)_f—$ $—(CH_2)_e—O—(CH_2)_f—$

-continued $—(CH_2)_e—CO—NH—(CH_2)_f—$

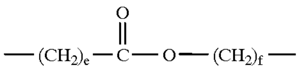

$—(CH_2)_e—$ e and f=1–30, with the proviso that e+f≦30

Z is a light absorbing group, preferably a spectral sensitizing dye typically used in color sensitization technology, including for example cyanine dyes, complex cyanine dyes, merocyanine dyes, complex merocyanine dyes, homopolar cyanine dyes, styryl dyes, oxonol dyes, hemioxonol dyes, and hemicyanine dyes. Representative spectral sensitizing dyes are discussed in *Research Disclosure*, Item 36544, September 1994, the disclosure of which, including the disclosure of references cited therein are incorporated herein by reference. These dyes may be synthesized by those skilled in the art according to the procedures described herein or F. M. Hamer, *The Cyanine Dyes and Related Compounds* (Interscience Publishers, New York, 1964). Particularly preferred as a light absorbing group is a cyanine or merocyanine dye represented by the general formulae VIII–XII below:

(VIII)

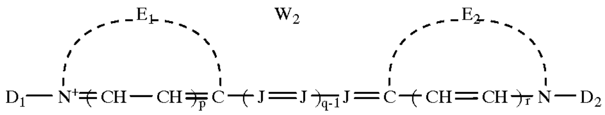

wherein:

$E_1$ and $E_2$ represent the atoms necessary to form a substituted or unsubstituted hetero ring and may be the same or different, each J independently represents a substituted or unsubstituted methine group, q is a positive integer of from 1 to 4, p and r each independently represents 0 or 1, $D_1$ and $D_2$ each independently represents substituted or unsubstituted alkyl or unsubstituted aryl, and $W_2$ is a counterion as necessary to balance the charge;

(IX)

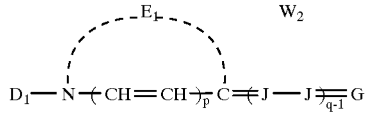

wherein $E_1$, $D_1$, J, p, q and $W_2$ are as defined above for formula (VIII) and G represents

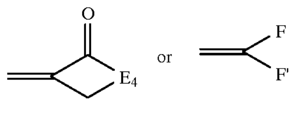

wherein $E_4$ represents the atoms necessary to complete a substituted or unsubstituted heterocyclic nucleus, and F and F' each independently represents a cyano radical, an ester radical, an acyl radical, a carbamoyl radical or an alkylsulfonyl radical;

(X)

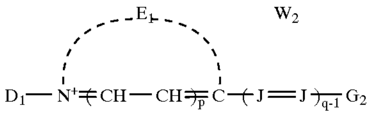

wherein $D_1$, $E_1$, J, p, q and $W_2$ are as defined above for formula (VIII), and $G_2$ represents a substituted or unsubstituted amino radical or a substituted or unsubstituted aryl radical;

(XI)

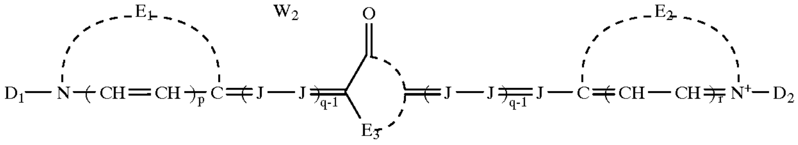

wherein $D_1$, $E_1$, $D_2$, $E_1$, J, p, q, r and $W_2$ are as defined for formula (VIII) above, and $E_3$ is defined the same as $E_4$ for formula (IX) above;

(XII)

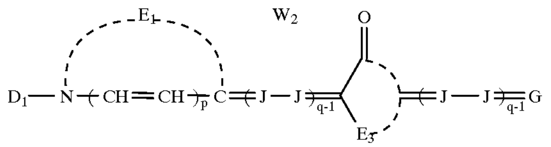

wherein $D_1$, $E_1$, J, G, p, q, r and $W_2$ are as defined above for formula (VIII) above and $E_3$ is as defined for formula (XI) above.

In the above formulas, $E_1$ and $E_2$ each independently represents the atoms necessary to complete a substituted or unsubstituted 5- or 6-membered heterocyclic nucleus. These include a substituted or unsubstituted: thiazole nucleus, oxazole nucleus, selenazole nucleus, quinoline nucleus, tellurazole nucleus, pyridine nucleus, thiazoline nucleus, indoline nucleus, oxadiazole nucleus, thiadiazole nucleus, or imidazole nucleus. This nucleus may be substituted with known substituents, such as halogen (e.g., chloro, fluoro, bromo), alkoxy (e.g., methoxy, ethoxy), substituted or unsubstituted alkyl (e.g., methyl, trifluoromethyl), substituted or unsubstituted aryl, substituted or unsubstituted aralkyl, sulfonate, and others known in the art.

In one embodiment of the invention, when dyes according to formula (VIII) are used $E_1$ and $E_2$ each independently represent the atoms necessary to complete a substituted or unsubstituted thiazole nucleus, a substituted or unsubstituted selenazole nucleus, a substituted or unsubstituted imidazole nucleus, or a substituted or unsubstituted oxazole nucleus.

Examples of useful nuclei for $E_1$ and $E_2$ include: a thiazole nucleus, e.g., thiazole, 4-methylthiazole, 4-phenylthiazole, 5-methylthiazole, 5-phenylthiazole, 4,5-dimethyl-thiazole, 4,5-diphenylthiazole, 4-(2-thienyl) thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylbenzothiazole, 5-hydroxybenzothiazole, 6-5-dihydroxybenzothiazole, naphtho[2,1-d]thiazole, 5-ethoxynaphtho[2,3-d]thiazole, 8-methoxynaphtho[2,3-d]thiazole, 7-methoxynaphtho[2,3-d]thiazole, 4'-methoxythianaphtheno-7', 6'-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2-d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a pyridine nucleus, e.g., 2-pyridine, 5-methyl-2-pyridine, 4-pyridine, 3-methyl-4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, etc.; a tellurazole nucleus, e.g., benzotellurazole, naphtho[1.2-d] benzotellurazole, 5,6-dimethoxybenzotellurazole, 5-methoxybenzotellurazole, 5-methylbenzotellurazole; a thiazoline nucleus, e.g.,thiazoline, 4-methylthiazoline, etc.; a benzimidazole nucleus, e.g., benzimidazole, 5-trifluoromethylbenzimidazole, 5,6-dichlorobenzimidazole; and indole nucleus, 3,3-dimethylindole, 3,3-diethylindole, 3,3,5-trimethylindole; or a diazole nucleus, e.g., 5-phenyl-1,3,4-oxadiazole, 5-methyl-1,3,4-thiadiazole.

F and F' are each a cyano radical, an ester radical such as ethoxy carbonyl, methoxycarbonyl, etc., an acyl radical, a carbamoyl radical, or an alkylsulfonyl radical such as ethylsulfonyl, methylsulfonyl, etc. Examples of useful nuclei for $E_4$ include a 2-thio-2,4-oxazolidinedione nucleus (i.e., those of the 2-thio-2,4-(3H,5H)-oxaazolidinone series) (e.g., 3-ethyl-2-thio-2,4 oxazplidinedione, 3-(2-sulfoethyl)-2-thio-2,4 oxazolidinedione, 3-(4-sulfobutyl)-2-thio-2,4 oxazolidinedione, 3-(3-carboxypropyl)-2-thio-2,4 oxazolidinedione, etc.; a thianaphthenone nucleus (e.g., 2-(2H)-thianaphthenone, etc.), a 2-thio-2,5-thiazolidinedione nucleus (i.e., the 2-thio-2,5-(3H,4H)-thiazoledeione series) (e.g., 3-ethyl-2-thio-2,5-thiazolidinedione, etc.); a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.); a thiazolidinone nucleus (e.g., 4-thiazolidinone, 3-ethyl-4-thiazolidinone, 3-phenyl-4-thiazolidinone, 3-α-naphthyl-4-thiazolidinone, etc.); a 2-thiazolin-4-one series (e.g., 2-ethylmercapto-2-thiazolin-4-one, 2-alkylphenyamino-2-thiazolin-4-one, 2-diphenylamino-2-thiazolin-4-one, etc.) a 2-imino-4-oxazolidinone (i.e., pseudohydantoin) series (e.g., 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-2-α-naphthyl-2,4-imidazolidinedione, 1,3-diphenyl-2,4-imidazolidinedione, etc.); a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(2-carboxyethyl)-2-thio-2,4-imidazolidinedione, 3-phenyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-naphthyl-2-thio-2,4-imidazolidinedione, 1,3-diphenyl-2-thio-2,4-imidazolidinedione, etc.); a 2-imidazolin-5-one nucleus.

$G_2$ represents a substituted or unsubstituted amino radical (e.g., primary amino, anilino), or a substituted or unsubstituted aryl radical (e.g., phenyl, naphthyl, dialkylaminophenyl, tolyl, chlorophenyl, nitrophenyl).

According to the formulas (VIII)–(XII), each J represents a substituted or unsubstituted methine group. Examples of substituents for the methine groups include alkyl (preferably of from 1 to 6 carbon atoms, e.g., methyl, ethyl, etc.) and aryl (e.g., phenyl). Additionally, substituents on the methine groups may form bridged linkages.

$W_2$ represents a counterion as necessary to balance the charge of the dye molecule. Such counterions include cations and anions for example sodium, potassium, triethylammonium, tetramethylguanidinium, diisopropylammonium and tetrabutylammonium, chloride, bromide, iodide, para-toluene sulfonate and the like.

$D_1$ and $D_2$ are each independently substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., 2-hydroxyethyl, 4-hydroxybutyl, etc., a carboxyalkyl group, e.g., 2-carboxyethyl, 4-carboxybutyl, etc., a sulfoalkyl group, e.g., 2-sulfoethyl, 3-sulfobutyl, 4-sulfobutyl, etc., a sulfatoalkyl group, etc., an acyloxyalkyl group, e.g., 2-acetoxyethyl, 3-acetoxypropyl, 4-butyroxybutyl, etc., an alkoxycarbonlyalkyl group, e.g., 2-methoxycarbonlyethyl, 4-ethoxycarbonylbutyl, etc., or an aralkyl group, e.g., benzyl, phenethyl, etc., The alkyl or aryl group may be substituted by one or more of the substituents on the above-described substituted alkyl groups.

Particularly preferred dyes are:

Dye 1

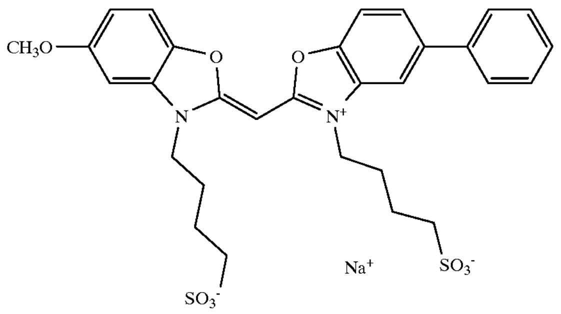

Dye 2

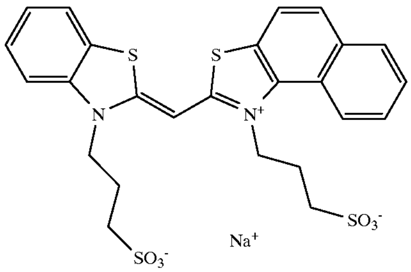

Dye 3

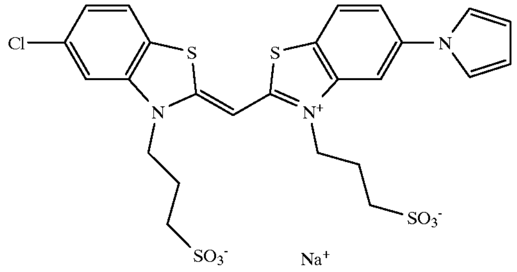

Dye 4

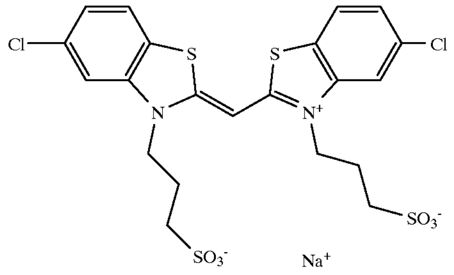

-continued
Dye 5
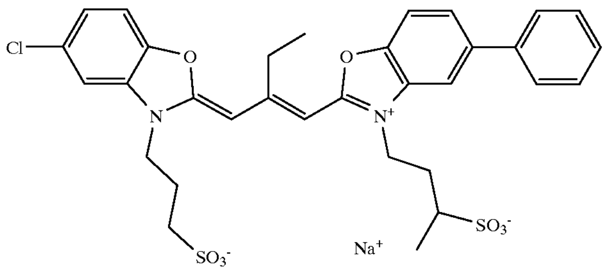
Dye 6
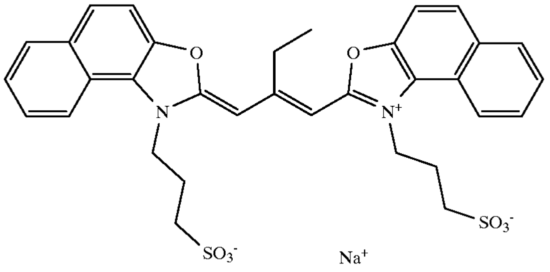
Dye 7
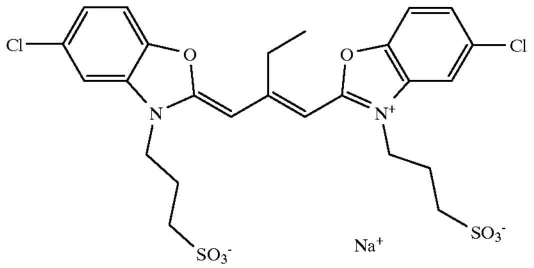
Dye 8
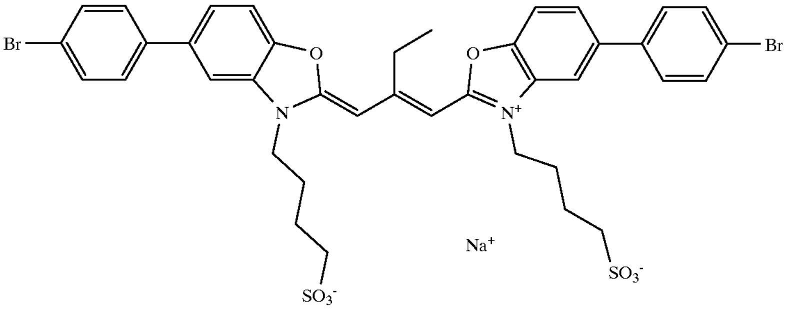
Dye 9
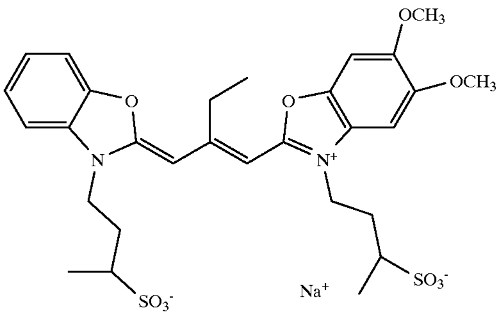

-continued
Dye 10
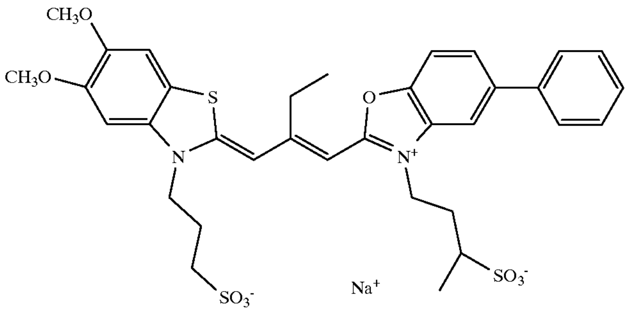
Dye 11
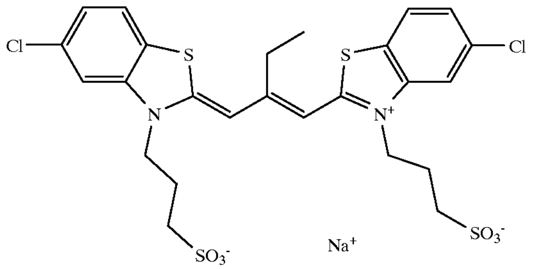
Dye 12
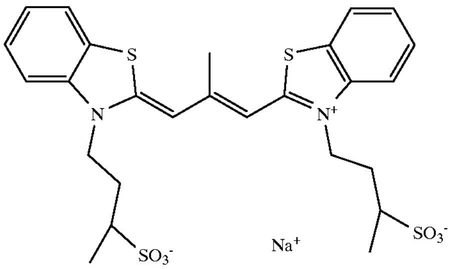
Dye 13
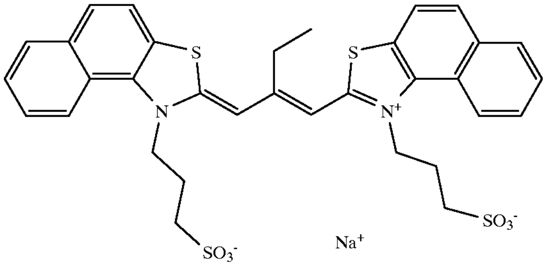
Dye 14
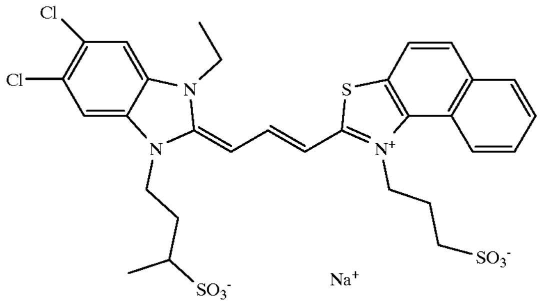

-continued

Dye 15

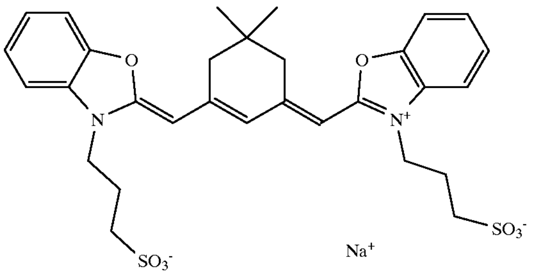

Dye 16

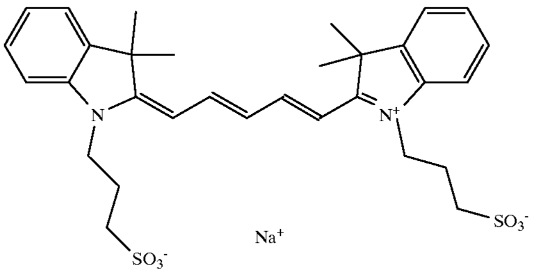

Dye 17

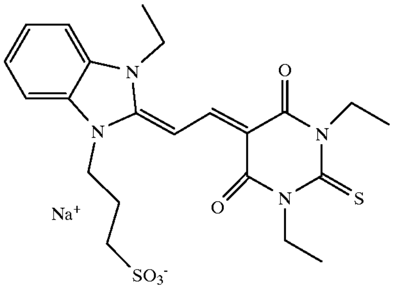

Dye 18

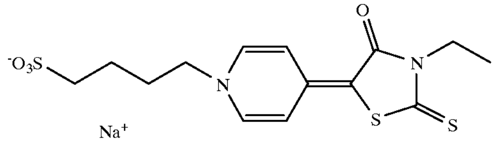

and

Dye 19

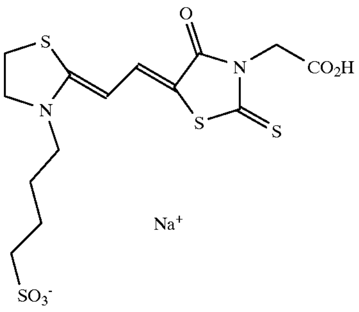

The linking group L may be attached to the dye at one (or more) of the heteroatoms, at one (or more) of the aromatic or heterocyclic rings, or at one (or more) of the atoms of the polymethine chain, at one (or more) of the heteroatoms, at one (or more) of the aromatic or heterocyclic rings, or at one (or more) of the atoms of the polymethine chain. For simplicity, and because of the multiple possible attachment sites, the attachment of the L group is not specifically indicated in the generic structures. Specific structures of illustrative Z-(L-XY)$_k$ compounds are provided below.

Substituent groups in the light absorbing Z or electron donating XY groups can become part of the linkage group in general formula Z-(L-XY)$_k$.

XY is a fragmentable electron donor moiety wherein X is an electron donor group and Y is a leaving group. The preparation of compounds of the formula X-Y is disclosed in co-pending application Ser. No. - -, filed concurrently herewith (attorney's docket No. 69500), the entire disclosure of which is incorporated herein by reference. The following represents the reactions believed to take place when the XY moiety undergoes oxidation and fragmentation to produce a radical $X^{\bullet}$, which in a preferred embodiment undergoes further oxidation.

$$XY \xrightarrow{-e^-} XY^{\bullet +} \xrightarrow{\text{cleavage}} X^{\bullet}\ (+\,Y^+) \xrightarrow{-e^-} X^+$$

The structural features of the moiety XY are defined by the characteristics of the two parts, namely the fragment X and the fragment Y. The structural features of the fragment X determines the oxidation potential of the XY moiety ($E_1$) and that of the radical $X^{\bullet}(E_2)$, whereas both the X and Y fragments affect the fragmentation rate of the oxidized moiety $XY^{\bullet +}$.

Preferred X groups are of the general formula:

(I)

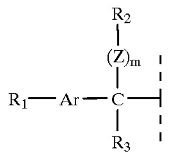

(II)

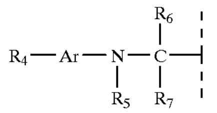

(III)

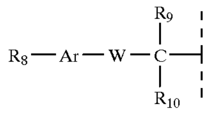

or (IV)

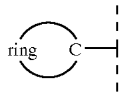

The symbol "R" (that is R without a subscript) is used in all structural formulae in this patent application to represent a hydrogen atom or an unsubstituted or substituted alkyl group.

In structure (I):

m: 0, 1;

Z: O, S, Se, Te;

Ar: aryl group (e.g., phenyl, naphthyl, phenanthryl, anthryl); or heterocyclic group (e.g., pyridine, indole, benzimidazole, thiazole, benzothiazole, thiadiazole, etc.);

$R_1$: R, carboxyl, amide, sulfonamide, halogen, $NR_2$, $(OH)_n$, $(OR')_n$ or $(SR)_n$ where R' is alkyl or substituted alkyl;

n: 1–3;

$R_2$: R, Ar';

$R_3$: R, Ar';

$R_2$ and $R_3$ together can form 5- to 8- membered ring;

$R_2$ and Ar: can be linked to form 5- to 8- membered ring;

$R_3$ and Ar: can be linked to form 5- to 8- membered ring;

Ar': aryl group such as phenyl, substituted phenyl, or heterocyclic group (e.g., pyridine, benzothiazole, etc.)

R: a hydrogen atom or an unsubstituted or substituted alkyl group.

In structure (II):

Ar: aryl group (e.g., phenyl, naphthyl, phenanthryl); or heterocyclic group (e.g., pyridine, benzothiazole, etc.);

$R_4$: a substituent having a Hammett sigma value of −1 to +1, preferably −0.7 to +0.7, e.g., R, OR, SR, halogen, CHO, C(O)R, COOR, $CONR_2$, $SO_3R$, $SO_2NR_2$, $SO_2R$, SOR, C(S)R, etc;

$R_5$: R, Ar'

$R_6$ and $R_7$: R, Ar'

$R_5$ and Ar: can be linked to form 5- to 8- membered ring;

$R_6$ and Ar: can be linked to form 5- to 8- membered ring (in which case, $R_6$ can be a hetero atom);

$R_5$ and $R_6$: can be linked to form 5- to 8- membered ring;

$R_6$ and $R_7$: can be linked to form 5- to 8- membered ring;

Ar': aryl group such as phenyl, substituted phenyl, heterocyclic group

R: hydrogen atom or an unsubstituted or substituted alkyl group.

A discussion on Hammett sigma values can be found in C. Hansch and R. W. Taft *Chem. Rev.* Vol 91, (1991) p 165, the disclosure of which is incorporated herein by reference.

In structure (III):

W=O, S, Se;

Ar: aryl group (e.g., phenyl, naphthyl, phenanthryl, anthryl); or heterocyclic group (e.g., indole, benzimidazole, etc.)

$R_8$: R, carboxyl, $NR_2$, $(OR)_n$, or $(SR)_n$ (n=1–3);

$R_9$ and $R_{10}$: R, Ar';

Ar': aryl group such as phenyl, substituted phenyl, or heterocyclic group (e.g., pyridine, benzothiazole, etc.)

$R_9$ and Ar: can be linked to form 5- to 8- membered ring;

R: a hydrogen atom or an unsubstituted or substituted alkyl group.

In structure (IV):

"ring" represents a substituted or unsubstituted 5-, 6- or 7-membered unsaturated ring, preferrably a heterocyclic ring.

Since X is an electron donor group (i.e., an electron rich organic group), the substituents on the aromatic groups (Ar and/or Ar'), for any particular X group should be selected so that X remains electron rich. For example, if the aromatic group is highly electron rich, e.g. anthracene, electron withdrawing substituents can be used, providing the resulting XY moiety has an oxidation potential of 0 to about 1.4 V. Conversely, if the aromatic group is not electron rich, electron donating substituents should be selected.

When reference in this application is made to a substituent "group" this means that the substituent may itself be substituted or unsubstituted (for example "alkyl group" refers to a substituted or unsubstituted alkyl). Generally, unless otherwise specifically stated, substituents on any "groups" referenced herein or where something is stated to be possibly substituted, include the possibility of any groups, whether substituted or unsubstituted, which do not destroy properties necessary for the photographic utility. It will also be understood throughout this application that reference to a compound of a particular general formula includes those compounds of other more specific formula which specific formula falls within the general formula definition. Examples of substituents on any of the mentioned groups can include known substituents, such as: halogen, for example, chloro, fluoro, bromo, iodo; alkoxy, particularly those with 1 to 12 carbon atoms (for example, methoxy, ethoxy); substituted or unsubstituted alkyl, particularly lower alkyl (for example, methyl, trifluoromethyl); alkenyl or thioalkyl (for example, methylthio or ethylthio), particularly either of those with 1 to 12 carbon atoms; substituted and unsubstituted aryl, particularly those having from 6 to 20 carbon atoms (for example, phenyl); and substituted or unsubstituted heteroaryl, particularly those having a 5- or 6-membered ring containing 1 to 3 heteroatoms selected from N, O, or S (for example, pyridyl, thienyl, furyl, pyrrolyl); and others known in the art. Alkyl substituents preferably contain 1 to 12 carbon atoms and specifically include "lower alkyl", that is,having from 1 to 6 carbon atoms, for example, methyl, ethyl, and the like. Further, with regard to any alkyl group, alkylene group or alkenyl group, it will be understood that these can be branched or unbranched and include ring structures.

The linking group L is usually attached to the X group of the XY moiety, although in certain circumstances, may be attached to the Y group (see below). The L group may be attached to X at any of the substituents $R_1$–$R_{10}$, or to the aryl group of X in structures (I)–(III), or to the ring in structure (IV). Illustrative examples of preferred X groups are given below. For simplicity and because of the multiple possible sites, the attachment of the L group is not specifically indicated in the structures. Specific structures for linked Z-L-XY compounds are provided hereinafter.

The following are illustrative examples of the group X of general structure I:

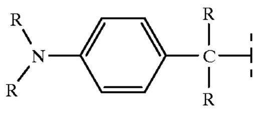

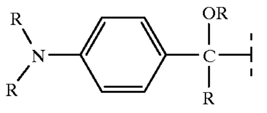

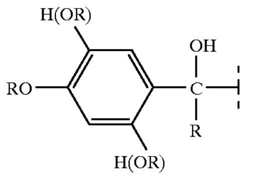

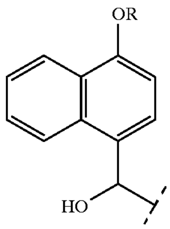

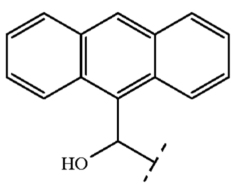

-continued

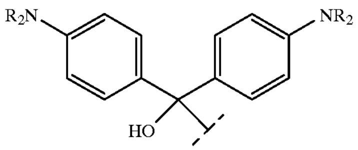

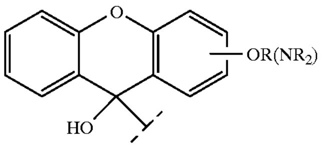

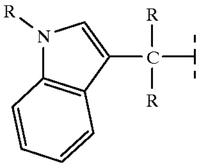

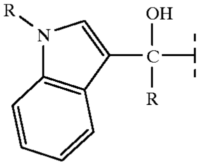

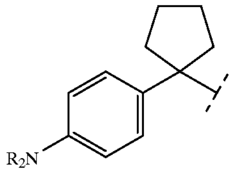

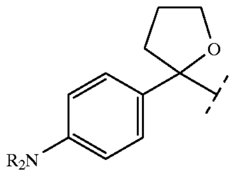

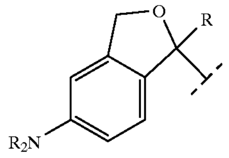

In the structures of this patent application a designation such as —OR($NR_2$) indicates that either —OR or —$NR_2$ can be present.

The following are illustrative examples of the group X of general structure II:

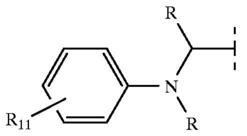

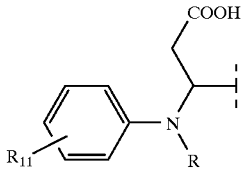

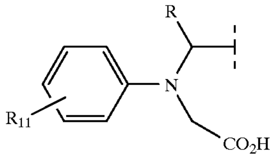

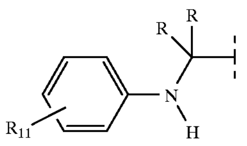

-continued

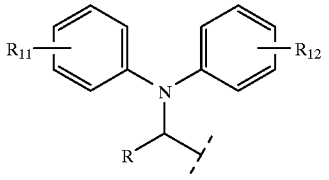

R11 and R12 =
- H
- alkyl
- alkoxy
- alkylthio
- halo
- carbamoyl
- carboxy 1
- amido
- formyl
- sulfonyl
- sulfonamido
- nitrile

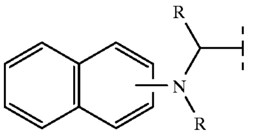

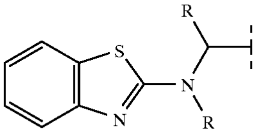

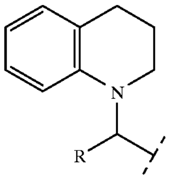

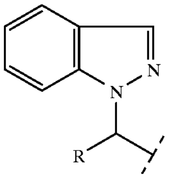

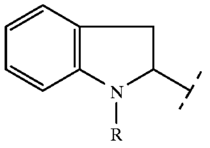

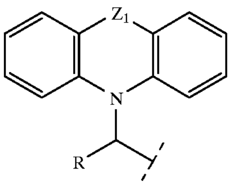

$Z_1$ = a covalent bond, S, O, Se, NR, $CR_2$, CR═CR, or $CH_2CH_2$.

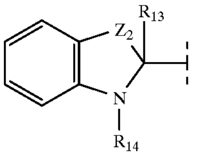

$Z_2$ = S, O, Se, NR, $CR_2$, CR═CR, $R_{13}$ = alkyl, substituted alkyl or aryl, and $R_{14}$ = H, alkyl, substituted alkyl or aryl.

The following are illustrative examples of the group X of the general structure III:

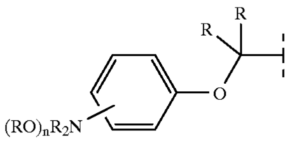

-continued

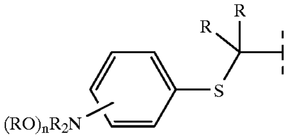

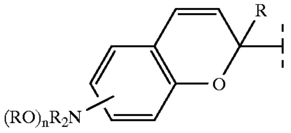

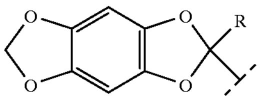

n = 1–3

The following are illustrative examples of the group X of the general structure IV:

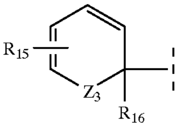
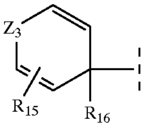
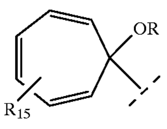

$Z_3$ = O, S, Se, NR
$R_{15}$ = R, OR, $NR_2$
$R_{16}$ = alkyl, substituted alkyl Preferred Y groups are:

(1) X', where X' is an X group as defined in structures I–IV and may be the same as or different from the X group to which it is attached (2)

(3)

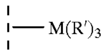

where M=Si, Sn or Ge; and R'=alkyl or substituted alkyl (4)

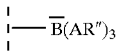

where Ar"=aryl or substituted aryl

The linking group L may be attached to the Y group in the case of (3) and (4). For simplicity, the attachment of the L group is not specifically indicated in the generic formulae.

In preferred embodiments of this invention Y is $COO^-$ or $Si(R')_3$ or an X group. Particularly preferred Y groups are $COO^-$ or $Si(R')_3$.

Preferred XY moieties are derived from X-Y compounds of the formulae given below (for simplicity, the multiple possible sites, the the L group is not specified):

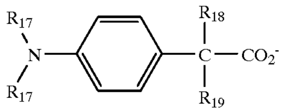

| Cpd. No. | $R_{17}$ | $R_{18}$ | $R_{19}$ |
|---|---|---|---|
| 1 | $CH_3$ | H | H |
| 2 | $C_2H_5$ | OH | H |
| 3 | $CH_3$ | OH | H |
| 4 | $C_2H_5$ | OH | $CH_3$ |
| 5 | $CH_3$ | OH | $CH_3$ |
| 6 | $C_2H_5$ | $OCH_3$ | $CH_3$ |
| 7 | $CH_3$ | $OCH_3$ | $CH_3$ |
| 8 | $C_2H_5$ | $OCH_3$ | H |

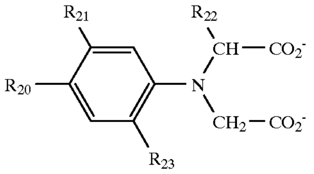

| Cpd. No. | $R_{20}$ | $R_{21}$ | $R_{22}$ | $R_{23}$ |
|---|---|---|---|---|
| 9 | $OCH_2CO_2^-$ | H | H | H |
| 10 | $OCH_3$ | H | H | H |
| 11 | $CH_3$ | H | H | H |
| 12 | Cl | H | H | H |
| 13 | H | H | H | H |
| 14 | H | H | $CH_3$ | H |
| 15 | $OCH_3$ | H | $CH_3$ | H |
| 16 | $CH(CH_3)C_2H_5$ | H | $CH_3$ | H |
| 17 | CHO | H | $CH_3$ | H |
| 18 | $SO_3^-$ | H | $CH_3$ | H |
| 19 | $SO_2N(C_2H_5)_2$ | H | $CH_3$ | H |
| 20 | $CH_3$ | H | $CH_3$ | H |
| 21 | $OCH_3$ | $OCH_3$ | H | H |
| 22 | H | H | H | $OCH_2CO_2^-$ |

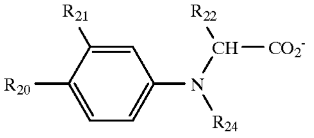

| Cpd. No. | $R_{20}$ | $R_{22}$ | $R_{24}$ | $R_{21}$ |
|---|---|---|---|---|
| 23 | $OCH_3$ | $CH_3$ | H | H |
| 24 | H | $CH_3$ | H | H |
| 25 | $CO_2^-$ | $CH_3$ | H | H |
| 26 | Cl | $CH_3$ | H | H |
| 27 | $CONH_2$ | $CH_3$ | H | H |
| 28 | $CO_2C_2H_5$ | $CH_3$ | H | H |
| 29 | $CH_3$ | $CH_2CO_2^-$ | H | H |
| 30 | H | $CH_2CO_2^-$ | H | H |
| 31 | $CO_2^-$ | $CH_2CO_2^-$ | H | H |
| 32 | H | $CH_3$ | H | $CONH_2$ |
| 33 | $CO_2^-$ | $CH_3$ | $CH_3$ | H |
| 34 | H | $CH_3$ | $C_2H_5$ | $CONH_2$ |
| 35 | $CH_3$ | $CH_3$ | $(CH_2)_3CH_3$ | H |
| 36 | $OCH_3$ | $CH_3$ | $(CH_2)_3CH_3$ | H |
| 37 | H | $CH_3$ | $(CH_2)_3CH_3$ | H |
| 38 | $CO_2^-$ | $CH_3$ | $(CH_2)_3CH_3$ | H |
| 39 | Cl | $CH_3$ | $(CH_2)_3CH_3$ | H |
| 40 | $CH_3$ | $CH_2CO_2^-$ | $(CH_2)_3CH_3$ | H |
| 41 | H | $CH_2CO_2^-$ | $(CH_2)_3CH_3$ | H |

-continued

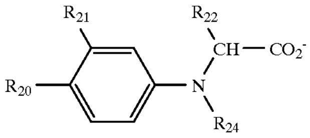

| Cpd. No. | $R_{20}$ | $R_{22}$ | $R_{24}$ | $R_{21}$ |
|---|---|---|---|---|

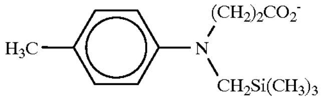

Cpd. 42

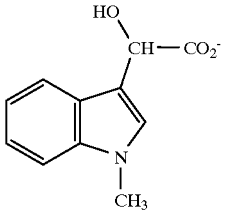

Cpd. 43

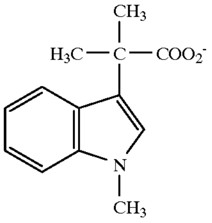

Cpd. 44

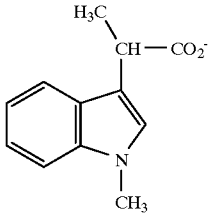

Cpd. 45

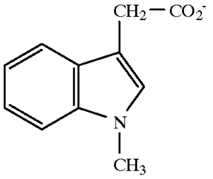

Cpd. 46

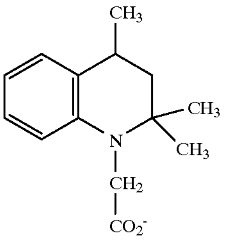

Cpd. 47

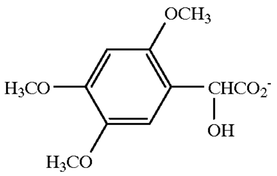

Cpd. 48

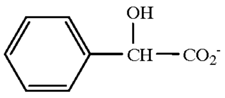

Cpd. 49

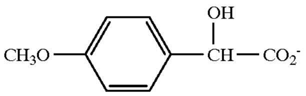

Cpd. 50

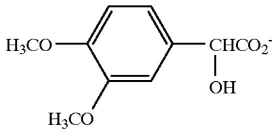

Cpd. 51

-continued

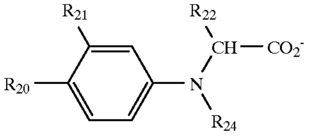

| Cpd. No. | $R_{20}$ | $R_{22}$ | $R_{24}$ | $R_{21}$ |
|---|---|---|---|---|

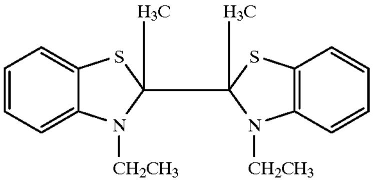

Cpd. 52

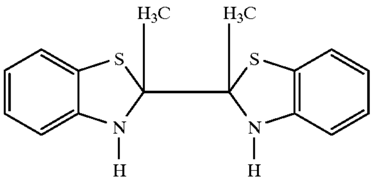

Cpd. 53

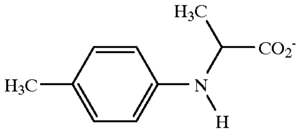

Cpd. 54

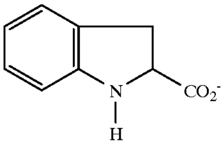

Cpd.55

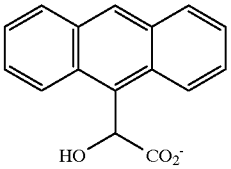

Cpd. 56

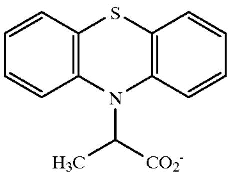

Cpd. 57

-continued

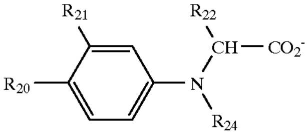

| Cpd. No. | $R_{20}$ | $R_{22}$ | $R_{24}$ | $R_{21}$ |
|---|---|---|---|---|

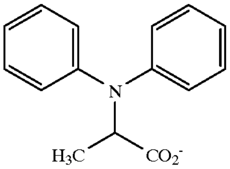

Cpd. 58

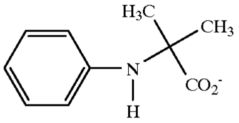

Cpd. 59

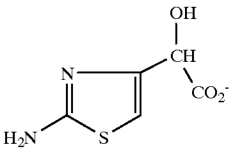

Cpd. 60

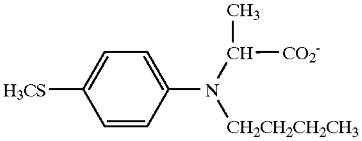

Cpd. 61

In the above formulae, counterion(s) required to balance the charge of the XY moiety are not shown as any counterion can be utilized. Common counterions are sodium, potassium, triethylammonium ($TEA^+$), tetramethylguanidinium ($TMG^+$), diisopropylammonium ($DIPA^+$), and tetrabutylammonium ($TBA^+$).

Fragmentable electron donating moieties XY are derived from electron donating compounds X-Y which can be fragmentable one electron donating compounds which meet the first two criteria set forth below or fragmentable two electron donating compounds which meet all three criteria set forth below. The first criterion relates to the oxidation potential of X-Y ($E_1$). $E_1$ is preferably no higher than about 1.4 V and preferably less than about 1.0 V. The oxidation potential is preferably greater than 0, more preferably greater than about 0.3 V. $E_1$ is preferably in the range of about 0 to about 1.4 V, and more preferably of from about 0.3 V to about 1.0 V.

Oxidation potentials are well known and can be found, for example, in "Encyclopedia of Electrochemistry of the Elements", Organic Section, Volumes XI–XV, A. Bard and H. Lund (Editors) Marcel Dekkar Inc., N.Y. (1984). $E_1$ can be measured by the technique of cyclic voltammetry. In this technique, the electron donating compound is dissolved in a solution of 80%/20% by volume acetonitrile to water containing 0.1 M lithium perchlorate. Oxygen is removed from the solution by passing nitrogen gas through the solution for 10 minutes prior to measurement. A glassy carbon disk is used for the working electrode, a platinum wire is used for the counter electrode, and a saturated calomel electrode (SCE) is used for the reference electrode. Measurement is conducted at 25° C. using a potential sweep rate of 0.1 V/sec. The oxidation potential vs. SCE is taken as the peak potential of the cyclic voltammetric wave. $E_1$ values for typical X-Y compounds useful in preparing the compounds of this invention are given in Table A.

TABLE A

Oxidation Potential of X-Y

| Compound | $E_1$ (V vs SCE) | Compound | $E_1$ (V vs SCE) |
|---|---|---|---|
| 1 | 0.53 | 30 | 0.60 |
| 2 | 0.50 | 26 | 0.51 |
| 5 | 0.51 | 27 | 0.62 |
| 4 | 0.49 | 38 | 0.48 |
| 7 | 0.52 | 39 | 0.40 |
| 6 | 0.51 | 41 | 0.48 |
| 8 | 0.49 | 34 | 0.52 |
| 48 | 0.70 | 28 | 0.61 |
| 51 | 0.91 | 17 | 0.74 |
| 49 | ~1.2 | 18 | 0.70 |
| 50 | ~1.05 | 19 | 0.68 |
| 43 | 0.61 | 31 | 0.61 |
| 44 | 0.64 | 22 | 0.65 |
| 45 | 0.64 | 59 | 0.53 |
| 46 | 0.68 | 56 | 0.65 |
| 42 | 0.30 | 57 | 0.49 |
| 9 | 0.38 | 58 | 0.49 |
| 10 | 0.38 | 52 | 0.07 |
| 11 | 0.46 | 54 | 0.44 |
| 23 | 0.37 | | |
| 20 | 0.46 | | |
| 14 | 0.50 | | |
| 15 | 0.36 | | |
| 16 | 0.47 | | |
| 36 | 0.22 | | |
| 29 | 0.52 | | |
| 40 | 0.38 | | |
| 35 | 0.34 | | |
| 25 | 0.62 | | |
| 33 | 0.54 | | |
| 13 | 0.54 | | |
| 12 | 0.58 | | |
| 21 | 0.36 | | |
| 24 | 0.52 | | |
| 37 | 0.43 | | |
| 32 | 0.58 | | |
| 60 | 0.80 | | |

The second criterion defining the fragmentable XY groups is the requirement that the oxidized form of X-Y, that is the radical cation $X\text{-}Y^{+\bullet}$, undergoes a bond cleavage reaction to give the radical $X^\bullet$ and the fragment $Y^+$ (or in the case of an anionic compound the radical $X^\bullet$ and the fragment Y). This bond cleavage reaction is also referred to herein as "fragmentation". It is widely known that radical species, and in particular radical cations, formed by a one-electron oxidation reaction may undergo a multitude-of reactions, some of which are dependent upon their concentration and on the specific environment wherein they are produced. As described in "Kinetics and Mechanisms of Reactions of Organic Cation Radicals in Solution", Advances in Physical Organic Chemistry, vol 20, 1984, pp 55–180, and "Formation, Properties and Reactions of Cation Radicals in Solution", Advances in Physical Organic Chemistry, vol 13, 1976, pp 156–264, V. Gold Editor, 1984, published by Academic Press, N.Y., the range of reactions available to such radical species includes: dimerization, deprotonation, hydrolysis, nucleophilic substitution, disproportionation, and bond cleavage. With compounds useful in accordance with our invention, the radical formed on oxidation of X-Y undergoes a bond cleavage reaction.

The kinetics of the bond cleavage or fragmentation reaction can be measured by conventional laser flash photolysis. The general technique of laser flash photolysis as a method to study properties of transient species is well known (see, for example, "Absorption Spectroscopy of Transient Species". Herkstroeter and I. R. Gould in Physical Methods of Chemistry Series, second Edition, Volume 8, page 225, edited by B. Rossiter and R. Baetzold, John Wiley & Sons, New York, 1993). The specific experimental apparatus we used to measure fragmentation rate constants and radical oxidation potentials is described in detail below. The rate constant of fragmentation in compounds useful in accordance with this invention is preferably faster than about 0.1 per second (i.e., 0.1 $s^{-1}$ or faster, or, in other words, the lifetime of the radical cation $X\text{-}Y^{+\bullet}$ should be 10 sec or less). The fragmentation rate constants can be considerably higher than this, namely in the $10^2$ to $10^{13}$ $s^{-1}$ range. The fragmentation rate constant is preferably about 0.1 $sec^{-1}$ to about $10^{13}$ $s^{-1}$, more preferably about $10^2$ to about $10^9$ $s^{-1}$. Fragmentation rate constants $k_{fr}$ ($s^{-1}$) for typical compounds useful in accordance with our invention are given in Table B.

TABLE B

Rate Constants for Decarboxylation of Radical Cations in $CH_3CN/H_2O$(4:1)

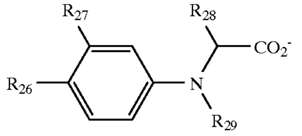

| COMP'D | $R_{26}$ | $R_{27}$ | $R_{28}$ | $R_{29}$ | $k_{fr}(s^{-1})$ |
|---|---|---|---|---|---|
| 14 | H | H | Me | $CH_2CO_2^-$ | >2.0 x $10^7$ |
| 13 | H | H | H | $CH_2CO_2^-$ | 1.7 x $10^7$ |
| 20 | Me | H | Me | $CH_2CO_2^-$ | 8.1 x $10^6$ |
| 11 | Me | H | H | $CH_2CO_2^-$ | 1.6 x $10^6$ |
| 15 | OMe | H | Me | $CH_2CO_2^-$ | 9.0 x $10^4$ |
| 10 | OMe | H | H | $CH_2CO_2^-$ | 9.3 x $10^3$ |
| 21 | OMe | OMe | H | $CH_2CO_2^-$ | 1 x $10^3$ |
| 36 | OMe | H | Me | n-Bu | 1.1 x $10^6$ |
| 40 | Me | H | $CH_2CO_2^-$ | n-Bu | 1.3 x $10^7$ |
| 29 | Me | H | $CH_2CO_2^-$ | H | 5.4 x $10^6$ |
| 54 | Me | H | Me | H | 1.4 x $10^7$ |

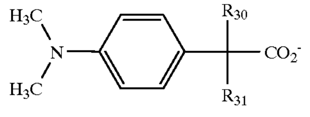

| COMPOUND | $R_{30}$ | $R_{31}$ | $k_{fr}(s^{-1})$ |
|---|---|---|---|
| 3 | OH | Me | 5.5 x $10^5$ |
| 1 | H | H | ~3.0 x $10^5$ |

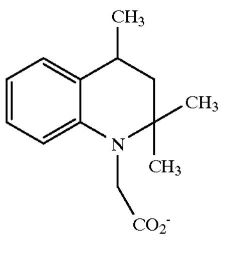

TABLE B-continued

| Rate Constants for Decarboxylation of Radical Cations in $CH_3CN/H_2O(4:1)$ | |
|---|---|
| COMPOUND | $k_{fr}(s^{-1})$ |
| 47 | $>10^7$ |

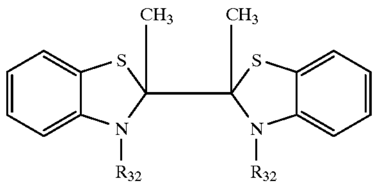

| COMPOUND | $R_{32}$ | $k_{fr}(s^{-1})$ |
|---|---|---|
| 52 | H | $>10^9$ |
| 53 | Et | $>10^9$ |

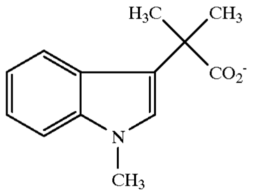

| COMPOUND | $k_{fr}(s^{-1})$ |
|---|---|
| 44 | $5.3 \times 10^5$ |

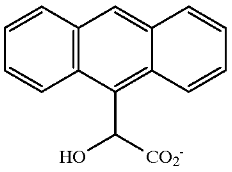

| COMPOUND | $k_{fr}(s^{-1})$ |
|---|---|
| 56 | $1.2 \times 10^5$ |

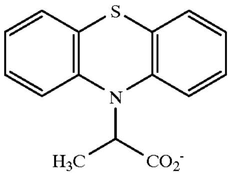

| COMPOUND | $k_{fr}(s^{-1})$ |
|---|---|
| 57 | ca. $1 \times 10^5$ |

In a preferred embodiment of the invention, the XY moiety is a fragmentable two-electron donor moiety and meets a third criterion, that the radical $X^{\bullet}$ resulting from the bond cleavage reaction has an oxidation potential equal to or more negative than −0.7 V, preferably more negative than about −0.9 V. This oxidation potential is preferably in the range of from about −0.7 to about −2 V, more preferably from about −0.8 to about −2 V and most preferably from about −0.9 to about −1.6 V.

The oxidation potential of many radicals have been measured by transient electrochemical and pulse radiolysis techniques as reported by Wayner, D. D.; McPhee, D. J.; Griller, D. in *J. Am. Chem. Soc.* 1988, 110, 132; Rao, P. S,; Hayon, E. *J. Am. Chem. Soc.* 1974, 96, 1287 and Rao, P. S,; Hayon, E. *J. Am. Chem. Soc.* 1974, 96, 1295. The data demonstrate that the oxidation potentials of tertiary radicals are less positive (i.e., the radicals are stronger reducing agents) than those of the corresponding secondary radicals, which in turn are more negative than those of the corresponding primary radicals. For example, the oxidation potential of benzyl radical decreases from 0.73 V to 0.37 V to 0.16 V upon replacement of one or both hydrogen atoms by methyl groups.

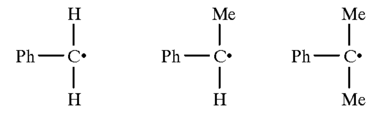

$E^{OX}$ (V) +0.73 +0.37 +0.16

A considerable decrease in the oxidation potential of the radicals is achieved by α hydroxy or alkoxy substituents. For example the oxidation potential of the benzyl radical (+0.73 V) decreases to −0.44 when one of the α hydrogen atoms is replaced by a methoxy group.

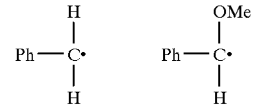

$E^{OX}$ (V) +0.73 -0.44

An α-amino substituent decreases the oxidation potential of the radical to values of about −1 V.

In accordance with our invention we have discovered that compounds which provide a radical $X^{\bullet}$ having an oxidation potential more negative than −0.7 are particularly advantageous for use in sensitizing silver halide emulsions. As set forth in the above-noted articles, the substitution at the α carbon atom influences the oxidation potential of the radical. We have found that substitution of the phenyl moiety with at least one-electron donating substituent or replacement of the phenyl with an electron donating aryl or heterocyclic group also influences the oxidation potential of $X^{\bullet}$. Illustrative examples of $X^{\bullet}$ having an oxidation potential more negative than −0.7 are given below in Table C. The oxidation potential of the transient species $X^{\bullet}$, can be determined using a laser flash photolysis technique as described in greater detail below.

In this technique, the compound X-Y is oxidized by an electron transfer reaction initiated by a short laser pulse. The oxidized form of X-Y then undergoes the bond cleavage reaction to give the radical $X^{\bullet}$. $X^{\bullet}$ is then allowed to interact with various electron acceptor compounds of known reduction potential. The ability of $X^{\bullet}$ to reduce a given electron acceptor compound indicates that the oxidation potential of $X^{\bullet}$ is nearly equal to or more negative than the reduction potential of that electron acceptor compound. The experimental details are set forth more fully below. The oxidation potentials ($E_2$) for radicals $X^{\bullet}$ for typical compounds useful in accordance with our invention are given in Table C. Where only limits on potentials could be determined, the following notation is used: <−0.90 V should be read as "more negative than −0.90 V" and >−0.40 V should be read as "less negative than −0.40 V".

Illustrative $X^{\bullet}$ radicals useful in accordance with the third criterion of our invention are those given below having an oxidation potential $E_2$ more negative than −0.7 V. Some comparative examples with $E_2$ less negative than −0.7 V are also included.

TABLE C

Oxidation Potentials of Radicals ($X^{\bullet}$), $E_2$

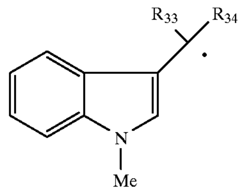

| Parent X-Y compound | $R_{33}$ | $R_{34}$ | $E_2$ |
|---|---|---|---|
| 46 | H | H | ~−0.34 |
| 45 | Me | H | −0.56 |
| 44 | Me | Me | −0.81 |
| 43 | OH | H | −0.89 |

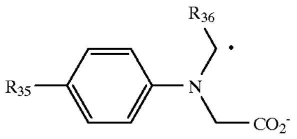

| Parent X-Y compound | $R_{35}$ | $R_{36}$ | $E_2$ |
|---|---|---|---|
| 13 | H | H | ~−0.85 |
| 14 | H | Me | <−0.9 |
| 11 | Me | H | ~−0.9 |
| 16 | i-Bu | H | ~−0.9 |
| 20 | Me | Me | <−0.9 |
| 10 | OMe | H | <−0.9 |
| 15 | OMe | Me | <−0.9 |

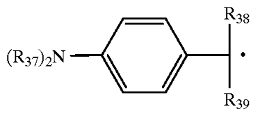

| Parent X-Y compound | $R_{37}$ | $R_{38}$ | $R_{39}$ | $E_2$ |
|---|---|---|---|---|
| 8 | Et | H | OMe | ~−0.85 |
| 2 | Et | H | OH | <−0.9 |
| 7 | Me | Me | OMe | <−0.9 |
| 5 | Me | Me | OH | <−0.9 |
| 1 | Me | H | H | >−0.5 |

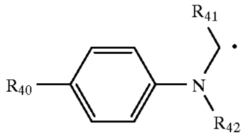

| Parent X-Y compound | $R_{40}$ | $R_{41}$ | $R_{42}$ | $E_2$ |
|---|---|---|---|---|
| 36 | OMe | Me | n-Bu | <−0.9 |
| 33 | $CO_2^-$ | Me | Me | <−0.9 |

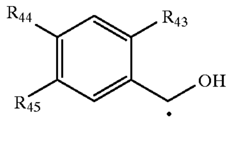

Parent X-Y

TABLE C-continued

Oxidation Potentials of Radicals ($X^{\bullet}$), $E_2$

| compound | $R_{44}$ | $R_{43}$ | $R_{46}$ | $E_2$ |
|---|---|---|---|---|
| 48 | OMe | OMe | OMe | <−0.9 |
| 51 | OMe | H | OMe | <−0.9 |
| 49 | H | H | H | −0.75 |
| 50 | OMe | H | H | <−0.9 |

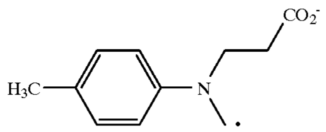

| Parent X-Y | $E_2$ |
|---|---|
| 42 | ~−0.9 |

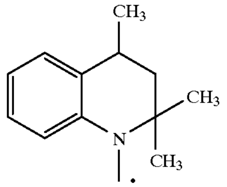

| Parent X-Y | $E_2$ |
|---|---|
| 47 | <−0.9 |

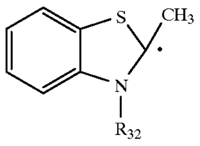

| Parent X-Y compound | $R_{32}$ | $E_2$ |
|---|---|---|
| 52 | H | <−0.9 |
| 53 | Et | <−0.9 |

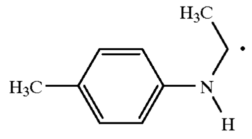

| Parent X-Y compound | $E_2$ |
|---|---|
| 54 | <−0.9 |

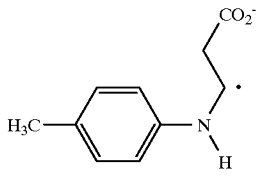

| Parent X-Y compound | $E_2$ |
|---|---|
| 29 | <−0.9 |

TABLE C-continued

| Oxidation Potentials of Radicals (X•), $E_2$ | |
|---|---|
| 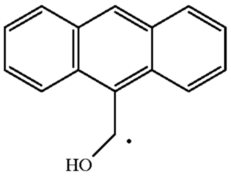 | |
| Parent X-Y compound | $E_2$ |
| 56 | <-0.9 |
| 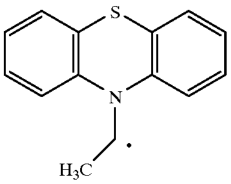 | |
| Parent X-Y compound | $E_2$ |
| 57 | <-0.9 |

Specific inventive compounds according to the general formulae given above are listed below, but the present invention should not be construed as being limited thereto. As is demonstrated in these examples, the point of attachment of the linking group L to the light absorbing group may be at one (or more) of the heteroatoms, at one (or more) of the aromatic or heterocyclic rings, or at one (or more) of the atoms of the polymethine chain.

Inv 1

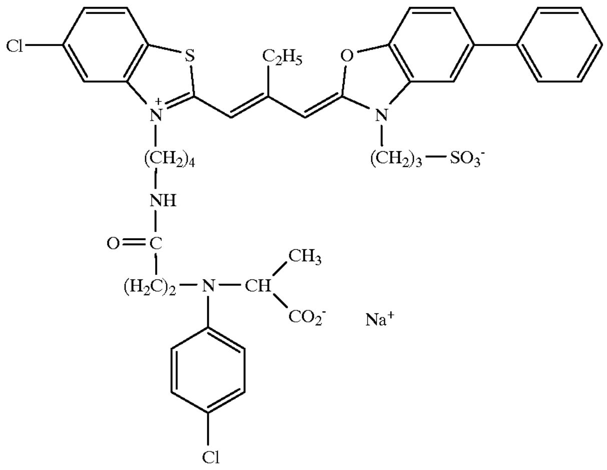

-continued
Inv 2
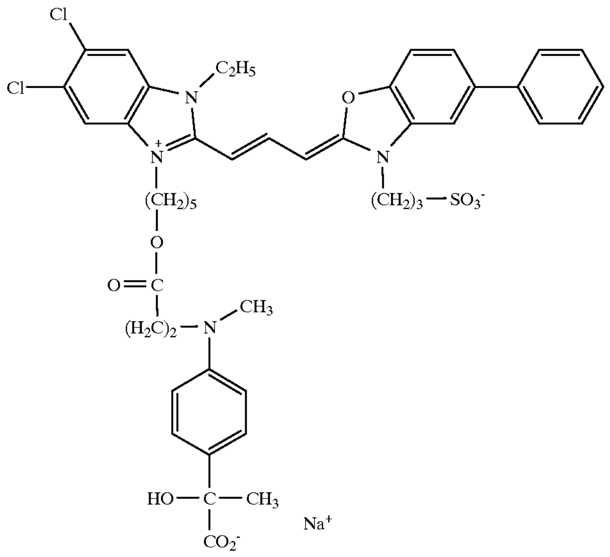
Inv 3
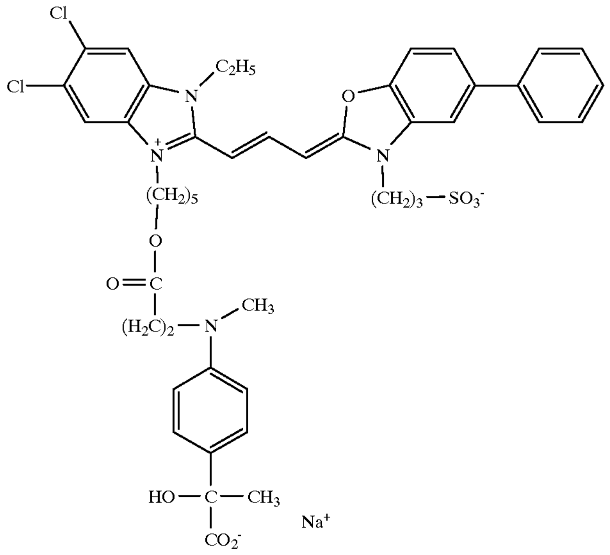

-continued
Inv 4
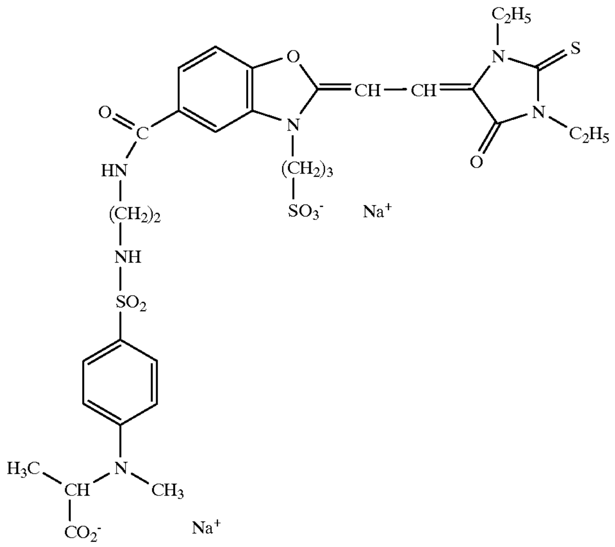
Inv 5
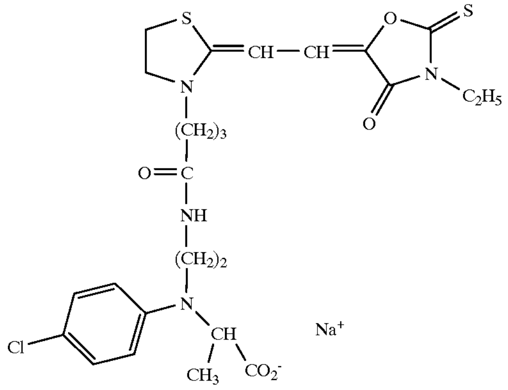
Inv 6
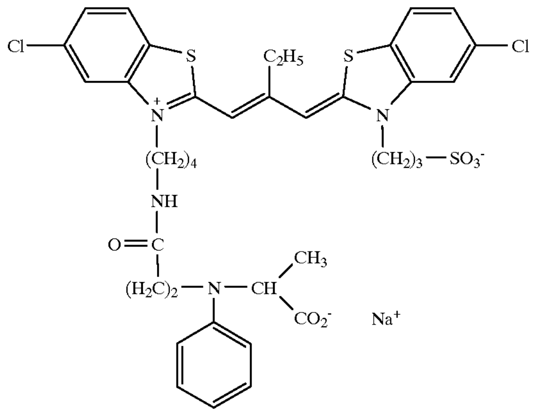

-continued
Inv 7
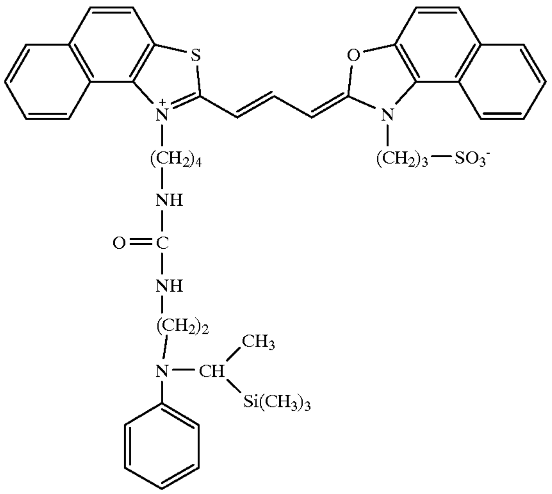
Inv 8
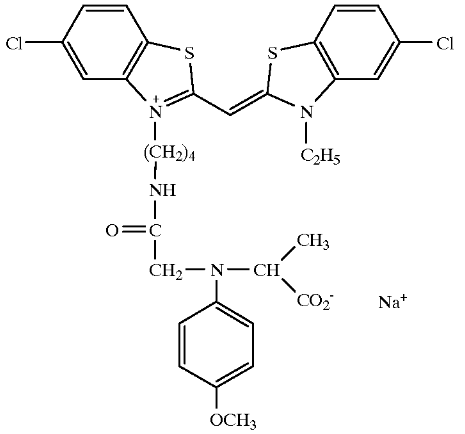
Inv 9
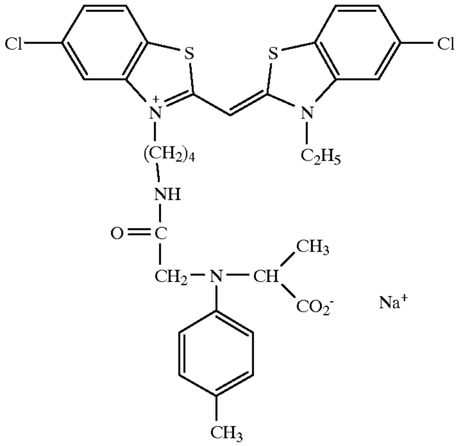

-continued
Inv 10
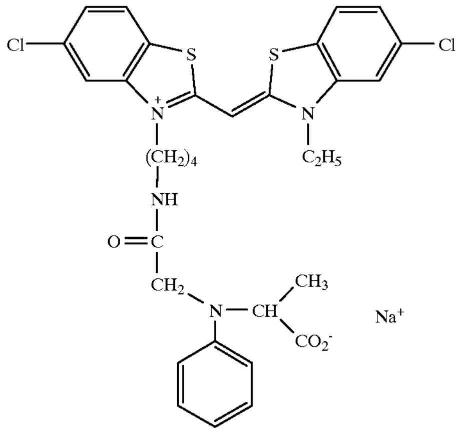
Inv 11
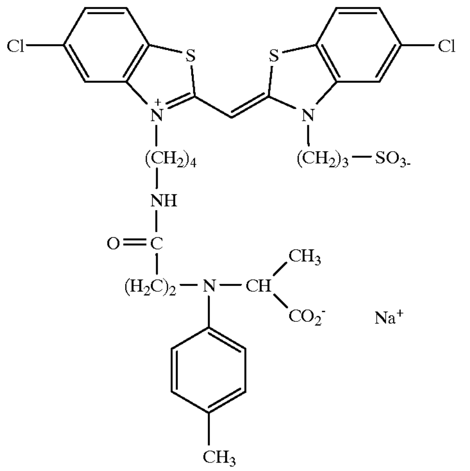
Inv 12
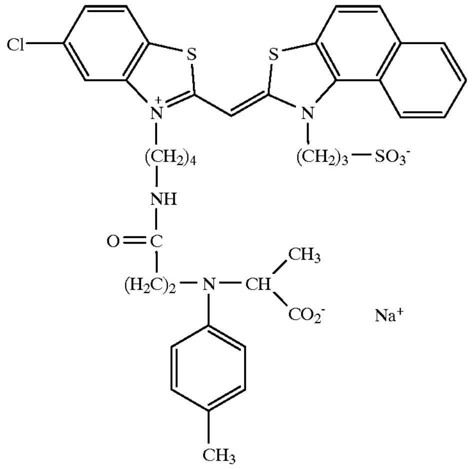

-continued
Inv 13
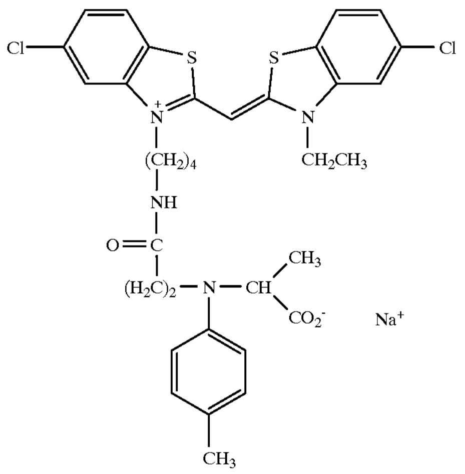
Inv 14
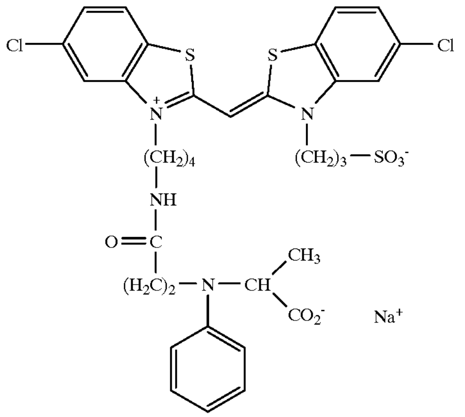
Inv 15
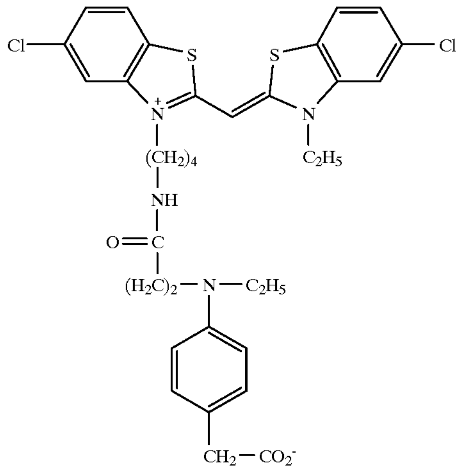

-continued
Inv 16
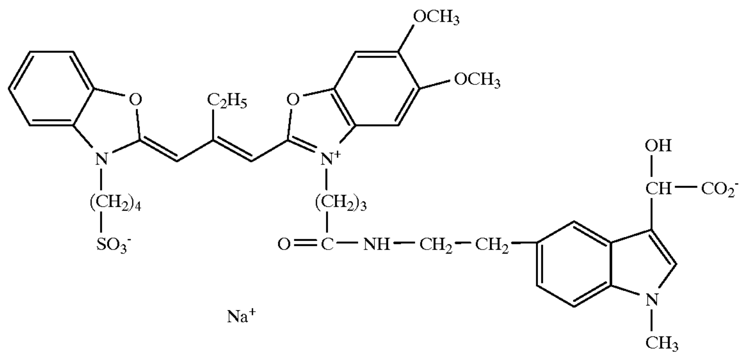
Inv 17
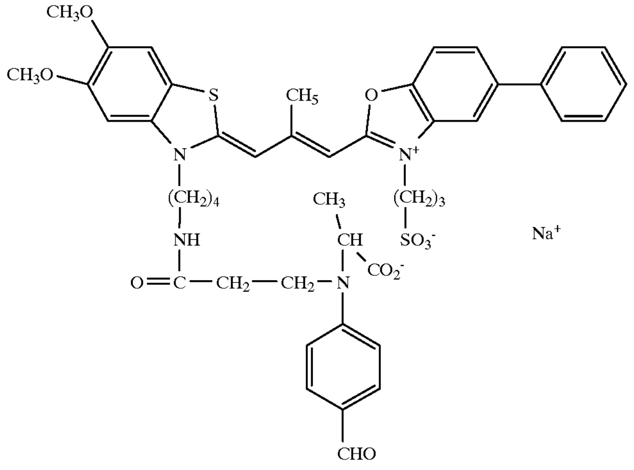
Inv 18
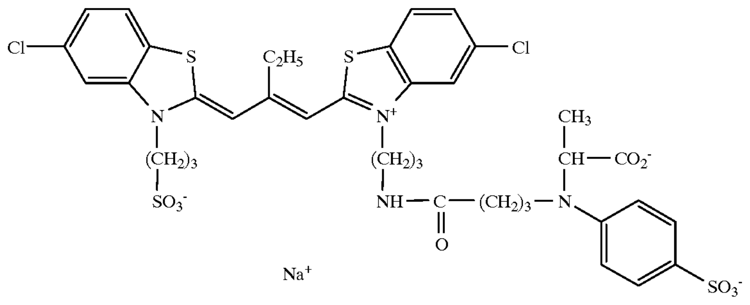
Inv 19
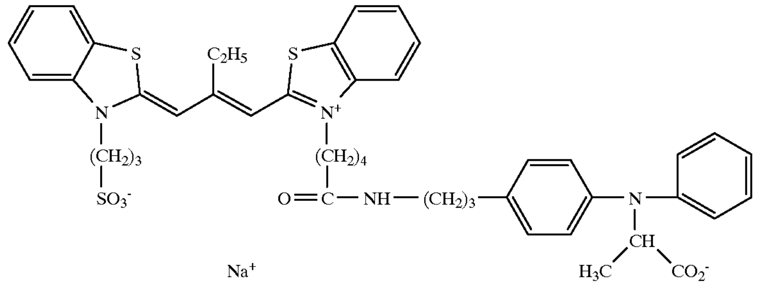

-continued
Inv 20
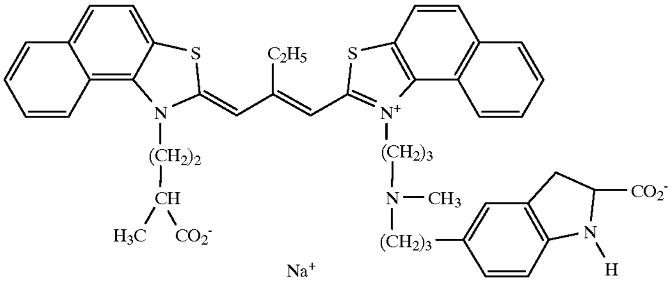
Inv 21
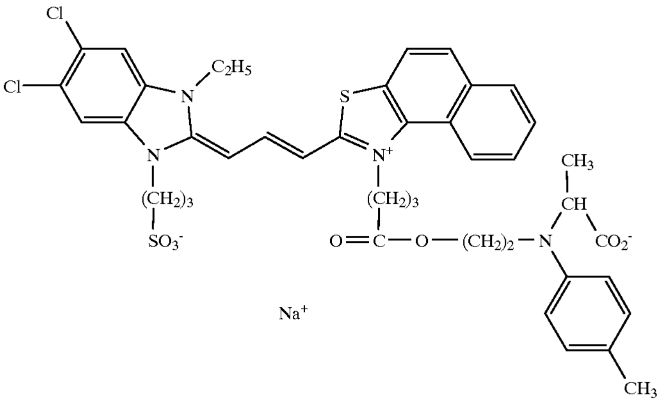
Inv 22
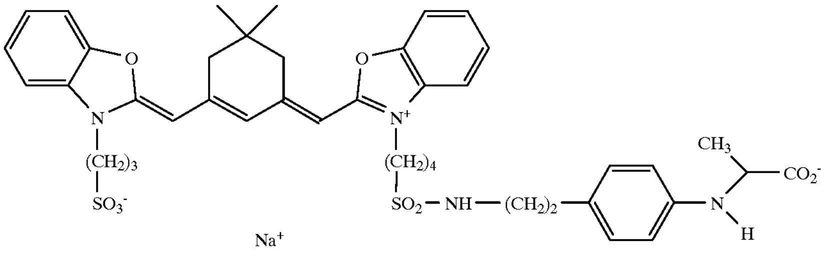
Inv 23
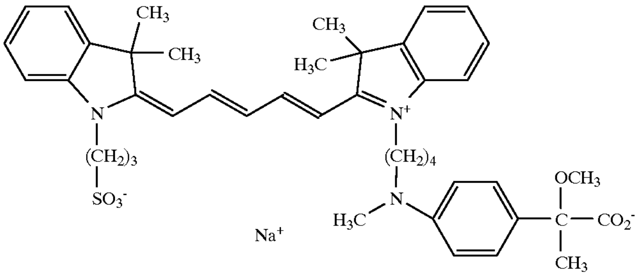

-continued
Inv 24
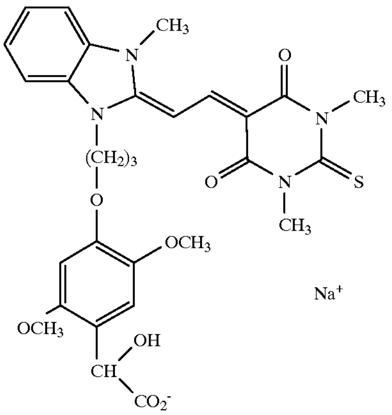
Inv 25
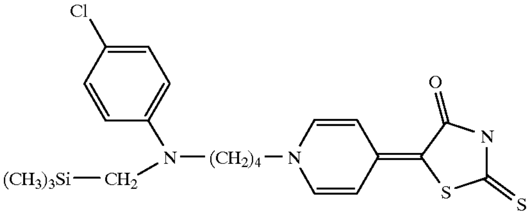
Inv 26
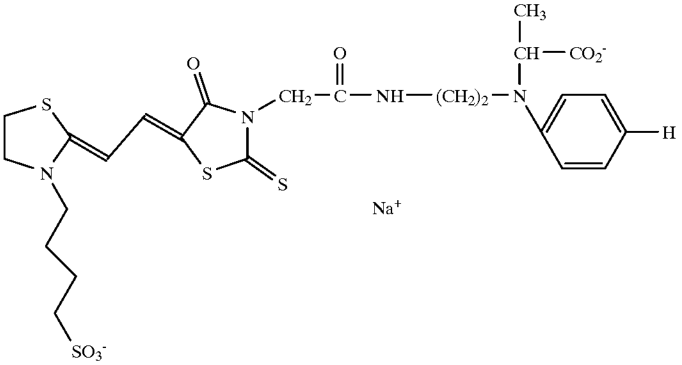
Inv 27
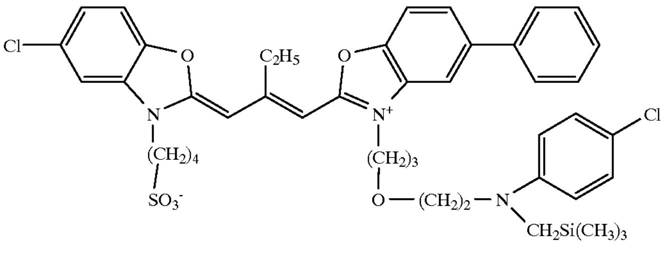
Inv 28
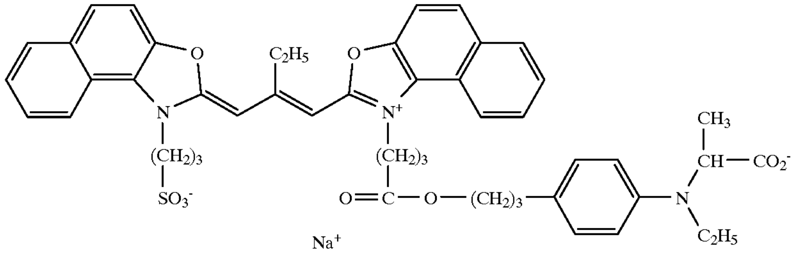

-continued
Inv 29
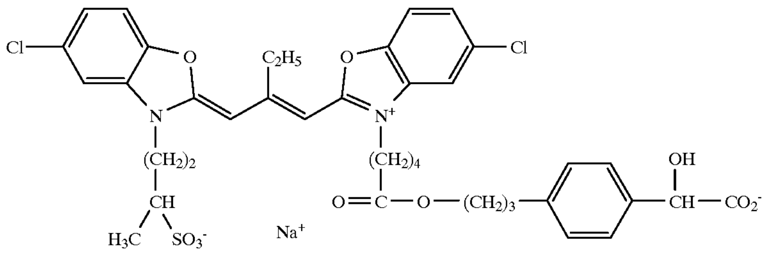
Inv 30
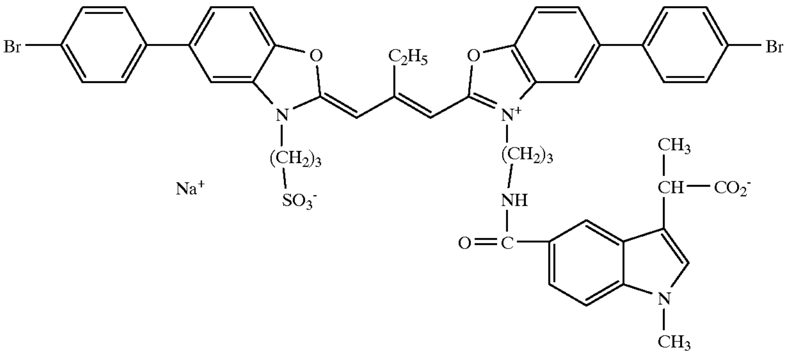
Inv 31
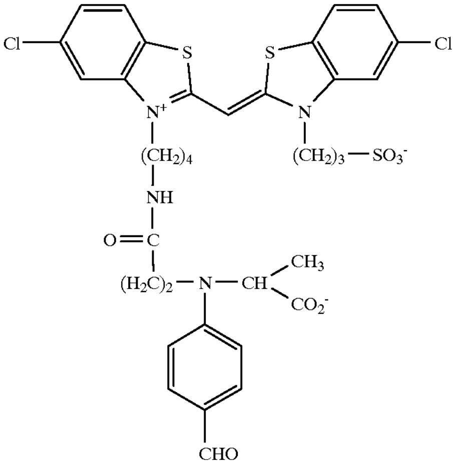
Inv 32
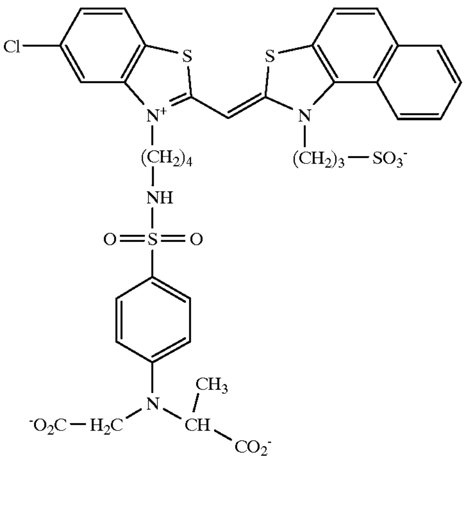

-continued

Inv 33

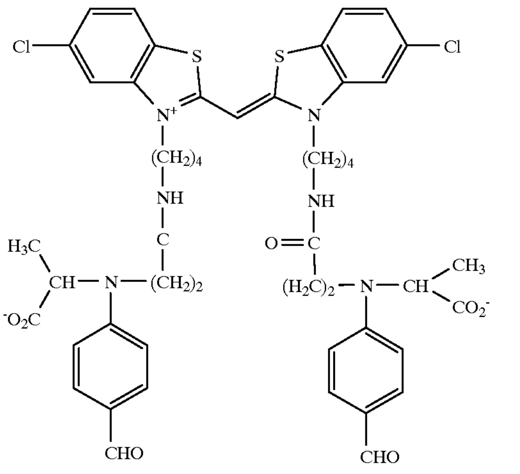

Inv 34

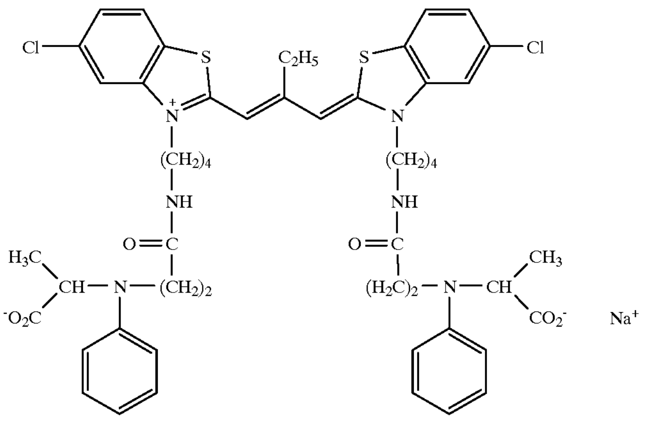

Inv 35

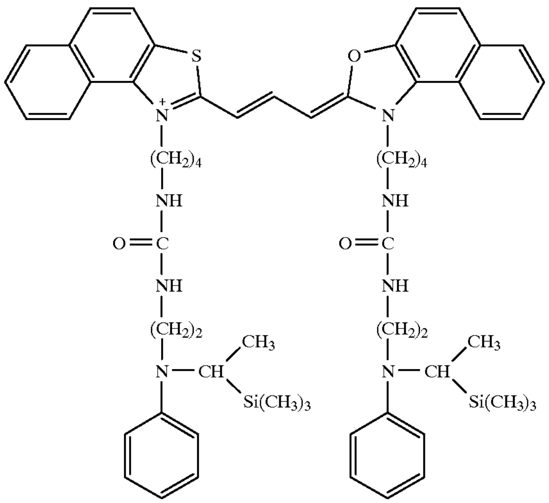

Table D combines electrochemical and laser flash photolysis data for the XY moiety contained in selected fragmentable electron donating sensitizers according to the formula Z-L-XY. Specifically, this Table contains data for $E_1$, the oxidation potential of the parent fragmentable electron donating moiety X-Y; $k_{fr}$, the fragmentation rate of the oxidized X-Y (including $X\text{-}Y^{\bullet+}$); and $E_2$, the oxidation potential of the radical $X^{\bullet}$. In Table D, these characteristic properties of the moiety XY are reported for the model compound where the dye Z and the linking group L have been replaced by an unsubstituted alkyl group. In the actual compounds Z-L-XY, these characteristic properties may vary slightly from the values for the model compounds but will not be greatly perturbed. The data in Table D illustrate Z-L-XY compounds useful in this invention that are fragmentable two-electron donating sensitizers and meet all the three criteria set forth above as well as fragmentable one-electron donating sensitizers useful in this invention that meet the first two criteria, but produce a radical $X^{\bullet}$ having an oxidation potential $E_2$ less negative that −0.7 V.

TABLE D

| Compound | $E_1$ (V) for XY moiety | $k_{fr}$ ($s^{-1}$) for XY moiety | $E_2$ (V) for XY moiety |
|---|---|---|---|
| Inv 8 | 0.22 | $1.1 \times 10^6$ | <−0.9 |
| Inv 9 | 0.34 | $6 \times 10^7$ | <−0.9 |
| Inv 11 | 0.34 | $6 \times 10^7$ | <−0.9 |
| Inv 12 | 0.34 | $6 \times 10^7$ | <−0.9 |
| Inv 10 | 0.43 | $>2 \times 10^7$ | <−0.9 |
| Inv 14 | 0.43 | $>2 \times 10^7$ | <−0.9 |
| Inv 2 | 0.55 | $5.5 \times 10^5$ | <−0.9 |
| Inv 3 | 0.55 | $5.5 \times 10^5$ | <−0.9 |
| Inv 6 | 0.43 | $>2 \times 10^7$ | <−0.9 |
| Inv 15 | 0.57 | $3 \times 10^5$ | >−0.5 |

Some comparative compounds similar to the general formulae given above are also listed below. The XY component on these comparative compounds are present as ethyl esters, and do not fragment, and thereby fail to meet criteria two and three of the invention.

Comp 1

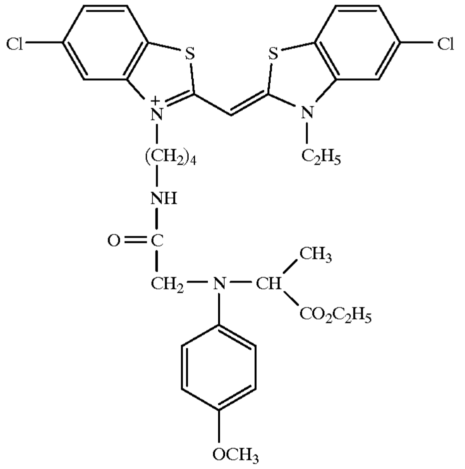

Comp 2

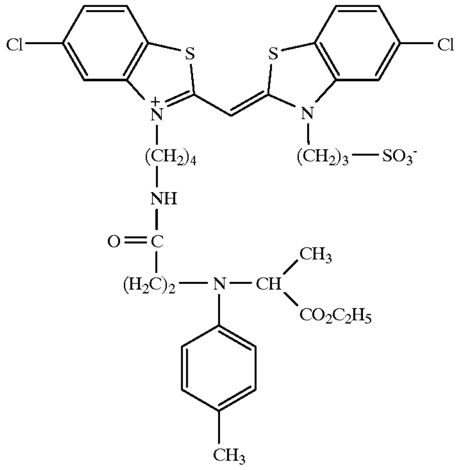

-continued

Comp 3

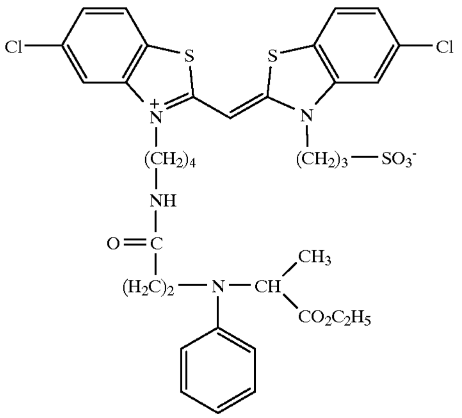

Comp 4

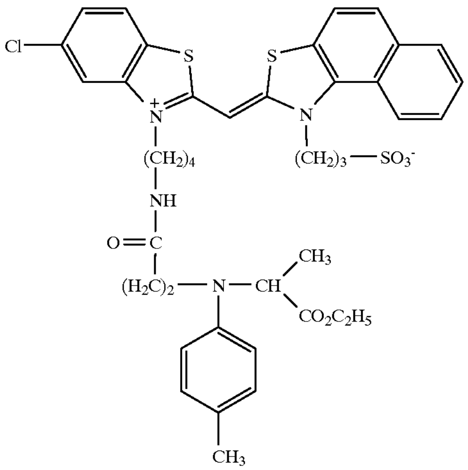

Comp 5

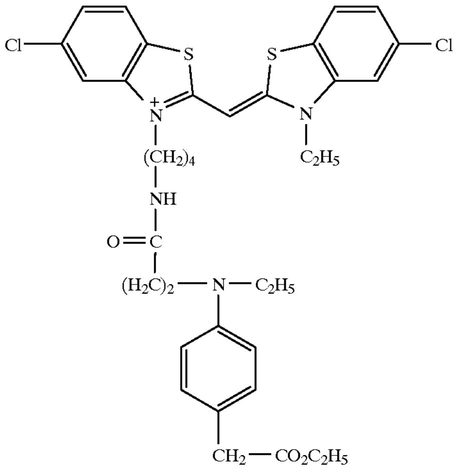

-continued

Comp 6

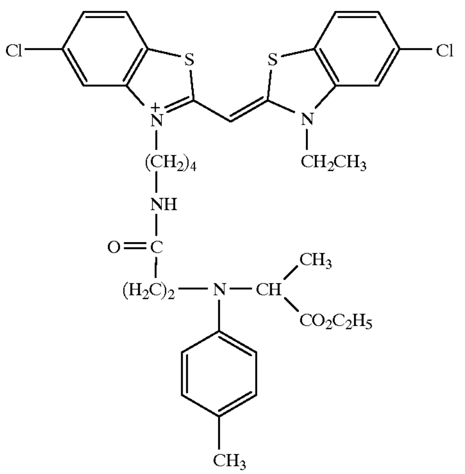

Comp 7

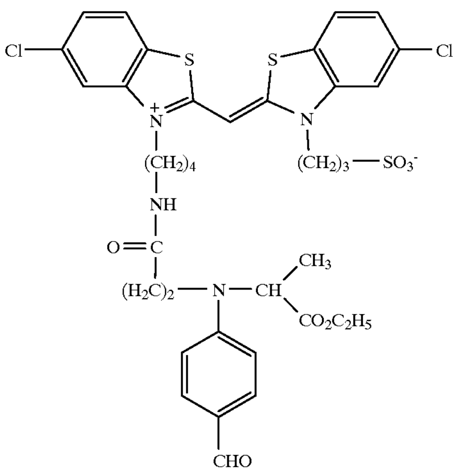

In the above formulae, counterion(s) required to balance the net charge of a Z-L-XY compound are not shown as any counterion can be utilized. Common counterions that can be used include sodium, potassium, triethylammonium ($TEA^+$), tetramethylguanidinium ($TMG^+$), diisopropylammonium ($DIPA^+$), and tetrabutylammonium ($TBA^+$).

The fragmentable electron donors useful in this invention are vastly different from the silver halide adsorptive (one)-electron donors described in U.S. Pat. No. 4,607,006. The electron donating moieties described therein, for example phenothiazine, phenoxazine, carbazole, dibenzophenothiazine, ferrocene, tris(2,2'-bipyridyl) ruthenium, or a triarylamine, are well known for forming extremely stable, i.e., non-fragmentable, radical cations as noted in the following references J. Heterocyclic Chem., vol. 12, 1975, pp 397–399, J. Org. Chem., vol 42, 1977, pp 983–988, "The Encyclopedia of Electrochemistry of the Elements", Vol XIII, pp 25–33, A. J. Bard Editor, published by Marcel Dekker Inc., Advances in Physical Organic Chemistry, vol 20. pp 55–180, V. Gold Editor, 1984, published by Academic Press, N.Y. Also, the electron donating adsorptive compounds of U.S. Pat. No. 4,607,006 donate only one electron per molecule upon oxidation. In a preferred embodiment of the present invention, the fragmentable electron donors are capable of donating two electrons.

These fragmentable electron donors of the present invention also differ from other known photographically active compounds such as R-typing agents, nucleators, and stabilizers. Known R-typing agents, such as Sn complexes, thiourea dioxide, borohydride, ascorbic acid, and amine boranes are very strong reducing agents. These agents typically undergo multi-electron oxidations but have oxidation potentials more negative than 0 V vs SCE. For example the oxidation potential for $SnCl_2$ is reported in CRC Handbook of Chemistry and Physics, 55th edition, CRC Press Inc., Cleveland Ohio 1975, pp D122 to be ~–0.10 V and that for borohydride is reported in J. Electrochem. Soc., 1992, vol. 139, pp 2212–2217 to be –0.48 V vs SCE. These redox characteristics allow for an uncontrolled reduction of silver halide when added to silver halide emulsions, and thus the obtained sensitivity improvements are very often accompanied by undesirable levels of fog. Conventional nucleator compounds such as hydrazines and hydrazides differ from the fragmentable electron donors described herein in that nucleators are usually added to photographic emulsions in an inactive form. Nucleators are transformed into photographically active compounds only when activated in a strongly basic solution, such as a developer solution, wherein the nucleator compound undergoes a deprotonation or hydrolysis reaction to afford a strong reducing agent. In further contrast to the fragmentable electron donors, the oxidation of traditional R-typing agents and nucleator compounds is generally accompanied by a deprotonation reaction or a hydroylsis reaction, as opposed to a bond cleavage reaction.

The emulsion layer of the photographic element of the invention can comprise any one or more of the light sensitive layers of the photographic element. The photographic elements made in accordance with the present invention can be black and white elements, single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 microns. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure*, September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the element or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly-in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g. to adjust levels of interlayer correction) and masking couplers such as those described in EP 213 490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. No. 4,163,669; U.S. Pat. No. 4,865,956; and U.S. Pat. No. 4,923,784 are particularly useful. Also contemplated is the use of nucleating agents, development accelerators or their precursors (UK Patent 2,097,140; U.K. Patent 2,131,188); development inhibitors and their precursors (U.S. Pat. Nos. 5,460,932; U.S. Pat. No. 5,478,711); electron transfer agents (U.S. Pat. Nos. 4,859,578; 4,912, 025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) either as oil-in-water dispersions, latex dispersions or as solid particle dispersions. Additionally, they may be used with "smearing" couplers (e.g. as described in U.S. Pat. No. 4,366,237; EP 096 570; U.S. Pat. Nos. 4,420,556; and 4,543,323.) Also, the couplers may be blocked or coated in protected form as described, for example, in Japanese Application 61/258,249 or U.S. Pat. No. 5,019,492.

The photographic elements may further contain other image-modifying compounds such as "Development Inhibitor-Releasing" compounds (DIR's). Useful additional DIR's for elements of the present invention, are known in the art and examples are described in U.S. Pat. Nos. 3,137, 578; 3,148,022; 3,148,062; 3,227,554; 3,384,657; 3,379, 529; 3,615,506; 3,617,291; 3,620,746; 3,701,783; 3,733, 201; 4,049,455; 4,095,984; 4,126,459; 4,149,886; 4,150, 228; 4,211,562; 4,248,962; 4,259,437; 4,362,878; 4,409, 323; 4,477,563; 4,782,012; 4,962,018; 4,500,634; 4,579, 816; 4,607,004; 4,618,571; 4,678,739; 4,746,600; 4,746, 601; 4,791,049; 4,857,447; 4,865,959; 4,880,342; 4,886, 736; 4,937,179; 4,946,767; 4,948,716; 4,952,485; 4,956, 269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378, 236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906, 559); with ballasted chelating agents such as those in U.S. Pat. No. 4,994,359 to reduce sensitivity to polyvalent cations such as calcium; and with stain reducing compounds such as described in U.S. Pat. Nos. 5,068,171 and 5,096,805. Other compounds which may be useful in the elements of the invention are disclosed in Japanese Published Applications 83-09,959; 83-62,586; 90-072,629, 90-072,630; 90-072, 632; 90-072,633; 90-072,634; 90-077,822; 90-078,229; 90-078,230; 90-079,336; 90-079,338; 90-079,690; 90-079, 691; 90-080,487; 90-080,489; 90-080,490; 90-080,491; 90-080,492; 90-080,494; 90-085,928; 90-086,669; 90-086, 670; 90-087,361; 90-087,362; 90-087,363; 90-087,364; 90-088,096; 90-088,097; 90-093,662; 90-093,663; 90-093, 664; 90-093,665; 90-093,666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like.

The type of silver halide grains preferably include polymorphic, cubic, and octahedral. The grain size of the silver halide may have any distribution known to be useful in photographic compositions, and may be either polydipersed or monodispersed.

Tabular grain silver halide emulsions may also be used. Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t>8, where ECD is the diameter of a circle having an area equal to grain projected area and t is tabular grain thickness; intermediate aspect ratio tabular grain emulsions—i.e., ECD/t=5 to 8; or low aspect ratio tabular grain emulsions—i.e., ECD/t=2 to 5. The emulsions typically exhibit high tabularity (T), where T (i.e., $ECD/t^2$) >25 and ECD and t are both measured in micrometers ($\mu$m). The tabular grains can be of any thickness compatible with achieving an aim average aspect ratio and/or average tabularity of the tabular grain emulsion. Preferably the tabular grains satisfying projected area requirements are those having thicknesses of <0.3 $\mu$m. thin (<0.2 $\mu$m) tabular grains being specifically preferred and ultrathin (<0.07 $\mu$m) tabular grains being contemplated for maximum tabular grain performance enhancements. When the native blue absorption of iodohalide tabular grains is relied upon for blue speed, thicker tabular grains, typically up to 0.5 $\mu$m in thickness, are contemplated.

High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111} major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in *Research Disclosure I*, Section I.B.(3) (page 503).

The silver halide grains to be used in the invention may be prepared according to methods known in the art, such as those described in *Research Disclosure I* and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

In the course of grain precipitation one or more dopants (grain occlusions other than silver and halide) can be introduced to modify grain properties. For example, any of the various conventional dopants disclosed in *Research Disclosure*, Item 36544, Section I. Emulsion grains and their preparation, sub-section G. Grain modifying conditions and adjustments, paragraphs (3), (4) and (5), can be present in the emulsions of the invention. In addition it is specifically contemplated to dope the grains with transition metal hexacoordination complexes containing one or more organic ligands, as taught by Olm et al U.S. Pat. No. 5,360,712, the disclosure of which is here incorporated by reference.

It is specifically contemplated to incorporate in the face centered cubic crystal lattice of the grains a dopant capable of increasing imaging speed by forming a shallow electron trap (hereinafter also referred to as a SET) as discussed in Research Discolosure Item 36736 published November 1994, here incorporated by reference.

The SET dopants are effective at any location within the grains. Generally better results are obtained when the SET dopant is incorporated in the exterior 50 percent of the grain, based on silver. An optimum grain region for SET incorporation is that formed by silver ranging from 50 to 85 percent of total silver forming the grains. The SET can be introduced all at once or run into the reaction vessel over a period of time while grain precipitation is continuing. Generally SET forming dopants are contemplated to be incorporated in concentrations of at least $1\times10^{-7}$ mole per silver mole up to their solubility limit, typically up to about $5\times10^{-4}$ mole per silver mole.

SET dopants are known to be effective to reduce reciprocity failure. In particular the use of iridium hexacoordination complexes or $Ir^{+4}$ complexes as SET dopants is advantageous.

Iridium dopants that are ineffective to provide shallow electron traps (non-SET dopants) can also be incorporated into the grains of the silver halide grain emulsions to reduce reciprocity failure.

To be effective for reciprocity improvement the Ir can be present at any location within the grain structure. A preferred location within the grain structure for Ir dopants to produce reciprocity improvement is in the region of the grains formed after the first 60 percent and before the final 1 percent (most preferably before the final 3 percent) of total silver forming the grains has been precipitated. The dopant can be introduced all at once or run into the reaction vessel over a period of time while grain precipitation is continuing. Generally reciprocity improving non-SET Ir dopants are contemplated to be incorporated at their lowest effective concentrations.

The contrast of the photographic element of can be further increased by doping the grains with a hexacoordination complex containing a nitrosyl or thionitrosyl ligand (NZ dopants) as disclosed in McDugle et al U.S. Pat. No. 4,933,272, the disclosure of which is here incorporated by reference.

The contrast increasing dopants can be incorporated in the grain structure at any convenient location. However, if the NZ dopant is present at the surface of the grain, it can reduce the sensitivity of the grains. It is therefore preferred that the NZ dopants be located in the grain so that they are separated from the grain surface by at least 1 percent (most preferably at least 3 percent) of the total silver precipitated in forming the silver iodochloride grains. Preferred contrast enhancing concentrations of the NZ dopants range from $1\times10^{-11}$ to $4\times10^{-8}$ mole per silver mole, with specifically preferred concentrations being in the range from $10^{-10}$ to $10^{-8}$ mole per silver mole.

Although generally preferred concentration ranges for the various SET, non-SET Ir and NZ dopants have been set out above, it is recognized that specific optimum concentration ranges within these general ranges can be identified for specific applications by routine testing. It is specifically contemplated to employ the SET, non-SET Ir and NZ dopants singly or in combination. For example, grains containing a combination of an SET dopant and a non-SET Ir dopant are specifically contemplated. Similarly SET and NZ dopants can be employed in combination. Also NZ and Ir dopants that are not SET dopants can be employed in combination. Finally, the combination of a non-SET Ir dopant with a SET dopant and an NZ dopant. For this latter three-way combination of dopants it is generally most convenient in terms of precipitation to incorporate the NZ dopant first, followed by the SET dopant, with the non-SET Ir dopant incorporated last.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions.

The silver halide to be used in the invention may be advantageously subjected to chemical sensitization. Compounds and techniques useful for chemical sensitization of silver halide are known in the art and described in *Research Disclosure I* and the references cited therein. Compounds useful as chemical sensitizers, include, for example, active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 4 to 8, and temperatures of from 30 to 80° C., as described in *Research Disclosure I*, Section IV (pages 510–511) and the references cited therein.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in *Research Disclosure I*, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in *Research Disclosure I*, or in T. H. James, editor, *The Theory of the Photographic Process*, 4th Edition, Macmillan, New York, 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are: 4-amino N,N-diethylaniline hydrochloride, 4-amino-3-methyl-N,N-diethylaniline hydrochloride, 4-amino-3-methyl-N-ethyl-N-(β-(methanesulfonamido) ethylaniline sesquisulfate hydrate, 4-amino-3-methyl-N-ethyl-N-(β-hydroxyethyl)aniline sulfate, 4-amino-3-β-(methanesulfonamido)ethyl-N,N-diethylaniline hydrochloride and 4-amino-N-ethyl-N-(2-methoxyethyl)-m-toluidine di-p-toluene sulfonic acid.

Dye images can be formed or amplified by processes which employ in combination with a dye-image-generating reducing agent an inert transition metal-ion complex oxidizing agent, as illustrated by Bissonette U.S. Pat. Nos. 3,748,138, 3,826,652, 3,862,842 and 3,989,526 and Travis U.S. Pat. No. 3,765,891, and/or a peroxide oxidizing agent as illustrated by Matejec U.S. Pat. No. 3,674,490, *Research Disclosure*, Vol. 116, December, 1973, Item 11660, and Bissonette *Research Disclosure*, Vol. 148, August, 1976, Items 14836, 14846 and 14847. The photographic elements can be particularly adapted to form dye images by such processes as illustrated by Dunn et al U.S. Pat. No. 3,822,129, Bissonette U.S. Pat. Nos. 3,834,907 and 3,902,905, Bissonette et al U.S. Pat. No. 3,847,619, Mowrey U.S. Pat. No. 3,904,413, Hirai et al U.S. Pat. No. 4,880,725, Iwano U.S. Pat. No. 4,954,425, Marsden et al U.S. Pat. No. 4,983,504, Evans et al U.S. Pat. No. 5,246,822, Twist U.S. Pat. No. No. 5,324,624, Fyson EPO 0 487 616, Tannahill et al WO 90/13059, Marsden et al WO 90/13061, Grimsey et al WO 91/16666, Fyson WO 91/17479, Marsden et al WO 92/01972. Tannahill WO 92/05471, Henson WO 92/07299, Twist WO 93/01524 and WO 93/11460 and Wingender et al German OLS 4,211,460.

Development is followed by bleachfixing, to remove silver or silver halide, washing and drying.

The fragmentable electron donating sensitizer compounds of the present invention can be included in a silver halide emulsion by direct dispersion in the emulsion, or they may be dissolved in a solvent such as water, methanol or ethanol for example, or in a mixture of such solvents, and the resulting solution can be added to the emulsion. The compounds of the present invention may also be added from solutions containing a base and/or surfactants, or may be incorporated into aqueous slurries or gelatin dispersions and then added to the emulsion. The compounds are generally used together with conventional sensitizing dye, and can be added before, during or after the addition of the conventional sensitizing dye.

The amount of fragmentable electron donating compound which is employed in this invention may range from as little as $1\times10^{-8}$ to as much as about $2\times10^{-3}$ mole per mole of silver in an emulsion layer. More preferably the concentration of the compounds is from about $5\times10^{-7}$ to about $2\times10^{-4}$ mole per mole of silver in an emulsion layer. Where the oxidation potential $E_1$ for the XY group of the fragmentable two-electron donating sensitizer is a relatively low potential, it is more active, and relatively less agent need be employed.

Conversely, where the oxidation potential for the XY group of the fragmentable two-electron donating sensitizer is relatively high, a larger amount thereof, per mole of silver, is employed. For fragmentable one-electron donating sensitizers relatively larger amounts per mole of silver are also employed.

Conventional spectral sensitizing dyes can be used in combination with the fragmentable electron donating spectral sensitizing agent of the present invention, including cyanine dyes, complex cyanine dyes, merocyanine dyes, complex merocyanine dyes, styryl dyes, oxonol dyes, hemioxonol dyes, and hemicyanine dyes. Preferrably the conventional spectral sensitizing dye is a compound of the formulae VIII–XII set forth above. The ratio of conventional spectral sensitizing dye to the fragmentable electron donating sensitizing agent of the present invention, which may be determined through an ordinary emulsion test, is typically from about 99.95:0.05 to about 90:10 by mol.

Various compounds may be added to the photographic material of the present invention for the purpose of lowering the fogging of the material during manufacture, storage, or processing. Typical antifoggants are discussed in Section VI of Research Disclosure I, for example tetraazaindenes, mercaptotetrazoles, polyhydroxybenzenes, hydroxyaminobenzenes, combinations of a thiosulfonate and a sulfinate, and the like.

For this invention, polyhydroxybenzene and hydroxyaminobenzene compounds (hereinafter "hydroxybenzene compounds") are preferred as they are effective for lowering fog without decreasing the emulsion sensitvity. Examples of hydroxybenzene compounds are:

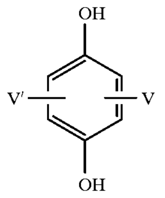

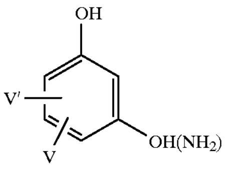

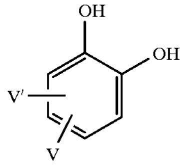

In these formulae, V and V' each independently represent —H, —OH, a halogen atom, —OM (M is alkali metal ion), an alkyl group, a phenyl group, an amino group, a carbonyl group, a sulfone group, a sulfonated phenyl group, a sulfonated alkyl group, a sulfonated amino group, a carboxyphenyl group, a carboxyalkyl group, a carboxyamino group, a hydroxyphenyl group, a hydroxyalkyl group, an alkylether group, an alkylphenyl group, an alkylthioether group, or a phenylthioether group.

More preferably, they each independently represent —H, —OH, —Cl, —Br, —COOH, —$CH_2CH_2COOH$, —$CH_3$, —$CH_2CH_3$, —$C(CH_3)_3$, —$OCH_3$, —CHO, —$SO_3K$,— $SO_3Na$, —$SO_3H$, $SCH_3$, or —phenyl.

Especially preferred hydroxybenzene compounds follow:

HB1

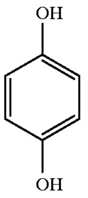

HB2

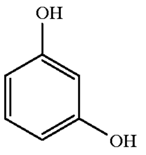

HB3

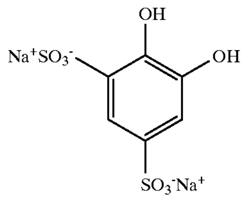

HB4

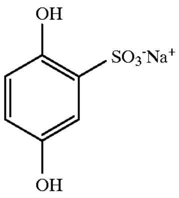

HB5

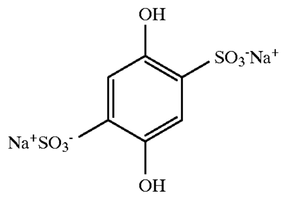

HB6

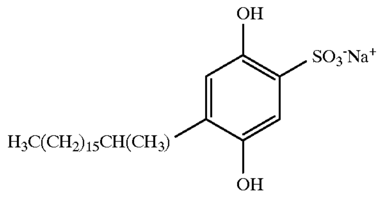

HB7

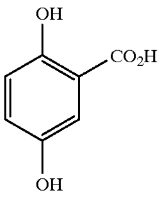

-continued

HB8

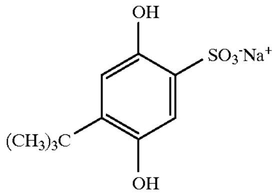

HB9

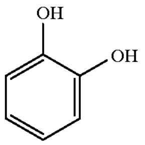

HB10

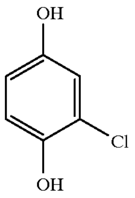

HB11

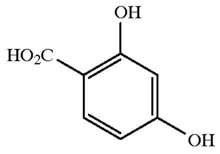

HB12

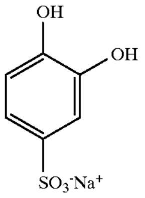

HB13

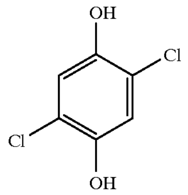

HB14

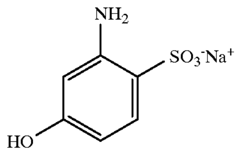

HB15

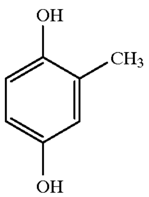

Hydroxybenzene compounds may be added to the emulsion layers or any other layer constituting the photographic material of the present invention. The preferred amount added is from $1\times10^{-3}$ to $1\times10^{-1}$ mol, and more preferred is $1\times10^{-3}$ to $2\times10^{-2}$ mol, per mol of silver halide.

Laser Flash Photolysis Method (a) Oxidation Potential of Radical $X^{\bullet}$

The laser flash photolysis measurements were performed using a nanosecond pulsed excimer (Questek model 2620, 308 nm, ca. 20 ns, ca. 100 mJ) pumped dye laser (Lambda Physik model FL 3002). The laser dye was DPS (commercially available from Exciton Co.) in p-dioxane (410 nm, ca. 20 ns, ca. 10 mJ). The analyzing light source was a pulsed 150W xenon arc lamp (Osram XBO 150/W). The arc lamp power supply was a PRA model 302 and the pulser was a PRA model M-306. The pulser increased the light output by ca. 100 fold, for a time period of ca. 2–3 ms. The analyzing light was focussed through a small aperture (ca. 1.5 mm) in a cell holder designed to hold 1 $cm^2$ cuvettes. The laser and analyzing beams irradiated the cell from opposite directions and crossed at a narrow angle (ca. 15°). After leaving the cell, the analyzing light was collimated and focussed onto the slit (1 mm, 4 nm bandpass) of an ISA H-20 monochromator. The light was detected using 5 dynodes of a Hamamatsu model R446 photomultiplier. The output of the photomultiplier tube was terminated into 50 ohm, and captured using a Tektronix DSA-602 digital oscilloscope. The entire experiment is controlled from a personal computer.

The experiments were performed either in acetonitrile, or a mixture of 80% acetonitrile and 20% water. The first singlet excited state of a cyanoanthracene (A), which acted as the electron acceptor, was produced using the nanosecond laser pulse at 410 nm. Quenching of this excited state by electron transfer from the relatively high oxidation potential donor biphenyl (B), resulted in efficient formation of separated, "free", radical ions in solution, $A^{\bullet -}+B^{\bullet +}$. Secondary electron transfer then occurred between $B^{\bullet +}$ and the lower oxidation potential electron donor X-Y, to generate $X\text{-}Y^{\bullet +}$ in high yield. For the investigations of the oxidation potentials of the radicals $X^{\bullet}$, typically the cyanoanthrancene concentration was ca. $2\times10^{-5}$ M to $10^{-4}$ M, the biphenyl concentration was ca. 0.1 M. The concentration of the X-Y donor was ca. $10^{-3}$ M. The rates of the electron transfer reactions are determined by the concentrations of the substrates. The concentrations used ensured that the $A^{\bullet -}$ and the $X\text{-}Y^{\bullet +}$ were generated within 100 ns of the laser pulse. The radical ions could be observed directly by means of their visible absorption spectra. The kinetics of the photogenerated radical ions were monitored by observation of the changes in optical density at the appropriate wavelengths.

The reduction potential ($E_{red}$) of 9,10-dicyanoanthracene (DCA) is −0.91 V. In a typical experiment, DCA is excited and the initial photoinduced electron transfer from the biphenyl (B) to the DCA forms a $DCA^{\bullet -}$, which is observed at its characteristic absorption maximum ($\lambda_{obs}$=705 nm), within ca. 20 ns of the laser pulse. Rapid secondary electron transfer occurs from X-Y to $B^{\bullet +}$ to generate $X\text{-}Y^{\bullet +}$, which fragments to give $X^{\bullet}$. A growth in absorption is then observed at 705 nm with a time constant of ca. 1 microsecond, due to reduction of a second DCA by the $X^{\bullet}$. The absorption signal with the microsecond growth time is equal to the size of the absorption signal formed within 20 ns. If reduction of two DCA was observed in such an experiment, this indicates that the oxidation potential of the $X^{\bullet}$ is more negative than −0.9 V.

If the oxidation potential of $X^{\bullet}$ is not sufficiently negative to reduce DCA, an estimate of its oxidation potential was obtained by using other cyanoanthracenes as acceptors. Experiments were performed in an identical manner to that described above except that 2,9,10-tricyanoanthracene (TriCA, $E_{red}$ −0.67 V, $\lambda_{obs}$=710 nm) or tetracyanoanthracene (TCA, $E_{red}$ −0.44 V, $\lambda_{obs}$=715 nm) were used as the electron acceptors. The oxidation potential of the $X^{\bullet}$ was taken to be more negative than −0.7 if reduction of two TriCA was observed, and more negative than −0.5 V if reduction of two TCA was observed. Occasionally the size of the signal from the second reduced acceptor was smaller than that of the first. This was taken to indicate that electron transfer from the $X^{\bullet}$ to the acceptor was barely exothermic, i.e. the oxidation potential of the radical was essentially the same as the reduction potential of the acceptor.

To estimate the oxidation potentials of $X^{\bullet}$ with values less negative than −0.5 V, i.e. not low enough to reduce even tetracyanoanthracene, a slightly different approach was used. In the presence of low concentrations of an additional acceptor, Q, that has a less negative reduction potential than the primary acceptor, A (DCA, for example), secondary electron transfer from $A^{\bullet -}$ to Q will take place. If the reduction potential of Q is also less negative than the oxidation potential of the $X^{\bullet}$, then Q will also be reduced by the radical, and the magnitude of the $Q^{\bullet -}$ absorption signal will be doubled. In this case, both the first and the second electron transfer reactions are diffusion controlled and occur at the same rate. Consequently, the second reduction cannot be time resolved from the first. Therefore, to determine whether two electron reduction actually takes place, the $Q^{\bullet -}$ signal size must be compared with an analogous system for which it is known that reduction of only a single Q occurs. For example, a reactive X-$Y^{\bullet +}$ which might give a reducing $X^{\bullet}$ can be compared with a nonreactive X-$Y^{\bullet +}$. Useful secondary electron acceptors (Q) that have been used are chlorobenzoquinone ($E_{red}$ −0.34 V, $\lambda_{obs}$=450 nm), 2,5-dichlorobenzoquinone ($E_{red}$ −0.18 V, $\lambda_{obs}$=455 nm) and 2,3,5,6-tetrachlorobenzoquinone ($E_{red}$ 0.00 V, $\lambda_{obs}$=460 nm). (b) Fragmentation Rate Constant Determination The laser flash photolysis technique was also used to determine fragmentation rate constants for examples of the oxidized donors X-Y. The radical cations of the X-Y donors absorb in the visible region of the spectrum. Spectra of related compounds can be found in "Electron Absorption Spectra of Radical Ions" by T. Shida, Elsevier, New York, 1988. These absorptions were used to determine the kinetics of the fragmentation reactions of the radical cations of the X-Y. Excitation of 9,10-dicyanoanthracene (DCA) in the presence of biphenyl and the X-Y donor, as described above, results in the formation of the $DCA^{\bullet -}$ and the X-$Y^{\bullet +}$. By using a concentration of X-Y of ca. $10^{-2}$ M, the X-$Y^{\bullet +}$ can be formed within ca. 20 ns of the laser pulse. With the monitoring wavelength set within an absorption band of the X-$Y^{\bullet +}$, a decay in absorbance as a function of time is observed due to the fragmentation reaction. The monitoring wavelengths used were somewhat different for the different donors, but were mostly around 470–530 nm. In general the $DCA^{\bullet -}$ also absorbed at the monitoring wavelengths, however, the signal due to the radical anion was generally much weaker than that due to the radical cation, and on the timescale of the experiment the $A^{\bullet -}$ did not decay, and so did not contribute to the observed kinetics. As the X-$Y^{\bullet +}$ decayed, the radical $X^{\bullet}$ was formed, which in most cases reacted with the cyanoanthracene to form a second $A^{\bullet -}$. To make sure that this "grow-in" of absorbance due to $A^{\bullet -}$ did not interfere with the time-resolved decay measurements, the concentration of the cyanoanthracene was maintained below ca. $2\times10^{-5}$ M. At this concentration the second reduction reaction occurred on a much slower timescale than the X-$Y^{\bullet +}$ decay. Alternatively, when the decay rate of the X-$Y^{\bullet +}$ was less than $10^{6}$ $s^{-1}$, the solutions were purged with oxygen. Under these conditions the $DCA^{\bullet -}$ reacted with the oxygen to form $O_2^{\bullet -}$ within 100 ns, so that its absorbance did not interfere with that of the X-$Y^{\bullet +}$ on the timescale of its decay.

The experiments measuring the fragmentation rate constants were performed in acetonitrile with the addition of 20% water, so that all of the salts could be easily solubilized. Most experiments were performed at room temperature. In some cases the fragmentation rate was either too fast or too slow to be easily determined at room temperature. When this happened, the fragmentation rate constants were measured as a function of temperature, and the rate constant at room temperature determined by extrapolation.

Typical examples of synthesis of compounds Z-L-XY follow. Other compounds can also be synthesized by analogy using appropriate selected known starting materials. The following compounds are synthesized by reaction Scheme I, II and III.

Scheme I

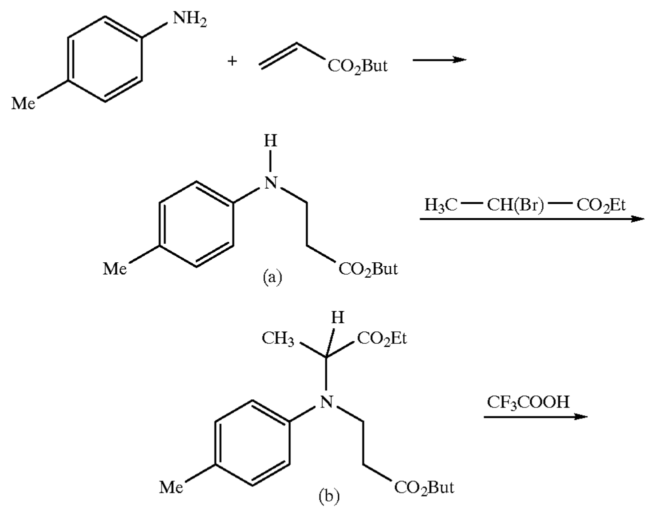

-continued
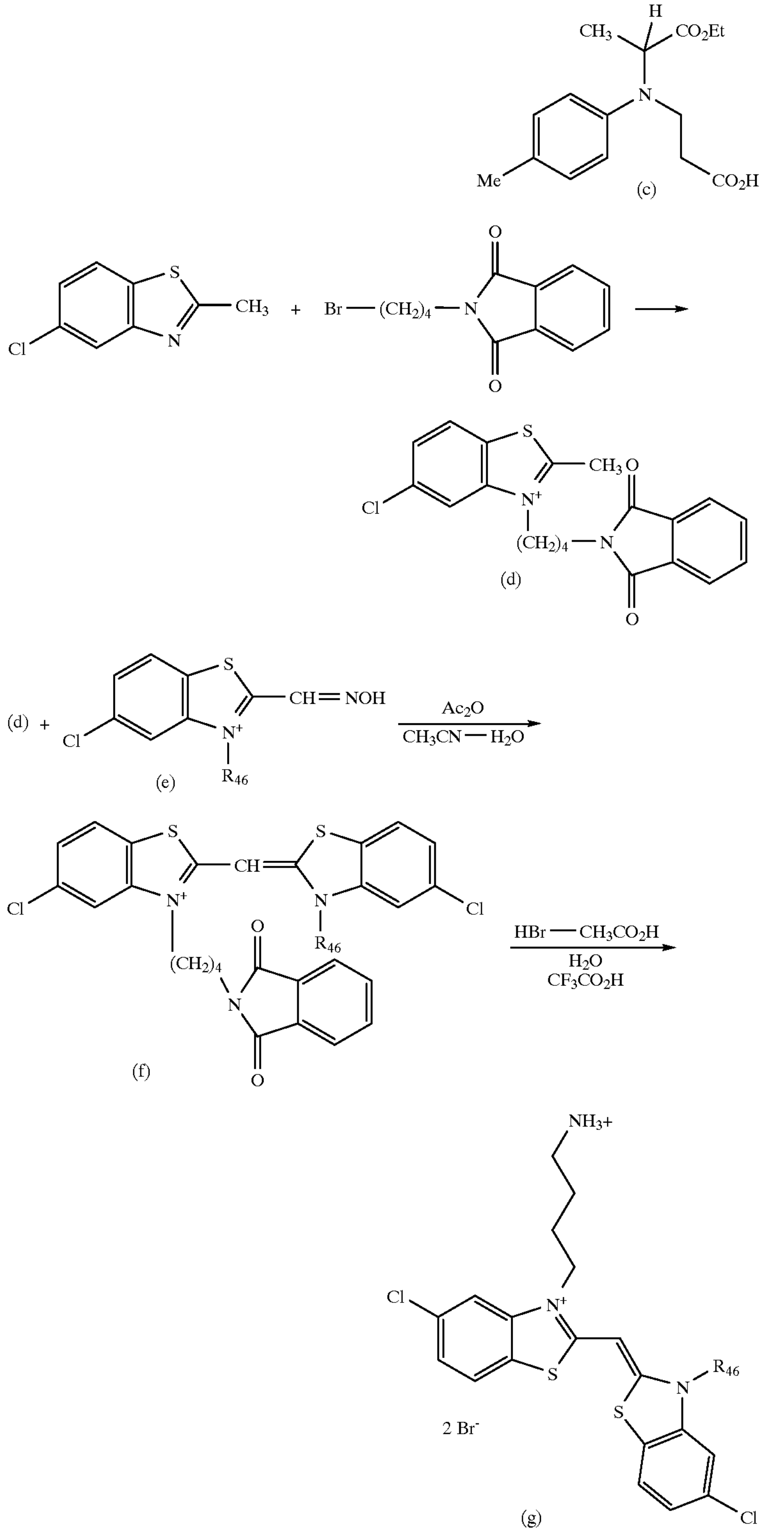
(c) (d) (e) (f) (g)

-continued

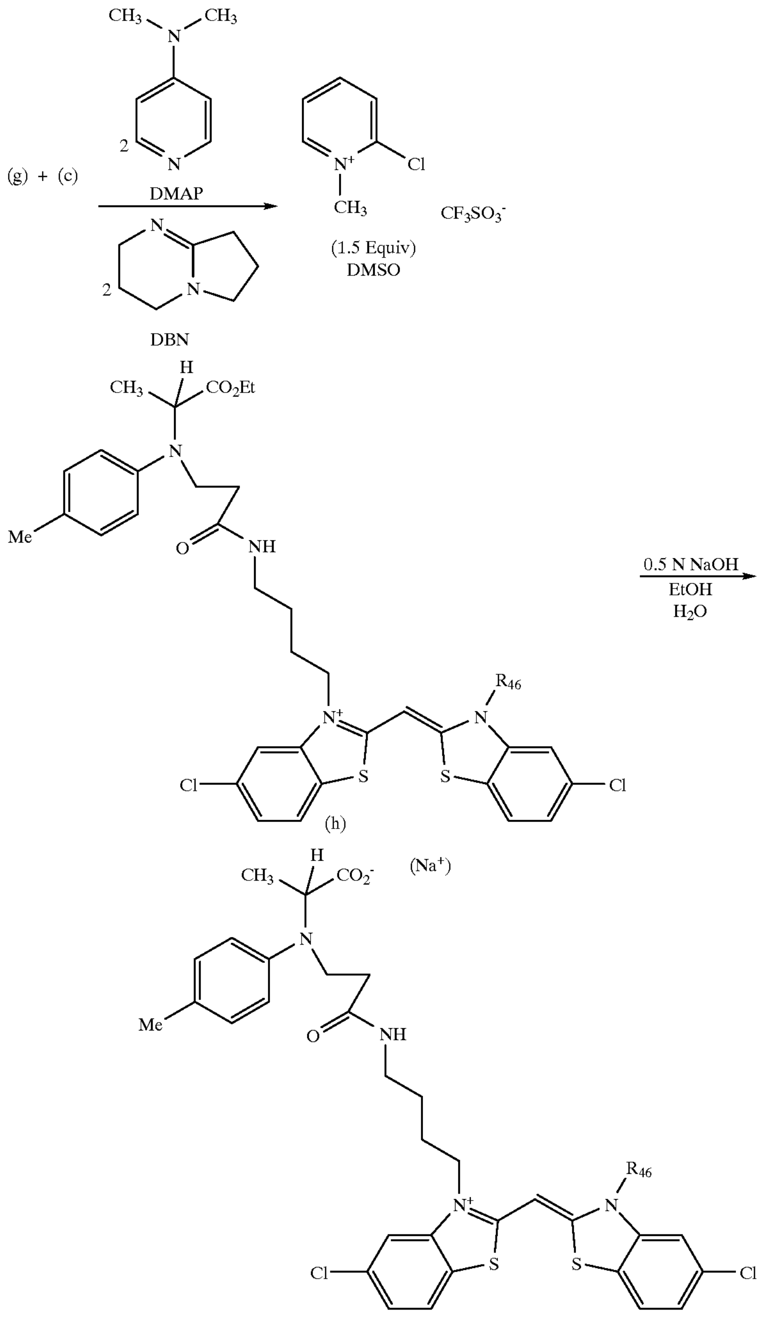

wherein $R_{46}$ is $CH_2CH_3$ or $(CH_2)_3SO_3$—.

Preparation Intermediate (c)

To 21 g of p-toluidine in 25 ml of toluene was added 1 equiv of t-butyl acrylate. The mixture was allowed to react for 40 hr at reflux and the monoalkylated product was isolated by vacuum distillation to give 33 g (70%) of (a), b.p. 120–150° C./1–2.5 mm. To 116 g of (a) in 600 ml of butyronitrile was added 2 equiv. of $K_2CO_3$ and 2 equiv of ethyl-2-bromoproprionate and the mixture was heated to reflux and held for 16 h., from which 116 g (60%) of compound (b) was isolated by distillation, b.p. 145–170° C./0.5–0.7 mm. To 5.36 g of the t-butyl ester compound (b) was added 6 ml of trifluoroacetic acid (TFA) and the resulting solution was kept over night at room temperature. Excess TFA was removed to give 5 g of compound (c) as the residue. $^1H$-NMR, and field desorption mass-spectrometric (FDMS) measurements were consistent with the proposed structure. Analysis Results: FDMS; m/e 279 ($M^+$) for $C_{15}H_{21}NO_4$; $^1H$-NMR ($CDCl_3$): δ 1.22 (t, 3H), 1.49 (d, 3H), 2.36 (s, 3H), 2.55 (m, 2H), 3.86 (t, 2H), 4.19 (q, 2H), 4.40 (q, 1H), 7.28 (m, 4H), 9.29 (s, 1H). Compounds analogous to intermediate (c) can be synthesized by using appropriate p-substituted anilines as a starting material.

Preparation of Aminoalkylsubstituted Cyanine Dye Intermediate (g)

A mixture of N-(4-bromobutyl) phathalimide (5.64 g, 0.02 mole) and 5-chloro-2-methylbenzothiazole (3.86 g, 0.002 mole) was taken in a sealed tube and heated in an oil bath at 150–160° C. under magnetic stirring for 20 hr. The residue was triturated with ethyl acetate. The light brown solid material (d) was collected on a sintered glass funnel, washed thoroughly with ethyl acetate and air-dried. Yield of (d) was 4.7 g (50.05%). Other quarternary salts were prepared in the same way. The quaternary salt (0.01 mole) and an oxime of general formula (e) (0.01 mole) were mechanically stirred in acetonitrile (400 mL) at room temperature. Distilled water (140 mL) was added slowly to make the reaction mixture a homogeneous solution. Acetic anhydride (3.0 mL) was added, and the mixture was stirred for 5 min. Then triethylamine (8.0 mL) was added, and the reaction mixture changed to a light brown homogeneous solution. The phthalimidocyanine dye (f) started to precipitate after 15–20 min. The reaction mixture was stirred for another 2.5 hr. The gelatinous dark yellow precipitate of (f) was collected on a sintered glass funnel, thoroughly washed with acetone, air-dried, and purified by flash column chromatography. The phthalimidocyanine dye (f) (0.00186 mole), 50 mL of 31% HBr/acetic acid, and 20 mL of 49% $HBr/H_2O$ were placed together with a magnetic stirring bar in a reaction tube. Trifluoroacetic acid (TFA, 15 mL) was slowly added and the reaction mixture was heated in an oil bath at 140° C. with stirring for 48–60 hr., then allowed to cool to 30–35° C. The solvent was removed on a rotary evaporator under vacuum. The thick yellow residue was diluted with 150 mL of reagent grade acetone and agitated with a glass rod. The resulting solid, intermediate (g), was collected on a sintered glass funnel, washed successively with acetone (2×100 mL) and ether (2×100 mL), and air-dried for 2–3 hr. The product (g) was purified by column chromatography or recrystallization.

Preparation of Comp 6

A mixture of 1.3 g (2.2 mmol) of Dye (g) (g, $R_{46}$=Et), 1.07 g (4 equivalents) of 4-N,N-dimethylaminopyridine and 540 mg (2 equiv) of 1,5-diazobicyclo[4.3.0]non-5-ene (DBN) in 40 mL of dimethylsulfoxide (dried in 3A molecular sieve prior to use) was sonicated until a solution was obtained. To this solution was added 1 g (3.6 mmol) of the crude compound (c) followed by 1 g (2 equiv) of 2-chloro-N-methylpyridinium triflate and the reaction mixture was allowed to stir overnight at room temperature. Addition of 200 mL of water precipitated a yellow dye which was filtered, washed thoroughly with water and dried in air to give about 3.18 g of the crude Comp 6. This material was saponified without further purification.FAB Mass: m/e 697 ($M^+$ for $C_{35}H_{23}Cl_2N_4O_3S_2^+$) and 149 ($M^-$ for $CF_3SO_3^-$); Characteristic peaks of $^1$H-NMR (DMSO-$d_6$): d 0.99 (t J=7 Hz, 3H), 1.21 (d J=7 Hz, 3H), 1.99 (s, 3H), 6.41 (d J=8.4 Hz, 2H), 6.50 (s, 1H), 6.75 (d J=8.3 Hz, 2H), 7.39 (d J=8.5 Hz, 2H), 7.80 (s, 1H), 7.86 (s, 1H), 7.97 (d J=4.5 Hz, 2H), 8.0 (d J=4.3 Hz, 2H), 8.02 (s, 1H)

Preparation of Inv 13

1.57 g of the crude Comp 6 was saponified with 75 mL of 1N NaOH in 125 mL of methanol at room temperature for 2 h. Excess methanol was removed on a rotary evaporator at about 30° C. until solid started to appear. To the residue was added 200 mL of water and some brine. The precipitated dye was filtered and washed thoroughly with water, dried in vacuum to give 0.47 g of the crude product. This product was purified by washing with chloroform and the insoluble solid was recrystallized from ethanol to give 140 mg of pure Inv 13. $^1$H-NMR, and mass spectrometric measurements were consistent with the proposed structure. FAB mass spectrum: m/e 669 ($MH^+$ for $C_{33}H_{19}Cl_2N_4O_3S_2^+$)

Synthesis Example 2

The compound Comp 2 and Inv 11 were prepared as in synthesis example 1, scheme I, using the dye intermediate (g) where $R_{46}$ is a 3-sulfopropyl group.

Preparation of Comp 2

A mixture of 2.1 g (3.46 mmol) of intermediate (g) where $R_{46}$ is a 3-sulfopropyl group, 1.3 g (3 equiv) of 4-(dimethylamino)pyridine and 540 mg (2 equiv) of DBN in 40 mL of dimethylsulfoxide (dried in 3A molecular sieve prior to use) was sonicated and then added to this mixture was 1.46 g (5.2 mmol) of the crude compound (c) and 1.67 g (2 equiv) of 2-chloro-N-methylpyridinium triflate. After allowing the mixture to react for 12 h at room temperature, 300 mL of water was added to give a yellow precipitate, which was filtered, washed thoroughly with water and dried in air to give about 2.15 g of the crude product. Purification was achieved by recrystallization from ethanol to give 2 g of yellow Comp 2. FAB Mass: m/e 805 ($M^+$ for $C_{37}H_{26}Cl_2N_4O_6S_3^{+}$) and 804 ($M^-$ for $C_{37}H_{25}Cl_2N_4O_6S_3^-$); Characteristic peaks of $^1$H-NMR ($CDCl_3$) are: δ 1.12 (t J=7.1 Hz, 3H), 1.23 (t J=7 Hz, 3H) 1.43 (d J=7.1 Hz, 3H), 2.11 (s, 3H), 3.71 (q J=7 Hz, 2H), 3.97 (q J=7.1 Hz, 2H), 6.58 (d J=8.1 Hz, 2H), 6.87 (d J=8.3 Hz, 2H), 7.35 (s, 1H), 7.40 (d J=9.7 Hz, 2H), 7.43 (d J=12.5 Hz, 2H), 7.52 (s, 1H), 7.72 (d J=9 Hz, 2H), 7.75 (d J=9 Hz, 2H), 7.84 (broad t , 1H, NH). The protons in aromatic region are better characterized by $^1$H-NMR in DMSO-$d_6$: d 6.34 (d J=8.3 Hz, 2H), 6.61 (d J=8.2 Hz, 2H), 6.77 (s, 1H), 7.23 (d J=8.4 Hz, 1H), 7.32 (d J=8.9 Hz, 1H), 7.74 (s, 1H), 7.80 (s, 1H), 7.84 (d J=8.5 Hz, 1H), 7.92 (d J=8.5 Hz, 1H), 8.0 (broad t, 1H, NH).

Preparation of Inv 11

Comp 2 (600 mg) was saponified with 32 mL of 0.25N NaOH in 80 mL of methanol at room temperature. The reaction was carefully monitored by HPLC analysis until all the dye ester was hydrolyzed. Excess NaOH was neutralized with 5N HCl added dropwise until the final pH was about 7–8. Most of the methanol was removed on a rotary evaporator at about 30°–35° C. until solid started to appear. The crude product was filtered and washed with brine and dried giving a total of 630 mg of yellow material. This was dissolved in 10–15 mL of methanol containing acetonitrile and methanol to yield 130 mg of the pure Inv 11. Analysis Results: FAB mass spectrum: m/e 777 ($MH_2^+$ for $C_{35}H_{21}Cl_2N_4O_6S_3$+$2H^+$), 799 ($MH^+Na^+$ for $C_{35}H_{21}Cl_2N_4O_6S_3$+$H^+$+$Na^+$); Characteristic peaks of $^1$H-NMR ($CD_3OD$) are: d 1.26 (d J=7.4 Hz, 3H), 3.49 (q J=6.1 Hz, 2H), 4.01 (q J=7.1 Hz, 1H), 6.53 (d J=7.6 Hz, 2H), 6.70 (d J=8.1 Hz, 2H), 6.90 (s, 1H), 7.3 (d,d J=8.3; 1.6 Hz, 1H) 7.39 (d,d J=8.2; 1.2 Hz, 1H), 7.68 (d, J=1.1 Hz, 1H), 7.78 (broad s, 1H), 7.81 (d J=8.5 Hz, 1H), 7.91 (d J=8.5 Hz, 1H).

Synthesis Example 3

The compound Comp 5 and Inv 15 were prepared as in synthesis example 1 using ethyl p-aminophenylacetate as a starting material and using ethyl iodide in place of ethyl-2-bromoproprionate for the preparation of intermediate (b), and using dye intermediate (g) where $R_{46}$ is an ethyl group. This synthesis is outlined in Scheme II.

SCHEME II
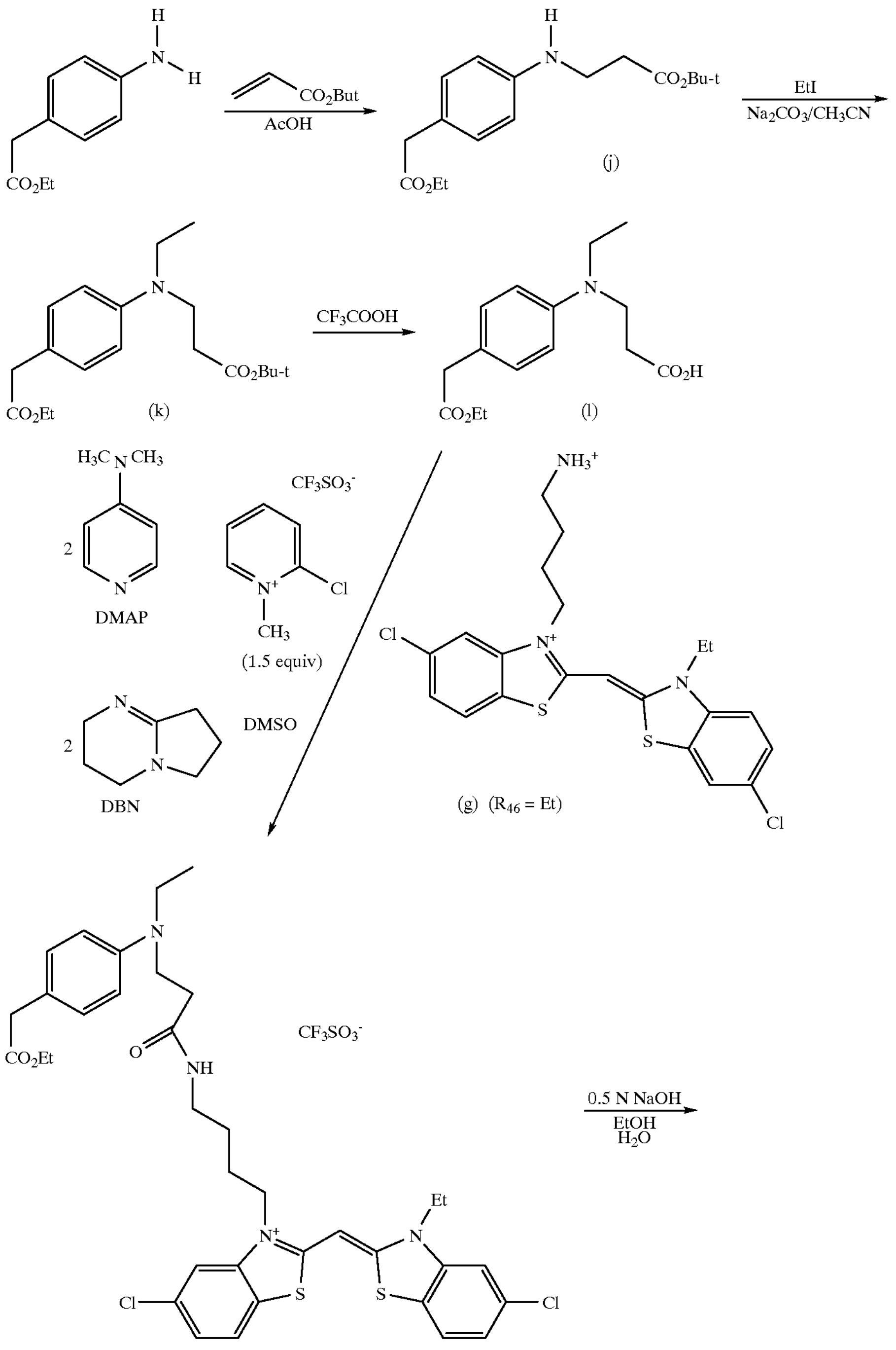
COMP 5

-continued

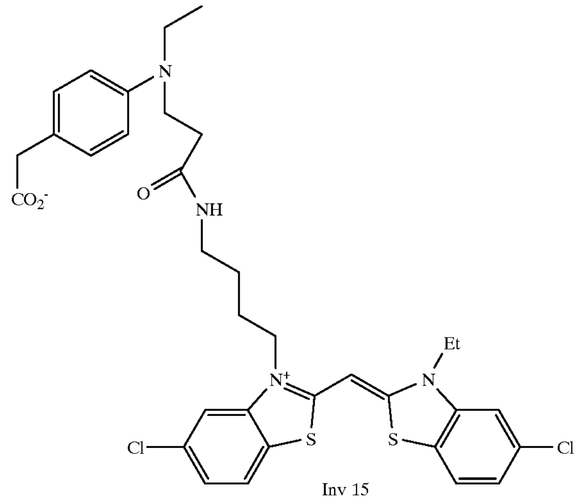

Inv 15

Preparation of Comp 5 (Scheme II)

A solution of 5 g (27.9 mmol) of ethyl p-aminophenylacetate in 20 mL of acetic acid was added 4.9 mL of t-butyl acrylate. The mixture was heated in an oil bath of 110–5° C. for 3–4 h. It was poured into water, extracted with ether, dried by the addition of $MgSO_4$, and rotavaporated to give 7.5 g of crude intermediate (j). A mixture of 3.8 g of intermediate (i), 3 mL of ethyl iodide, and 2.5 g of anhydrous $K_2CO_3$ in 50 mL of acetonitrile was refluxed for 15 h. It was then poured into water and extracted with ether. The organic phase was separated, dried ($MgSO_4$) and rotavaporated to give 2.4 g of a dark oil. Purification was accomplished by dissolving in methylene chloride and passing through a 1"x3" column of silica gel (32–63 micron). The eluent was rotavaporated to give 21.5 g of pure intermediate (k) as a colorless oil. 5 mL of trifluroracetic acid TFA was added to the oil and the solution was kept at room temperature overnight. Excess TFA was rotavaporated and the residue was dried under high vacuum (0.1 mm) to give 2.7 g of intermediate (1).

A mixture of 650 mg (0.5 eq) of Dye (g) where $R_{46}$=ethyl, 390 mg of DMAP, 265 mg of DEN, and 300 mg of intermediate (1) in 30 mL of DMSO was stirred until a solution was obtained. To this was added 390 mg (1.5 equiv) of 2-chloro-N-methylpyridinium triflate and the reaction mixture was allowed to stir overnight at room temperature. The mixuture was poured into 150 mL of water and 1000 mL of brine which precipitated a finely suspended solid. The emulsion-like mixture was allowed to stand overnight to allow the solid to coaggulate and settle down at the bottom of the beaker. It was then filtered readily and evaporated to dryness. Purification was accomplished by flash chromatography over a 1"x5" silica gel (32–63 m) column packed in methylene chloride/isopropanol (7/1 v/v) to give 200 mg of pure Comp 5. FAB mass spectrum: m/e 711 ($M^+$ for $C_{36}H_{41}Cl_2N_4O_3S_2^+$) and m/e 149 ($M^-$ for $CF_3SO_3^-$); characteristic peaks of $^1$H-NMR(DMSO-$d_6$): d 0.96 (t J=7 Hz, 3H), 1.14 (t J=7.1 Hz, 3H, 1.34 (t J=7 Hz, 3H),1.61 (t, 2H), 1.73 (m, 4H), 1.94 (m, 1H), 2.06 (m, 1H), 3.23 (m, 4H), 3.34 (s, 2H), 3.48 (t J=7 Hz, 2H), 3.99 (q J=7 Hz, 2H), 4.42 (q, 1H), 4.43 (t J=6.5 Hz, 2H), 4.49 (q J=7.2 Hz, 2H) 6.56 (d, 2H), 6.66 (s, 1H), 7.29 (d, 1H), 7.23 (t, 1H), 7.31 (s, 1H), 7.40 (s, 1H), 7.73 (d J=8.2 Hz, 1H), 7.75 (d J=8.2 Hz, 1H).

Preparation of Inv 15

Comp 5 (450 mg) was saponified with 10 mL of 0.25N NaOH in 20 mL of methanol at room temperature for 3 h. The precipitated yellow solid was removed by filtration and washed with a little water, and then dried to give 70 mg of the Inv 15: FAB mass spectra: m/e 783 ($MH^+$ for $C_{34}H_{36}Cl_2N_4O_3S+H^+$); characteristic peaks of $^1$H-NMR ($CDCl_3$) are: d 1.0 (t J=7Hz, 3H), d 1.19 (t J=7Hz, 3H), 3.48 (s, 2H); characteristic peaks of $^1$H-NMR in DMSO-$d_6$ are: d 6.37 (d J=8.4Hz, 2H), 6.7 (s, 1H) 6.85 (d J=8.4Hz, 2H), 7.5 (m, 2H), 8.02 (s, 1H, 8.03(s, 1H), 8.14 (d, 1H), 8.17 (d, 1H).

Synthesis Example 4

The compound comp 4 and Inv 12 were prepared according to Scheme III.

Scheme III
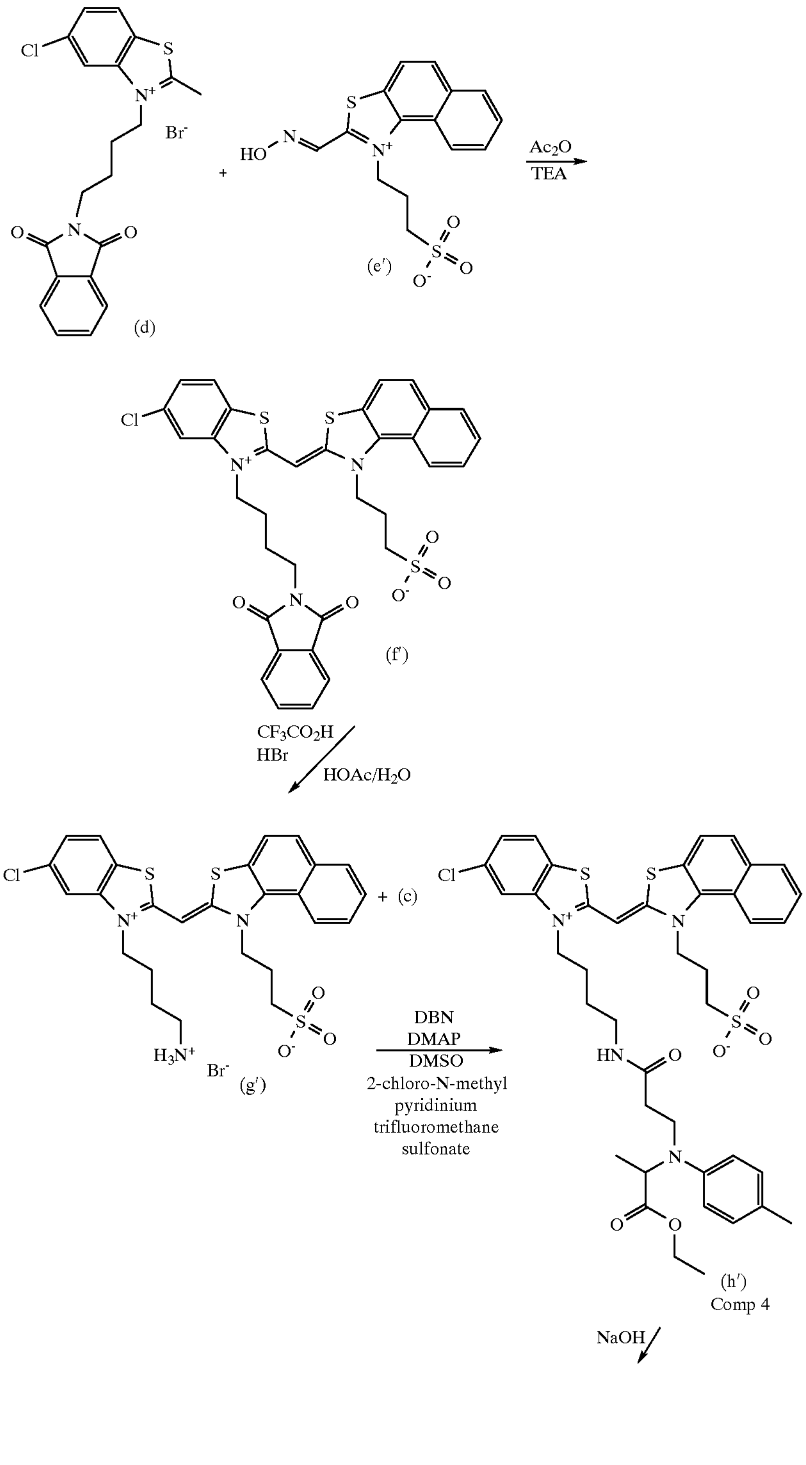

-continued

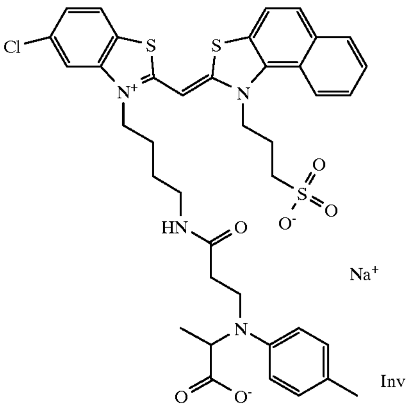

Inv 12

Preparation of f'

A mixture of (d) (18.6 g, 0.04 mol), the oxime (e') (14.0 g, 0.04 mol), acetonitrile (300 mL) and water (300 mL) were stirred and cooled to 10° C. Acetic anhydride (13.0 g, 0.13 mol) was added, followed by triethylamine (23.0 g 0.23 mol). A yellow-green solid resulted and the mixture was stirred at 25° C. for 2 h, then at 80° C. for 0.5 h. The light green solid was collected, washed well with methanol and air dried at 25° C. (14.7 g, 53%).

Infrared analysis (IR KBr) showed the presence of the phthalimide group at 1709 $cm^{-1}$.

Preparation of (g')

A mixture of the phthalimide dye f' (2.0 g, 3 mmol), 31% HBr in acetic acid (10 mL), 49% aqueous HBr (10 mL) and trifluoroacetic acid (1 mL) was stirred in a sealed glass vessel at 150–160° C. for 2 h. Complete solution was obtained. The mixture was allowed to cool to 25° C. (a precipitate formed at 90° C.). Methanol (50 mL) was added to the mixture, and the solid yellow dye collected by filtration. The dye was refluxed with methanol (50 mL), collected and dried in vacuo at 100° C.

IR (KBR) did not show the presence of the phthalimido group at 1709 $cm^{-1}$.

Preparation of Comp 4 (h')

The dye (g') (1.25 g, 2mmol) and dimethylsulfoxide (DMSO) (10 mL) were combined and sonicated for a few minutes. The ester-acid (c) (0.56 g, 2 mmol), 4-N,N-dimethylaminopyridine (DMAP) (0.48 g, 4mmol) and 1,5-diazabicyclo[4.3.0]non-5-ene (DBN) (0.5 g, 4 mmol) were added and the mixture again sonicated again for a few minutes. Finally, 2-chloro-N-methylpyridinium trifluoromethanesulfonate (1.10 g, 4 mmol) was added and the mixture stirred at 25° C. for 4 h. The mixture was filtered to remove a small amount of green insoluble material that was discarded. To the filtrate was added 30% aqueous NaCl (125 mL) and the precipitated orange product collected, washed well with water, then carefully with methanol. The solid was air dried at 25° C. The crude dye was dissolved in hot methanol (200 mL) and treated with decolorizing carbon. The filtrate was placed under vacuum to induce crystallization, then the vacuum was removed and the filtrate cooled to 10° C. to complete crystallization of the dye. The purified dye was collected, washed with methanol and dried in vacuo at 25° C. 90.59 g, 36%).

Silica gel thin-layer chromatography (TLC) (90 methylene chloride/10 methanol) showed essentially one spot, Rf=0.44.

Fast Atom Bombardment (FAB) mass spectrometry gave a large m/z=821 for the desired dye (h').

Preparation of Inv 12

The dye Comp 4, (h'), (0.59 g, 0.72 mmol), methanol (200 mL) and 0.25 N sodium hydroxide (20 mL, 5 mmol) were stirred at 25° C. for 25 h. High pressure liquid chromatography (HPLC) with diode array detection suggested that ester interchange from the parent ethyl ester dye to the methyl ester dye preceded saponification to the sodium carboxylate dye. Preparatory HPLC provided a sample (470 mg) that was rich in the desired sodium carboxylate dye (FAB MS, $^1H$ NMR). NMR suggested that the dye was present in at least 85% purity.

Synthesis of Example V

The synthesis of Inv 32 was performed according to Scheme IV

Preparation of Intermediate (n)

To a stirred suspension of 21.4 g of aniline and 46 g of potassium carbonate in 300 mL of acetonitrile under a nitrogen atmosphere was added 50 g of ethyl-2-bromoproprionate. The reaction mixture was refluxed under nitrogen for 2 days, the solution was cooled, and the salt was filtered out. The filtrate was poured into dichloromethane and washed with aqueous sodium bicarbonate solution, then washed with water. Anhydrous sodium sulfate was added and then the dichloromethane solution was filtered. The filtrate was distilled under vacuum to give a colorless oil. 37.2 g of this oil was added to 200 mL of acetonitrile together with 42 g of potassium carbonate and heated to reflux under nitrogen for 0.5 hour. 41.7 g of ethyl bromoacetate was then added and the mixture was refluxed for 6 days. The mixture was then cooled, and the salt was filtered. The product was taken up in dichloromethane, washed with aqueous sodium bicarbonate solution, washed again with water, dried over anhydrous sodium sulfate, and filtered. The filtrate was concentrated and distilled to give 20.8 g of the desired aniline diester.

The diester (5.6 g, 0.02 mol) was added to a solution of chlorosulfonic acid (11.6 g, 0.1 mol) in dichloromethane (50 mL) and stirred at 25° C. for 8 h, and then at reflux for 4 h. Thionyl chloride (11.8 g, 0.1 mol) was added and the mixture heated at reflux for another 4 h. The mixture was carefully added to ice water. The aqueous layer was discarded and the dichloromethane layer concentrated at reduced pressure to give an oil. This oil was extracted into diethyl ether (50 mL) and the organic layer washed five times with 30% aqueous sodium chloride. A trace of sodium bicarbonate added to the ether layer, and this solution simultaneously treated with magnesium sulfate and silica gel (ICN 04530). The ether was removed at reduced pressure to give the sulfonyl chloride (82% yield, 6.2 g) intermediate (n).

Preparation of Intermediate (o)

A mixture of the intermediate (g) as described in example 1 (2.0 g, 3.2 mmol), DMSO (40 mL), DMF (20 mL) and triethylamine (0.65 g, 6.4 mmol) was warmed to 50° C. Heating was discontinued and a solution of intermediate (n) (1.21 g, 3.2 mmol) and DMF (20 mL) was added, followed by additional triethylamine (0.65 g, 6.4 mmol). The reaction mixture was stirred at 25° C. for 16 h. The mixture was filtered and water (350 mL) was added to the filtrate to precipitate a yellow solid. A few drops of HCl (37%) were added to make the pH ca. 4.0. The yellow solid was collected, washed with water and dried in vacuo to give the crude dye (1.89 g). The crude dye was slurried in THF and filtered, then slurried in ethanol, filtered and dried in vacuo at 25° C. to give a 75/25 mixture (1.65 g) of the desired intermediate (o) and the starting material intermediated (g)

Prepartion of INV 32

To the mixture of intermediate (o) and intermediate (g) was added (1.5 g), acetic acid (6 g, 0.1 mol), water (1.8 g, 0.1 mol) and methanesulfonic acid (0.16 g, 1.7 mmol) was heated at reflux for 3 h. Sodium hydroxide (0.68 g, 1.7 mmol) was added to neutralize the methanesulfonic acid, and water was (200 mL) was added to precipitate the crude product. The crude dye was slurried in ethanol and dried in vacuo to give 1.06 g. This material was dissolved in acetic acid (10 mL) and methanol (100 mL) was added to initiate slow fractional crystallization. A fraction (200 mg) was estimated to contain ca. 85% of the desired INV 32 by diode array HPLC, FAB MS, $^{1}H$ and $^{13}C$ NMR. The remainder of the sample was composed of related partial hydrolysis half-ester/half-acid intermediates.

Examples illustrating the beneficial use of these fragmentable electron donating sensitizer compounds in silver halide emulsions are given in the following:

EXAMPLE 1

An AgBrI tabular silver halide emulsion (Emulsion T-1) was prepared containing 4.05% total I distributed such that

SCHEME IV

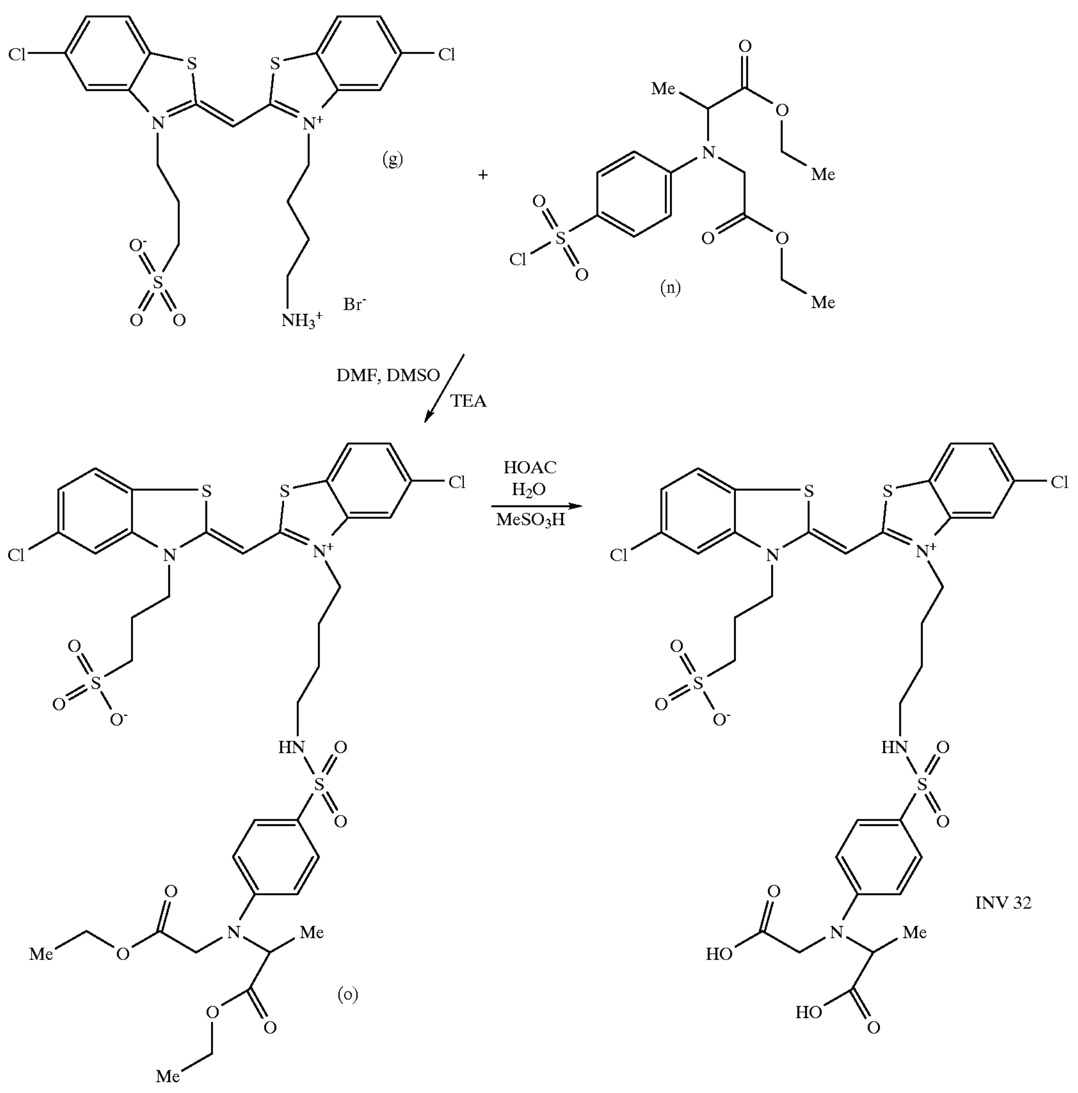

(g) (n) (o) INV 32 the central portion of the emulsion grains contained 1.5% I and the perimeter area contained substantially higher I, as described by Chang et. al., U.S. Pat. No. 5,314,793. The emulsion grains had an average thickness of 0.123 $\mu$m and average circular diameter of 1.23 $\mu$m. The emulsion was sulfur sensitized by adding $1.2\times10^{-5}$ mole /Ag mole of (1,3-dicarboxymethyl-1,3-dimethyl-2-thiourea, DCT) at 40° C., the temperature was then raised to 60° C. at a rate of 5° C./3 min and the emulsion held for 20 min before cooling to 40° C. This chemically sensitized emulsion was then used to prepare the experimental coating variations indicated in Table I. All of these experimental coating variations contained the hydroxybenzene, 2,4-disulfocatechol (HB3) at a concentration of 13 mmole/mole Ag, added to the melt before any further addenda. The fragmentable electron donating sensitizer (FED) compound and a conventional spectral sensitizing dye D-I or D-II were premixed in methanol solution at the relative concentrations indicated in Table I (listed as a percentage of the sum total amount of dye and two-electron donating sensitizer compound added) and added to the emulsion. At the time of FED sensitizer addition, the emulsion melts had a VAg of 85–90 mV and a pH of 6.0. Additional water, gelatin, and surfactant were then added to the emulsion melts. After 5 min at 40° C., an additional volume of 4.3% gelatin was then added to give a final emulsion melt that contained 216 grams of gel per mole of silver. These emulsion melts were coated onto an acetate film base at 1.61 g/m$^2$ of Ag with gelatin at 3.22 g/m$^2$. The coatings were prepared with a protective overcoat which contained gelatin at 1.08 g/m$^2$, coating surfactants, and a bisvinylsulfonylmethyl ether as a gelatin hardening agent.

For photographic evaluation, each of the coating strips was exposed for 0.1 sec to a 365 nm emission line of a Hg lamp filtered through a Kodak Wratten filter number 18A and a step wedge ranging in density from 0 to 4 density units in 0.2 density steps. The exposed film strips were developed for 6 min in Kodak Rapid X-ray Developer (KRX). $S_{365}$, relative sensitivity at 365 nm, was evaluated at a density of 0.2 units above fog.

The data in Table I compare the photographic sensitivities for emulsions containing various combinations of fragmentable electron donating sensitizer compound with a conventional blue or red spectral sensitizing dye. For this exposure, relative sensitivity was set equal to 100 for the control emulsion coating with no dye or fragmentable electron donating sensitizer agent added. The addition of conventional sensitizing dyes D-I or D-II cause some sensitivity decrease relative to the undyed control (tests nos. 2 and 3) due to desensitization. Improved sensitivity for the 365 nm exposure was shown for the examples which contained mixtures of D-I and a fragmentable electron donating sensitizing agent (test nos. 4–15). The data in Table I show that at the optimum concentrations Inv 8, 9, 10, 11, and 13 gave a factor of 1.2 to 1.5 sensitivity increase relative to the comparison emulsion coating containing only D-I. These sensitivity increases were accompanied by very small increases in fog. Sensitivity increases relative to the comparison (test no 2) of a factor of 1.9 were also found when the fragmentable electron donating sensitizer is used in combination with a conventional red sensitizing dye. However, somewhat larger increases in fog were obtained with the inventive compounds when the red sensitizing dye D-II was present. Overall, these results show that the fragmentable electron donating sensitizer can remove dye desensitization caused by conventional sensitizing dyes, and can give additional increases in photographic sensitivity.

The Inv's 8, 9, 10, 11 and 13 in the Table contain the fragmentable electron donating moiety XY. As indicated in (copending patent application Serial No., filed concurrently herewith, attorney docket No. 69500), the XY groups in these sensitizing agents have one electron oxidation potentials $E_1$ which are less positive than 1.4 V and upon oxidation, fragment to give $CO_2$ and a corresponding neutral radical, and the neutral radical. Related sensitizer compounds in which the XY group does not fragment are less effective at increasing emulsion sensitivity. The comparison Comp 2, for example, contains an XY moiety that does not fragment upon oxidation, and thus does not satisfy criterion 2 of our invention. This compound (test no 15, 16, 17) gave no speed increase when used in combination with a conventional spectral sensitizing dye, but instead led to a speed decrease.

TABLE I

Speed and fog results for combinations of FED and blue or red sensitizing dye on Emulsion T-1

| Test No. | Total Amount of Sensitizing Dye and FED added (mmol/mol Ag) | Type of FED | Amount of FED in mixture % of total Dye conc | Type of Sensitizing Dye Used: D-I $S_{365}$ | D-I Fog | D-II $S_{365}$ | D-II Fog | Remarks |
|---|---|---|---|---|---|---|---|---|
| 1 | 0.00 | — | — | 100 | 0.07 | 100 | 0.07 | control |
| 2 | 0.88 | — | — | 95 | 0.06 | 65 | 0.12 | comparison |
| 3 | 0.82 | — | — | 95 | 0.06 | 73 | 0.11 | comparison |
| 4 | 0.88 | Inv 8 | 0.5 | 129 | 0.09 | — | — | invention |
| 5 | 0.82 | Inv 9 | 0.1 | 120 | 0.06 | 107 | 0.19 | invention |
| 6 | 0.88 | Inv 10 | 0.5 | 120 | 0.06 | 110 | 0.21 | invention |
| 7 | 0.88 | Inv 13 | 0.05 | — | — | 123 | 0.24 | invention |
| 8 | 0.88 | Inv 13 | 0.5 | 148 | 0.08 | — | — | invention |
| 9 | 0.88 | Inv 13 | 1.0 | 148 | 0.09 | — | — | invention |
| 10 | 0.88 | Inv 11 | 0.05 | 126 | 0.08 | — | — | invention |
| 11 | 0.88 | Inv 11 | 0.1 | 135 | 0.07 | — | — | invention |
| 12 | 0.88 | Inv 11 | 0.5 | 151 | 0.10 | — | — | invention |
| 13 | 0.88 | Inv 11 | 1.0 | 151 | 0.11 | — | — | invention |
| 14 | 0.88 | Inv 11 | 5.0 | 151 | 0.22 | — | — | invention |
| 15 | 0.88 | Comp 2 | 1.0 | 95 | 0.10 | — | — | comparison |

TABLE I-continued

Speed and fog results for combinations of FED and blue or red sensitizing dye on Emulsion T-1

| Test No. | Total Amount of Sensitizing Dye and FED added (mmol/mol Ag) | Type of FED | Amount of FED in mixture % of total Dye conc | Type of Sensitizing Dye Used D-I $S_{365}$ | D-I Fog | D-II $S_{365}$ | D-II Fog | Remarks |
|---|---|---|---|---|---|---|---|---|
| 16 | 0.88 | Comp 2 | 5.0 | 89 | 0.10 | — | — | comparison |
| 17 | 0.88 | Comp 2 | 10.0 | 85 | 0.13 | — | — | comparison |

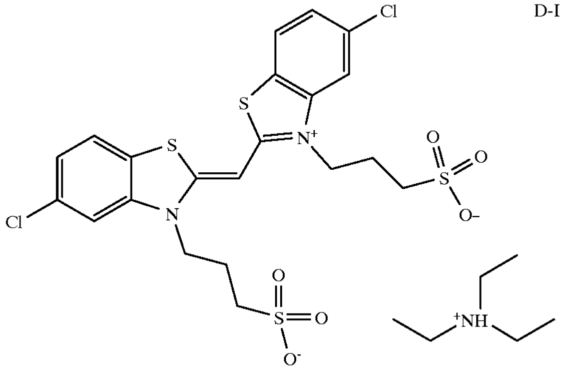

D-I

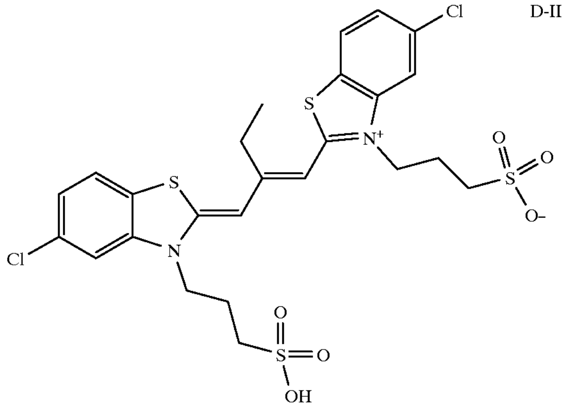

D-II

EXAMPLE 2

An AgrI tabular silver halide emulsion (Emulsion T-2) was prepared containing 4.05% total I distributed such that the central portion of the emulsion grains contained 1.5% I and the perimeter area contained substantially higher I, as described by Chang et. al., U.S. Pat. No. 5,314,793. The emulsion grains had an average thickness of 0.116 μm and average circular diameter of 1.21 μm. This emulsion was precipitated using deionized gelatin. The emulsion was sulfur sensitized by adding 8.5x10-6 mole 1,3-dicarboxymethyl-1,3-dimethyl- 2-thiourea/mole Ag at 40° C.; the temperature was then raised to 60° C. at a rate of 5° C./3 min and the emulsions held for 20 min before cooling to 40° C. The chemically sensitized emulsion was then used to prepare coatings containing combinations of the fragmentable two-electron-donating sensitizing agent Inv 14 and spectral sensitizing dyes D-I, D-II, and D-III. In addition, some coatings were prepared containing the non-fragmenting comparison Comp 3 and the spectral sensitizing dyes D-I and D-II. As indicated in Table II, some of the experimental coating variations contained the hydroxybenzene, 2,4-disulfocatechol (HB3) at a concentration of 13 mmole/mole Ag, added to the melt before the addition of any sensitizing dye compounds. The total concentration of dye used, that is the sum of the amounts of conventional spectral sensitizer plus fragmentable electron donating sensitizer, was 0.91 or 0.86 mmole/mole Ag. The fragmentable electron donating sensitizer compounds were added to the emulsion at 40° C. and the coatings were prepared and tested as described in Example 1, except that the additional gelatin used to prepare the coatings described in Table II was deionized gelatin.

Additional testing was carried but to determine the response of the coatings described in Table II to a spectral exposure. Each of the coating strips was exposed for 0.1 sec to a 3000 K color temperature tungsten lamp filtered to give an effective color temperature of 5500 K and further filtered through a Kodak Wratten filter number 2B and a step wedge ranging in density from 0 to 4 density units in 0.2 density steps. This filter passes only light of wavelengths longer than 400 nm, thus giving light absorbed mainly by any sensitizing dyes present. The exposed film strips were developed for 6 min in Kodak Rapid X-ray Developer (KRX). $S_{WR2}B$, relative sensitivity for this Kodak Wratten filter 2B exposure, was evaluated at a density of 0.2 units above fog. For this exposure, for each dye used, the relative sensitivity was set equal to 100 for the control coating with no fragmentable electron donating compound added.

The data in Table II show for the emulsions containing the blue D-I, red D-II, or green D-III spectral sensitizing dye that the presence of the fragmentable two-electron donating sensitizer Inv 14 gave photographic sensitivity advantages at all concentrations examined. For the blue sensitized emulsion without added HB3 the optimum concentration of Inv 14 gave a factor of 1.7 sensitivity gain for the 365 nm exposure relative to the comparison (test no 2). This sensitivity increase occurs with a slight increase in fog. The amount of fog observed for the blue sensitized emulsion was minimized for the emulsions in which HB3 is added. Speed increases for the 365 nm exposure up to a factor of 1.6 were also obtained for the green and red sensitized emulsions but with a modest fog increase. The data for the Kodak Wratten 2B exposure show that the use of the two electron donating sensitizer Inv 14 also gave sensitivity gains for spectral exposures of the blue, red, and green dyed emulsions. In comparison no instrinsic or spectral speed gains were observed for the blue and red dyed coatings containing Comp 3, a comparison compound consisting of a sensitizing dye linked to an XY moiety that does not fragment.

D-III

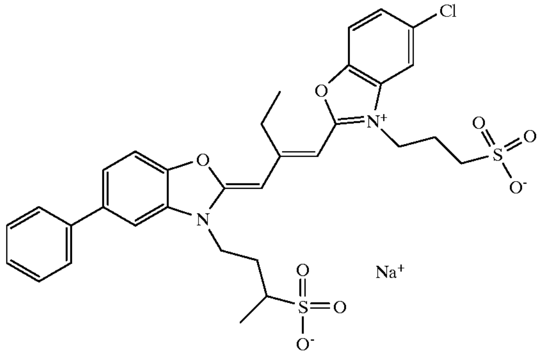

TABLE II

Speed and fog results for combinations of Inv 14 mixed with blue or red sensitizing dye on Emulsion T-2, Black and White Format

| Test No. | Total Amount of Sensitizing Dye and FED added ($10^{-3}$ mol/mol Ag) | Amount of Inv 14 in mixture % of total Dye conc | Amount of Comp 3 in mixture % of total Dye conc | Type of Sensitizing Dye Used | Amount of HB3 added ($10^{-3}$ mol/mol Ag) | Photographic Sensitivity $S_{365}$ | $S_{WR2B}$ | Fog | Remarks |
|---|---|---|---|---|---|---|---|---|---|
| 1 | 0 | 0 | 0 | none | 0 | 100 | — | 0.06 | control |
| 2 | 0.91 | 0 | 0 | I | 0 | 100 | 100 | 0.07 | comparison |
| 3 | 0.91 | 1 | 0 | I | 0 | 174 | 159 | 0.15 | invention |
| 4 | 0.91 | 2 | 0 | I | 0 | 170 | 159 | 0.20 | invention |
| 5 | 0.91 | 5 | 0 | I | 0 | 151 | 148 | 0.31 | invention |
| 6 | 0.91 | 0 | 0 | I | 13 | 120 | 123 | 0.07 | comparison |
| 7 | 0.91 | 1 | 0 | I | 13 | 166 | 159 | 0.11 | invention |
| 8 | 0.91 | 2 | 0 | I | 13 | 166 | 159 | 0.14 | invention |
| 9 | 0.91 | 5 | 0 | I | 13 | 159 | 148 | 0.20 | invention |
| 10 | 0.91 | 0 | 1 | I | 13 | 120 | 123 | 0.07 | comparison |
| 11 | 0.91 | 0 | 10 | I | 13 | 120 | 123 | 0.07 | comparison |
| 12 | 0.86 | 0 | | II | 13 | 85 | 100 | 0.11 | comparison |
| 13 | 0.86 | 0.2 | 0 | II | 13 | 135 | 162 | 0.28 | invention |
| 14 | 0.86 | 0.5 | 0 | II | 13 | 129 | 159 | 0.40 | invention |
| 15 | 0.86 | 1.0 | 0 | II | 13 | 120 | 145 | 0.51 | invention |
| 16 | 0.86 | 0 | 0.5 | II | 13 | 82 | 97 | 0.12 | comparison |
| 17 | 0.86 | 0 | 1.0 | II | 13 | 78 | 97 | 0.12 | comparison |
| 18 | 0.86 | 0 | 0 | III | 13 | 94 | 100 | 0.09 | comparison |
| 19 | 0.86 | 0.2 | 0 | III | 13 | 115 | 110 | 0.57 | invention |
| 20 | 0.86 | 1.0 | 0 | III | 13 | 135 | 105 | 0.61 | invention |

EXAMPLE 3

An AgBrI tabular silver halide emulsion (Emulsion T-2) was prepared containing 4.05% total I distributed such that the central portion of the emulsion grains contained 1.5% I and the perimeter area contained substantially higher I as described by Chang et. al., U.S. Pat. No. 5,314,793. The emulsion grains had an average thickness of 0.116 μm and average circular diameter of 1.21 μm. In addition, the following tabular emulsions were prepared each having a uniform halide distribution: Emulsion T-3, an AgBrI tabular emulsion with 1.5% total iodide, having an average thickness of 0.095 μm and an average circular diameter of 1.27 μm; emulsion T-4, an AgBrI tabular emulsion with 3.0% total iodide, having an average thickness of 0.097 μm and an average circular diameter of 1.14 μm; and emulsion T-5, an AgBr tabular emulsion having an average thickness of 0.084 μm and an average circular diameter of 1.40 μm. Emulsions T-2 through T-5 were all precipitated using deionized gelatin. The emulsions were sulfur sensitized by adding 1,3-dicarboxymethyl-1,3-dimethyl-2-thiourea at 40° C.; the temperature was then raised to 60° C. at a rate of 5° C./3 min and the emulsions held for 20 min before cooling to 40° C. The amounts of the sulfur sensitizing compound used were $8.5\times10^{-6}$ mole/mole Ag for emulsion T-2, $1.05\times10^{-5}$ mole/mole Ag for emulsion T-3, $1.5\times10^{-5}$ mole/mole Ag for emulsion T-4 and $1.6\times10^{-5}$ mole/mole Ag for emulsion T-5. These chemically sensitized emulsions were then used to prepare the experimental coating variations indicated in Table III.

All of the experimental coating variations in Table III contained the hydroxybenzene, 2,4-disulfocatechol (HB3) at a concentration of 13 mmole/mole Ag, added to the melt before any further addenda. The fragmentable electron donating sensitizer Inv 11 was mixed with the blue sensitizing dye D-I or the red sensitizing dye D-II at various mole ratios in methanol solution and then added to the emulsion at 40° C. The coatings were prepared as described in Example 1, except that the additional gelatin used to prepare the coatings described in Table III was deionized gelatin. The coatings were tested for their sensitivity to a 365 nm exposure as described in Example 1. For this exposure, relative sensitivity was set equal to 100 for each of the control emulsion coatings with no dye or fragmentable electron donating compound added.

The data in Table III show that some loss of sensitivity for a 365 nm exposure was generally observed upon the addition of the blue D-I or red D-II sensitizing dye, indicating dye desensitization. This desensitization was particularly severe for the red sensitizing dye on emulsions T-3, T-4, and T-5. The presence of the fragmentable electron donating sensitizer Inv 11 significantly increased the 365 nm speed for all of the dyed emulsions, which indicates that the two electron donating compound is effective in ameliorating the dye desensitization. For the combination of the fragmentable electron donating sensitizer Inv 11 with the red sensitizing dye D-II, larger fog increases were observed for emulsions T-2, T-3, and T-5 at the higher Inv 11 concentration. These results indicate that the optimum Inv 11 concentration for these red-dyed emulsions lies between the two concentrations examined.

TABLE III

Speed and fog results for combinations of dye and blue or red sensitizing dye on Emulsion T-1

| Test No. | Emulsion Type | Type of Sensitizing Dye Used | Total Amount of Dye added ($10^{-3}$ mol/mol Ag) | Amount of Inv 11 in Mixture % of total conc | Relative Sensitivity $S_{365}$ | Fog | Remarks |
|---|---|---|---|---|---|---|---|
| 1 | T-2 | none | 0 | 0 | 100 | 0.07 | control |
| 2 | T-2 | I | 0.88 | 0.0% | 89 | 0.06 | comparison |
| 3 | T-2 | I | 0.88 | 0.2% | 118 | 0.06 | invention |
| 4 | T-2 | I | 0.88 | 1.0 | 126 | 0.07 | invention |
| 5 | T-2 | II | 0.52 | 0.0 | 60 | 0.09 | comparison |
| 6 | T-2 | II | 0.52 | 0.3 | 95 | 0.16 | invention |
| 7 | T-2 | II | 0.52 | 1.7 | — | 1.01 | invention |
| 8 | T-3 | none | 0 | 0 | 100 | 0.07 | control |
| 9 | T-3 | I | 0.72 | 0.0 | 33 | 0.06 | comparison |
| 10 | T-3 | I | 0.72 | 0.2 | 50 | 0.07 | invention |
| 11 | T-3 | I | 0.72 | 1.0 | 52 | 0.07 | invention |
| 12 | T-3 | II | 0.43 | 0.0 | 19 | 0.09 | comparison |
| 13 | T-3 | II | 0.43 | 0.3 | 11 | 0.10 | invention |
| 14 | T-3 | II | 0.43 | 1.7 | 59 | 0.59 | invention |
| 15 | T-4 | none | 0 | 0 | 100 | 0.07 | control |
| 16 | T-4 | I | 1.01 | 0.0 | 13 | 0.06 | comparison |
| 17 | T-4 | I | 1.01 | 0.2 | 32 | 0.06 | invention |
| 18 | T-4 | I | 1.01 | 1.0 | 35 | 0.06 | invention |
| 19 | T-4 | II | 0.61 | 0.0 | 1.6 | 0.09 | comparison |
| 20 | T-4 | II | 0.61 | 0.3 | 2.8 | 0.10 | invention |
| 21 | T-4 | II | 0.61 | 1.7 | 11 | 0.17 | invention |
| 22 | T-5 | none | 0 | 0 | 100 | 0.07 | control |
| 23 | T-5 | I | 0.88 | 0.0 | 50 | 0.07 | comparison |
| 24 | T-5 | I | 0.88 | 0.2 | 91 | 0.07 | invention |
| 25 | T-5 | I | 0.88 | 1.0 | 112 | 0.07 | invention |
| 26 | T-5 | II | 0.52 | 0.0 | 8.3 | 0.09 | comparison |
| 27 | T-5 | II | 0.52 | 0.3 | 22 | 0.10 | invention |
| 28 | T-5 | II | 0.52 | 1.7 | — | 0.93 | invention |

EXAMPLE 4

The sulfur sensitized emulsion T-2 was used to prepare coatings containing combinations of the fragmentable electron-donating sensitizing agent Inv 12 and blue spectral sensitizing dye D-I. These experimental coating variations contained the hydroxybenzene 2,4-disulfocatechol (HB3) at a concentration of 13 mmole/mole Ag, added to the melt before the addition of any sensitizing dye compounds. The total concentration of dye used, that is the sum of the amounts of conventional spectral sensitizer plus fragmentable electron donating sensitizer, was 0.91 mmole/mole Ag. The fragmentable electron donating compounds were added to the emulsion at 40° C. and the coatings were prepared and tested as described in Example 2.

The data in Table IV show for the emulsions containing the blue D-I spectral sensitizing dye that the presence of the fragmentable electron donating sensitizer Inv 12 gave photographic sensitivity advantages at all concentrations examined. These sensitivity advantages were obtained for both instrinsic exposures of the silver halide at 365 nm and spectral exposures of the blue sensitizing dye, using the Kodak Wratten 2B filter.

TABLE IV

Speed and fog results for combinations of Inv 12 and blue sensitizing dye on Emulsion T-2

| Test No. | Total Amount of Sensitizing Dye and FED added ($10^{-3}$ mol/mol/Ag) | Amount of Inv 12 in mixture (% of total) | Type of Sensitizing Dye Used | Amount of HB3 added ($10^{-3}$ mol/mol Ag) | Photographic Sensitivity $S_{365}$ | $S_{WR2B}$ | Fog | Remarks |
|---|---|---|---|---|---|---|---|---|
| 1 | 0.91 | 0 | I | 13 | 100 | 100 | 0.05 | comparison |
| 2 | 0.91 | 1 | I | 13 | 145 | 132 | 0.08 | invention |
| 3 | 0.91 | 2 | I | 13 | 145 | 135 | 0.11 | invention |
| 4 | 0.91 | 5 | I | 13 | 138 | 132 | 0.17 | invention |

EXAMPLE 5

Two cubic emulsions with uniform halide composition were precipitated using deionized gelatin. Emulsion C-1 was a AgBrI emulsion with a 3% I content and a cubic edge length of 0.47 mm and emulsion C-2 was an AgBr emulsion with a cubic edge length of 0.52 mm. The emulsions were sulfur sensitized by adding 1,3-dicarboxymethyl-1,3-dimethyl-2-thiourea at 40° C.; the temperature was then raised to 60° C. at a rate of 5° C./3 min and the emulsions held for 20 min before cooling to 40° C. The amounts of the sulfur sensitizing compound used were $1.0\times10^{-5}$ mole/mole Ag for emulsion C-1, and $6.0\times10^{-6}$ mole/mole Ag for emulsion C-2. These emulsions were then used to prepare the experimental coating variations listed in Table V. These experimental coating variations contained the hydroxybenzene 2,4-disulfocatechol (HB3) at a concentration of 13 mmole/mole Ag, added to the melt before the addition of any sensitizing dye compounds. The emulsions were then dyed with mixtures of the sensitizing dyes D-I or D-II with the fragmentable electron donating sensitizing agent Inv 11 in the manner described in Example 1. Coatings were then prepared and tested as described in Example 1 except that the additional gelatin used to prepare the coatings described in Table V was deionized gelatin.

The data in Table V show that addition of the fragmentable electron donating sensitizing agent Inv 11 to these dyed cubic emulsions gave substantial 365 nm speed increases with only small fog increases in all cases examined. The presence of the sensitizing dye D-I desensitized both emulsions C-1 and C-2 while the sensitizing dye D-II desensitized emulsion C-2 but gave a small increase in 365 nm sensitivity for emulsion C-1. Nevertheless, in all cases, 365 nm sensitivities for the dyed emulsions containing the Inv 11 were higher than the sensitivity of the undyed control. In the most favorable cases (tests 7–9), this sensitivity increase was a factor of 2.5×. These data indicate that the electron donating sensitizing agent Inv 11 can not only ameliorate dye desensitization but also increase the intrinsic sensitivity of dyed emulsions to light absorbed by the silver halide crystals to a level beyond that of the undyed control.

TABLE V

Speed and fog results for combinations of Inv 11 and blue or red sensitizing dye on Emulsions C-1 and C-2

| Test No. | Emulsion Type | Type of Sensitizing Dye | Total Amount of Sensitizing Dye and FED added ($10^{-3}$ mol/mol Ag) | Amount of FED in mixture % of total Dye conc | Photographic Sensitivity $S_{365}$ | Fog | Remarks |
|---|---|---|---|---|---|---|---|
| 1 | C-1 | none | 0.00 | 0 | 100 | 0.09 | control |
| 2 | C-1 | D-I | 0.66 | 0 | 60 | 0.11 | comparison |
| 3 | C-1 | D-I | 0.66 | 1.0 | 240 | 0.12 | invention |
| 4 | C-1 | D-I | 0.66 | 2.0 | 246 | 0.12 | invention |
| 5 | C-1 | D-I | 0.66 | 4.0 | 240 | 0.12 | invention |
| 6 | C-1 | D-II | 0.44 | 0 | 129 | 0.12 | comparison |
| 7 | C-1 | D-II | 0.44 | 0.2 | 251 | 0.25 | invention |
| 8 | C-1 | D-II | 0.44 | 0.5 | 251 | 0.28 | invention |
| 9 | C-1 | D-II | 0.44 | 1.0 | 257 | 0.27 | invention |
| 10 | C-2 | none | 0.00 | 0 | 100 | 0.06 | control |
| 11 | C-2 | D-I | 0.59 | 0 | 60 | 0.07 | comparison |
| 12 | C-2 | D-I | 0.59 | 1.0 | 162 | 0.08 | invention |

TABLE V-continued

Speed and fog results for combinations of Inv 11 and blue or red sensitizing dye on Emulsions C-1 and C-2

| Test No. | Emulsion Type | Type of Sensitizing Dye | Total Amount of Sensitizing Dye and FED added ($10^{-3}$ mol/mol Ag) | Amount of FED in mixture % of total Dye conc | Photographic Sensitivity $S_{365}$ | Fog | Remarks |
|---|---|---|---|---|---|---|---|
| 13 | C-2 | D-I | 0.59 | 2.0 | 170 | 0.08 | invention |
| 14 | C-2 | D-I | 0.59 | 4.0 | 170 | 0.09 | invention |
| 15 | C-2 | D-II | 0.40 | 0 | 65 | 0.08 | comparison |
| 16 | C-2 | D-II | 0.40 | 0.2 | 151 | 0.20 | invention |
| 17 | C-2 | D-II | 0.40 | 0.5 | 166 | 0.24 | invention |
| 18 | C-2 | D-II | 0.40 | 1.0 | 159 | 0.28 | invention |

EXAMPLE 6

The AgBrI tabular silver halide emulsion T-2 from Example 2 was optimally chemically and spectrally sensitized by adding NaSCN, 1.07 mmole of the blue sensitizing dye D-I per mole Ag, $Na_3Au(S_2O_3)_2{\cdot}2H_2O$, $Na_2S_2O_3{\cdot}5H_2O$, and a benzothiazolium finish modifier and then subjecting the emulsion to a heat cycle to 65° C. The hydroxybenzene 2,4-disulfocatechol (HB3) at a concentration of $13\times10^{-3}$ mole/mole Ag was added to the emulsion melt before the start of the chemical sensitization procedure. The fragmentable electron donating sensitizing agent Inv 11 was added to the emulsion either after the chemical sensitization procedure or as an additional component in the chemical sensitization procedure, added after the dye D-I. The variations examined are given in Table VI.

The melts were prepared for coating by adding additional water, deionized gelatin, coating surfactants, and the antifoggant and stabilizer tetraazaindene at 1.75 gm/mole Ag. Coatings were prepared by combining the emulsion melts with a melt containing deionized gelatin and an aqueous dispersion of the cyan-forming color coupler CC-1 and coating the resulting mixture on acetate support. The final coatings contained Ag at 0.81 g/m$^2$, coupler at 1.61 g/m$^2$, and gelatin at 3.23 g/m$^2$. The coatings were overcoated with a protective layer containing gelatin at 1.08 g/m$^2$, coating surfactants, and a bisvinylsulfonylmethyl ether as a gelatin hardening agent.

For photographic evaluation, each of the coating strips was exposed for 0.01 sec to a 3000 K color temperature tungsten lamp filtered to give an effective color temperature of 5500 K and further filtered through a Kodak Wratten filter number 2B, and a step wedge ranging in density from 0 to 4 density units in 0.20 density steps. This exposure gives light absorbed mainly by the blue sensitizing dye. The exposed film strips were developed for 3¼ minutes in Kodak C-41 color developer. $S_{WR2B}$, relative sensitivity for this filtered exposure, was evaluated at a cyan density of 0.15 units above fog.

The data in Table VI show that the use of the fragmentable electron donating sensitizing agent Inv 11 in this optimally sensitized, blue-sensitized emulsion in color format gave significant spectral speed gains with some small fog increases. The data also show that the Inv 11 functioned well when added during the chemical sensitization or when added at the conclusion of the chemical sensitization procedure.

CC-1

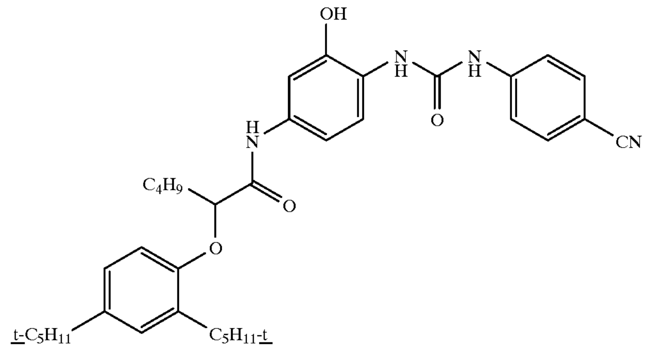

TABLE VI

| Test No. | Amount of of Inv 11 added ($10^{-6}$ mol/ mol Ag) | Position of Inv 11 Addition | Photographic Sensitivity $S_{WR2B}$ | Fog | Remarks |
|---|---|---|---|---|---|
| | Speed and fog results for combinatins of Inv 11 dye with a blue sensitized AgBrI T-grain Emulsion T-2 COLOR FORMAT | | | | |
| 1 | none | — | 100 | 0.08 | comparison |
| 2 | 1.5 | after sensitization | 145 | 0.09 | invention |
| 3 | 4.5 | after sensitization | 159 | 0.30 | invention |
| 4 | 1.5 | in sensitization | 132 | 0.10 | invention |
| 5 | 4.5 | in sensitization | 148 | 0.15 | invention |

EXAMPLE 7

The optimally sensitized, blue dyed tabular AgBrI emulsion T-2 as described in Example 6 was used to prepare color format coatings containing the fragmentable two-electron donating sensitizing agents Inv 11 and 14 and as described in Table VII. The antifoggant and stabilizer tetraazaindene (TAI) was added to the melts of the chemically sensitized emulsion as the first addenda at a concentration of 1.75 gm/mole Ag. The fragmentable two-electron donating sensitizing agents were then added to the emulsion melt. The melts were prepared for coating as described in Example 6 except that no additional TAI was added. The coating strips obtained were then tested as described in Example 6.

The data in Table VII indicate that both Inv 11 and 14 and gave significant speed increases with only small fog increases when added to this optimally sensitized, blue dyed emulsion. At equivalent concentrations, Inv 14 gave slightly better speed and improved fog compared to Inv 14. This comparison demonstrates the advantage of having an X-Y moiety of higher first oxidation potential $E_1$ as the fragmentable two-electron donating species linked to the sensitizing dye.

TABLE VII

Speed and fog result for combinations of Inv 11 and Inv 14 dyes with a blue sensitized AgBrI T-grain Emulsion T-2 COLOR FORMAT

| Test No. | Type of FED | Amount of FED added ($10^{-6}$ mol/ mol Ag) | Photographic Sensitivity $S_{WR2B}$ | Fog | Remarks |
|---|---|---|---|---|---|
| 1 | | none | 100 | 0.08 | comparison |
| 2 | Inv 11 | 1.5 | 138 | 0.09 | invention |
| 3 | Inv 11 | 4.5 | 170 | 0.13 | invention |
| 4 | Inv 14 | 1.5 | 148 | 0.09 | invention |
| 5 | Inv 14 | 4.5 | 174 | 0.09 | invention |
| 6 | Inv 14 | 1.5 | 186 | 0.19 | invention |

EXAMPLE 8

The sulfur sensitized emulsion AgBrI tabular emulsion T-1 was used to prepare coatings containing combinations of the compounds Inv 15 or Comp 5 or with the blue spectral sensitizing dye D-I. The total concentration of dye used, that is the sum of the amounts of conventional spectral sensitizer plus electron donating sensitizer, was 0.82 mmole/mole Ag. The compounds were added to the emulsion at 40° C. and the coatings were prepared and tested as described in Example 1, except that disulfocatechol was not used in these coatings.

Table VIII shows that addition of the fragmentable electron donating sensitizer Inv 15 to the blue-dyed emulsion T-1 causes moderate increases in photographic sensitivity. This compound contains an XY moiety that has an oxidation potential $E_1$ less positive than 1.4 V and that fragments upon oxidation to give $CO_2$ and a corresponding neutral radical, thus satisfying the two criteria of our invention. However, this compound falls outside the most preferred category of our invention, since the neutral radical created has an oxidation potential $E_2$ that is less negative than −0.7 V. Addition of the Comp 5 to the blue-dyed emulsion T-1 causes no increase in photographic sensitivity. This compound contains an XY moiety that has an oxidation potential $E_1$ less positive than 1.4 V but does not satisfy the second criterion of our invention, since this ester-containing XY moiety does not fragment upon oxidation.

TABLE VIII

Speed and fog result for combinations of Inv 15 or Comp 5 and blue sensitizing dye D-I on Emulsion T-1

| Test No. | Type of FED Compound | Total Amount of Sensitizing Dye and FED added ($10^{-3}$ mol/ mol Ag) | Amount of FED in mixture % of total Dye Conc. | Photographic Sensitivity $S_{365}$ | Fog | Remarks |
|---|---|---|---|---|---|---|
| 1 | none | 0.82 | 0 | 100 | 0.06 | comparison |
| 2 | Inv 15 | 0.82 | 5 | 107 | 0.06 | invention |
| 3 | Inv 15 | 0.82 | 10 | 107 | 0.06 | invention |
| 4 | Inv 15 | 0.82 | 20 | 107 | 0.06 | invention |
| 5 | Comp 5 | 0.82 | 5 | 100 | 0.08 | comparison |
| 6 | Comp 5 | 0.82 | 20 | 94 | 0.13 | comparison |

EXAMPLE 9

A cubic emulsion C-3 with uniform halide composition was precipitated using deionized gelatin. This emulsion was a AgBrI emulsion with a 3% I content and a cubic edge length of 0.24 mm. The emulsions was sulfur sensitized by adding $2.4\times10^{-5}$ mole/mole Ag of 1,3-dicarboxymethyl-1,3-dimethyl-2-thiourea at 40° C.; the temperature was then raised to 60° C. at a rate of 5° C./3 min and the emulsion held for 20 min before cooling to 40° C. This emulsion was then used to prepare the experimental coating variations listed in Table IX. The emulsion was dyed with mixtures of the blue sensitizing dye D-I with the compounds Comp 5, Inv 15 or Inv 11, in the manner described in Example I. Coatings were then prepared and tested as described in Example I except that the additional gelatin used to prepare the coatings described in Table IX was deionized gelatin and disulfo catechol was not used in these coatings.

The data in Table IX show that addition of the blue sensitizing dye to the emulsion C-3 causes some decrease in sensitivity to a 365 nm exposure, indicating dye desensitization. All three of the compounds tested give significant speed gains on this small cubic emulsion, increasing the 365 nm sensitivity beyond that of the undyed emulsion and removing the dye desensitization. All three of these compounds satisfy the first criterion of our invention, in that they contain an XY moiety with an oxidation potential $E_1$ that is less positive than 1.4 V. However, only Inv 11 and 15 are fragmentable electron donating sensitizers and satisfy both criteria of our invention by containing XY moieties that fragment upon oxidation. Table IX shows that the speed gain obtained with these two compounds is substantially greater than the speed gain with Comp 5, which does not fragment upon oxidation. Finally, only Inv 11 satisfies the most preferred category of our invention in that the neutral radical created upon oxidation and fragmentation of the XY moiety has an oxidation potential more negative than −0.7 V. Table IX shows clearly that this fragmentable two-electron donating sensitizer Inv 11 gives the largest sensitivity increase of the three compounds tested.

TABLE IX

Speed and fog result for combinations of Comp 5, Inv 15 or Inv 11 and blue sensitizing dye D-I on Emulsion C-3

| Test No. | Type of FED Compound | Total Amount of Sensitizing Dye and FED added ($10^{-3}$ mol/mol Ag) | Amount of FED in mixture % of total Dye Conc. | Photographic Sensitivity $S_{365}$ | Fog | Remarks |
|---|---|---|---|---|---|---|
| 1 | none | none | none | 100 | 0.14 | control |
| 2 | none | 1.16 | 0 | 68 | 0.16 | comparison |
| 3 | Comp 5 | 1.16 | 10 | 162 | 0.17 | comparison |
| 4 | Comp 5 | 1.16 | 20 | 195 | 0.18 | comparison |
| 5 | Inv 15 | 1.16 | 10 | 209 | 0.17 | invention |
| 6 | Inv 15 | 1.16 | 20 | 246 | 0.18 | invention |
| 7 | Inv 11 | 1.16 | 2 | 309 | 0.20 | invention |
| 8 | Inv 11 | 1.16 | 5 | 363 | 0.23 | invention |

EXAMPLE 10

The sulfur sensitized emulsion T-2 described in Example 2 was used to prepare coatings containing combinations of the fragmentable electron-donating sensitizer Inv 32 with red or green spectral sensitizing dyes D-II and D-III. These experimental coating variations contained the hydroxybenzene HB3 at a concentration of 13 mmole/mole Ag, added to the melt before the addition of any sensitizing dye compounds. Some of the comparison coatings contained conventional blue sensitizer D-I in place of the blue fragmentable electron-donating sensitizer Inv 32. The total concentration of dye used, that is the sum of the amounts of conventional spectral sensitizer plus two-electron donating sensitizer, was 0.86 mmole/mole Ag. The two electron donating compounds were added to the emulsion at 40° C. and the coatings were prepared fragmentable electron-donating sensitizer Inv 32 as described in Example 2. Evaluation of the photographic sensitivity was carried out as described in Example 1.

The data in Table X show that some loss of sensitivity for a 365 nm exposure was generally observed upon the addition of the green D-III or red D-II sensitizing dye (test no. 2 and 9), indicating dye desensitization. This desensitization is not alleviated by the mixing low concentrations of the conventional blue sensitizer D-I with dyes D-II or D-III (tests no. 3, 4, 5, 10, 11). Combining the fragmentable electron-donating sensitizer Inv 32 into a mixture with D-II or D-III significantly increased the 365 nm speed for all of the dyed emulsions, which indicates that Inv 32 is effective in ameliorating the dye desensitization. These speed increases occur with no increase in fog.

TABLE X

Speed and fog results for combinations of Inv 32 or blue sensitizing dye with red and green sensitizing dyes on Emulsion T-2

| Test No. | Type of Sensitizing Dyes Used | Total Amount of Sensitizing Dye and FED added ($10^{-3}$ mol/mol Ag) | Amount of Inv 32 in mixture (% of total) | Amount of D-I in mixture (% of total) | Photographic Sensitivity $S_{365}$ | Fog | Remarks |
|---|---|---|---|---|---|---|---|
| 1 | none | 0 | 0 | 0 | 100 | 0.05 | control |
| 2 | II | 0.86 | 0 | 0 | 71 | 0.11 | comparison |
| 3 | I and II | 0.86 | 0 | 2 | 73 | 0.11 | comparison |
| 4 | I and II | 0.86 | 0 | 6.4 | 74 | 0.11 | comparison |
| 5 | I and II | 0.86 | 0 | 20 | 78 | 0.10 | comparison |
| 6 | II | 0.86 | 0 | 0 | 91 | 0.11 | invention |
| 7 | II | 0.86 | 6.4 | 0 | 94 | 0.11 | invention |
| 8 | II | 0.86 | 20 | 0 | 105 | 0.11 | invention |
| 9 | III | 0.86 | 0 | 0 | 85 | 0.08 | comparison |
| 10 | I and III | 0.86 | 0 | 2 | 89 | 0.08 | comparison |
| 11 | I and III | 0.86 | 0 | 6.4 | 73 | 0.08 | comparison |
| 12 | III | 0.86 | 2 | 0 | 95 | 0.08 | invention |
| 13 | III | 0.86 | 6.4 | 0 | 95 | 0.08 | invention |

EXAMPLE 11

The optimally sensitized, blue-dyed tabular AgBrI emulsion T-2 as described in Example 6 was used to prepare color format coatings containing the fragmentable electron donating sensitizing agent Inv 31 or additional sensitizing dye D-I as described in Table IX. The antifoggant and stabilizer tetraazaindene (TAI) was added to the melts of the chemically sensitized emulsion as the first addendum at a concentration of 1.75 gm/mole Ag. The fragmentable electron donating sensitizing agent was then added to the emulsion melt. The melts were prepared for coating as described in Example 6 except that no additional TAI was added. The coating strips obtained were then tested as described in Example 6.

The data in Table XI indicate that addition of the fragmentable electron donating agent Inv 31 to this optimally sensitized blue-dyed emulsion gave substantial speed increases of 1.5 to 1.7× with essentially no fog increase. As a comparison, the coating with only extra sensitizing dye D-I added gave no speed increase.

TABLE XI

Speed and fog results for combinations of Inv 31 dye with a blue sensitized AgBrI T-grain Emulsion T-2 in color format

| Test No. | Type of FED | Amount of FED added ($10^{-6}$ mol/mol Ag) | Photographic Sensitivity $S_{WR2B}$ | Fog | Remarks |
|---|---|---|---|---|---|
| 1 | | none | 100 | 0.07 | comparison |
| 2 | D-I | 140 | 98 | 0.07 | comparison |
| 3 | Inv 31 | 14 | 148 | 0.08 | invention |
| 4 | Inv 31 | 45 | 159 | 0.09 | invention |
| 5 | Inv 31 | 140 | 166 | 0.11 | invention |

This invention has been described in detail with particular reference to preferred embodiments thereof, but it will be understood that variations and modifications can be effected within the spirit and scope of the invention.

What is claimed is:

1. A photographic element comprising at least one silver halide emulsion layer in which the silver halide is sensitized with a compound of formula Z-(L-XY)$_k$ wherein:

Z is a light absorbing group;

L is a linking group containing a least one C, N, S, or O atom; and k is 1 or 2; and XY represents a fragmentable electron donor moiety wherein:

1) XY has an oxidation potential between 0 and about 1.4 V;

2) X is an electron donor group;

3) Y is a leaving group other than hydrogen; and 4) the oxidized form of XY undergoes a bond cleavage reaction to give the radical X$^•$ and the leaving fragment Y.

2. A photographic element comprising at least one silver halide emulsion layer in which the silver halide is sensitized with a compound of formula Z-(L-XY)$_k$ wherein:

Z is a light absorbing group;

L is a linking group containing a least one C, N, S, or O atom; and k is 1 or 2; and XY represents a fragmentable electron donor moiety wherein:

1) XY has an oxidation potential between 0 and about 1.4 V;

2) X is an electron donor group;

3) Y is a leaving group other than hydrogen;

4) the oxidized form of XY undergoes a bond cleavage reaction to give the radical X$^•$ and the leaving fragment Y; and 5) the radical X$^•$ has an oxidation potential more negative than about −0.7 V.

3. A photographic element according to claim 1 or claim 2, wherein Z is a spectral sensitizing agent.

4. A photographic element according to claim 3, wherein the spectral sensitizing agent is a cyanine, merocyanine, styryl, hemicyanine, or complex cyanine dye.

5. A photographic element according to claim 3, wherein the spectral sensitizing dye is represented by the formulae VIII–XII below:

(VIII)

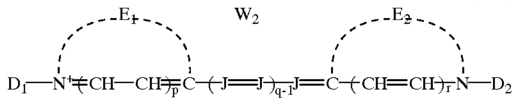

wherein:

$E_1$ and $E_2$ represent the atoms necessary to form a substituted or unsubstituted hetero ring and may be the same or different, each J independently represents a substituted or unsubstituted methine group, q is a positive integer of from 1 to 4, p and r each independently represents 0 or 1, $D_1$ and $D_2$ each independently represents substituted or unsubstituted alkyl or unsubstituted aryl, and $W_2$ is a counterion as necessary to balance the charge;

(IX)

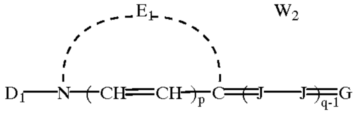

wherein $E_1$, $D_1$, J, p, q and $W_2$ are as defined above for formula (VIII) and G represents

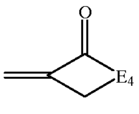
or
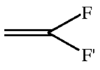

wherein $E_4$ represents the atoms necessary to complete a substituted or unsubstituted heterocyclic nucleus, and F and F' each independently represents a cyano radical, an ester radical, an acyl radical, a carbamoyl radical or an alkylsulfonyl radical;

(X)

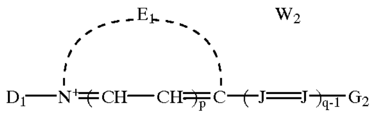

wherein $D_1$, $E_1$, J, p, q and $W_2$ are as defined above for formula (VIII), and $G_2$ represents a substituted or unsubstituted amino radical or a substituted or unsubstituted aryl radical;

(XI)

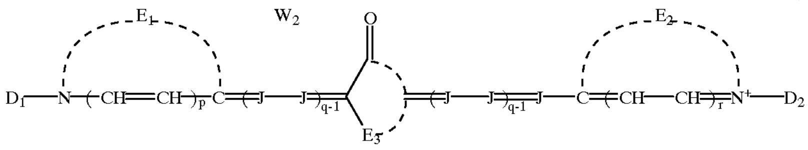

wherein $D_1$, $E_1$, $D_2$, $E_1$, J, p, q, r and $W_2$ are as defined for formula (VIII) above, and $E_3$ is defined the same as $E_4$ for formula (IX) above;

(XII)

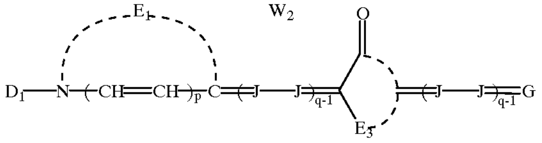

wherein $D_1$, $E_1$, J, G, p, q, r and $W_2$ are as defined above for formula (VIII) above and $E_3$ is as defined for formula (XI) above.

6. A photographic element according to claim 1 or claim 2, wherein L contains an alkylene group, an arylene group, —O—, —S—, —C=O, —$SO_2$—, —NH—, —P=O, or —N=.

7. A photographic element according to claim 6, wherein L comprises a group of the formula:

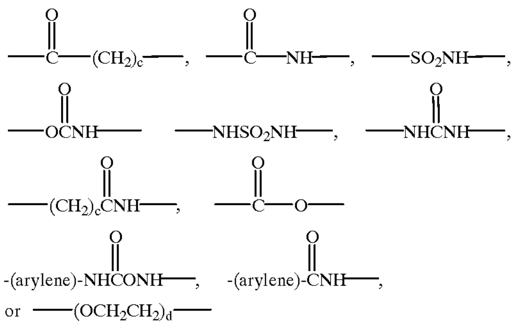

where c=1–30, and d=1–10.

8. A photographic element according to claim 6, wherein L is of the formula:

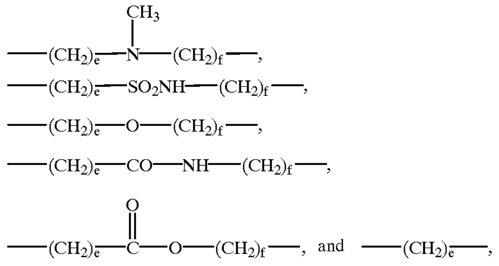

wherein e and f=1–30, with the proviso that e+f≦30.

9. A photographic element according to claim 1 or claim 2, wherein X is of formula (I):

(I)

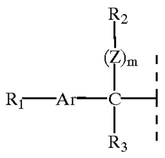

wherein:

m is 0 or 1;

Z is O, S, Se or Te;

Ar is an aryl group or a heterocyclic group;

$R_1$ is R, carboxyl, amide, sulfonamide, halogen, $NR_2$, $(OH)_n$, $(OR')_n$ or $(SR)_n$; where R' is alkyl or substituted alkyl;

n is 1–3;

$R_2$ is R or Ar';

$R_3$ is R or Ar';

$R_2$ and $R_3$ together can form 5- to 8- membered ring;

$R_2$ and Ar can be linked to form 5- to 8- membered ring;

$R_3$ and Ar can be linked to form 5- to 8- membered ring;

Ar' is an aryl group or a heterocyclic group; and

R is a hydrogen atom or an unsubstituted or substituted alkyl group.

10. A photographic element according to claim 9, wherein X is selected from the group consisting of:

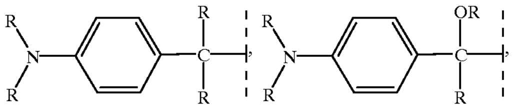

-continued

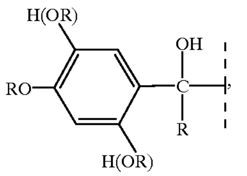

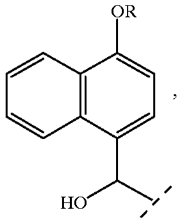

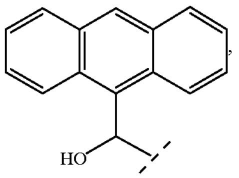

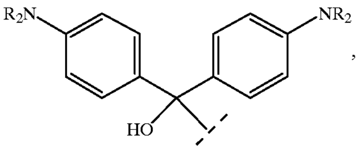

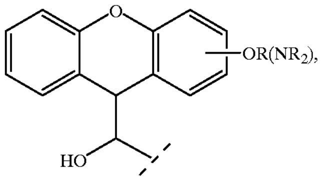

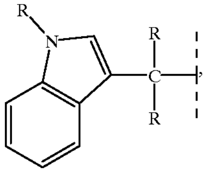

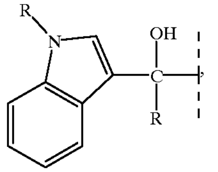

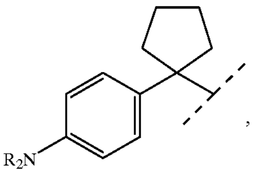

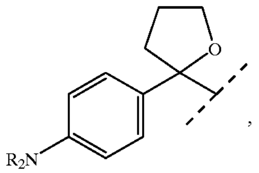

and

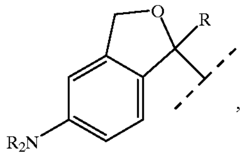

wherein R is a hydrogen atom or a substituted or unsubstituted alkyl group.

11. A photographic element according to claim 1 or claim 2, wherein X is of formula (II):

(II)

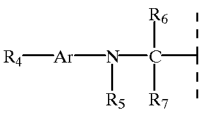

wherein:

Ar is an aryl group or a heterocyclic group;

$R_4$ is a substituent having a Hammett sigma value of −1 to +1;

$R_5$ is R or Ar';

$R_6$ is R or Ar';

$R_7$ is R or Ar';

$R_5$ and Ar can be linked to form 5- to 8- membered ring;

$R_6$ and Ar can be linked to form 5- to 8- membered ring, in which case $R_6$ can comprise a hetero atom;

$R_5$ and $R_6$ can be linked to form 5- to 8- membered ring;

$R_6$ and $R_7$ can be linked to form 5- to 8- membered ring;

Ar' is an aryl group or a heterocyclic group; and

R is a hydrogen atom or an unsubstituted or substituted alkyl group.

12. A photographic element according to claim 11, wherein X is selected from the group consisting of:

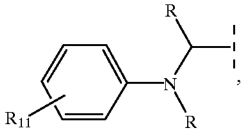

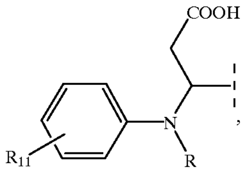

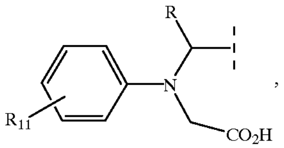

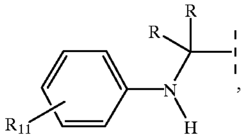

and

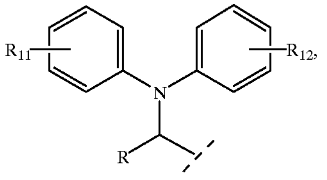

wherein $R_{11}$ and $R_{12}$ are independently H, alkyl, alkoxy, alkylthio, halo, carbamoyl, carboxy, amido, formyl, sulfonyl, sulfonamido or nitrile and R is a hydrogen atom or an unsubstituted or substituted alkyl group.

13. A photographic element according to claim 11, wherein X is selected from the group consisting of:

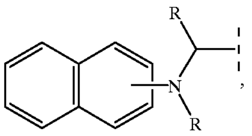

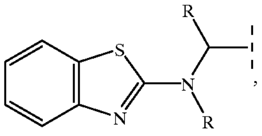

-continued

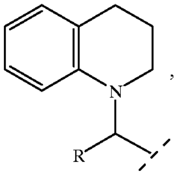,
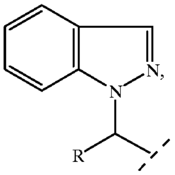
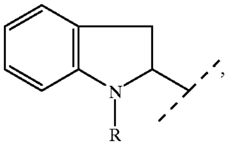, and
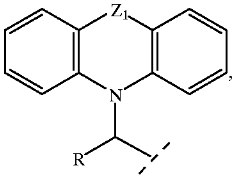, wherein $Z_1$ is covalent bond, S, O, Se, NR, $CR_2$, CR═CR or $CH_2CH_2$ and R is a hydrogen atom or a substituted or unsubstituted alkyl group.

14. A photographic element according to claim 11, wherein X has the structure:

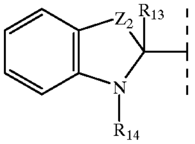

wherein $Z_2$ is S, O, Se, NR, $CR_2$ or CR═CR, and $R_{13}$ is an unsubstituted or substituted alkyl or aryl group, and $R_{14}$ is a hydrogen atom or an unsubstituted or substituted alkyl or aryl group and R is a hydrogen atom or a substituted or unsubstituted alkyl group.

15. A photographic element according to claim 1 or claim 2, wherein X is of formula (III):

(III)

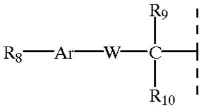

wherein:

W is O, S or Se;

Ar is an aryl group or a heterocyclic group;

$R_8$ is R, carboxyl, $NR_2$, $(OR)_n$, or $(SR)_n$;

n is 1–3

$R_9$ and $R_{10}$ are independently R or Ar';

$R_9$ and Ar can be linked to form 5- to 8- membered ring;

Ar' is an aryl group or a heterocyclic group; and

R is a hydrogen atom or an unsubstituted or substituted alkyl group.

16. A photographic element according to claim 15, wherein X is selected from the group consisting of:

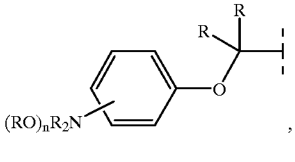,

-continued

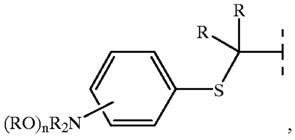,
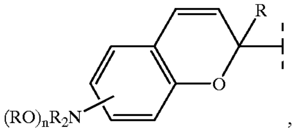,
and
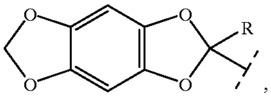, wherein n is 1–3, and R is a hydrogen atom or an unsubstituted or substituted alkyl group.

17. A photographic element according to claim 1 or claim 2, wherein X is of formula (IV):

(IV)

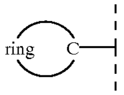

wherein "ring" represents a substituted or unsubstituted 5-, 6- or 7-membered unsaturated ring.

18. A photographic element according to claim 17, wherein X is selected from the group consisting of

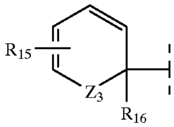,
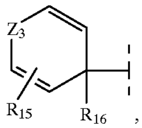,
and
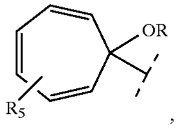, wherein $Z_3$ is O, S, Se or NR; $R_{15}$ is OR or $NR_2$; $R_{16}$ unsubstituted alkyl or substituted alkyl and R is a hydrogen atom or an unsubstituted or substituted alkyl group.

19. A photographic element according to claim 1 or claim 2, wherein Y is:

(1) X', where X' is an X group as defined in structures I–IV and may be the same as or different from the X group to which it is attached (2)

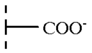

(3)

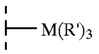

where M=Si, Sn or Ge; and R'=alkyl or substituted alkyl; or (4)

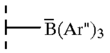

where Ar''=aryl or substituted aryl, and wherein structures I–IV are:

(I)

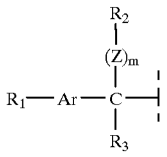

wherein:

m is 0 or 1;

Z is O, S, Se or Te;

Ar is an aryl group or a heterocyclic group;

$R_1$ is R, carboxyl, amide, sulfonamide, halogen, $NR_2$, $(OH)_n$, $(OR')_n$ or $(SR)_n$; where R' is alkyl or substituted alkyl;

n is 1–3;

$R_2$ is R or Ar';

$R_3$ is R or Ar';

$R_2$ d $R_3$ together can form 5- to 8- membered ring;

$R_2$ and Ar can be linked to form 5- to 8- membered ring;

$R_3$ and Ar can be linked to form 5- to 8- membered ring;

Ar' is an aryl group or a heterocyclic group; and

R is a hydrogen atom or an unsubstituted or substituted alkyl group;

(II)

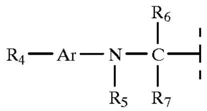

wherein:

Ar is an aryl group or a heterocyclic group;

$R_4$ is a substituent having a Hammett sigma value of −1 to +1;

$R_5$ is R or Ar';

$R_6$ is R or Ar';

$R_7$ is R or Ar';

$R_5$ and Ar can be linked to form 5- to 8- membered ring;

$R_6$ and Ar can be linked to form 5- to 8- membered ring, in which case $R_6$ can comprise a hetero atom;

$R_5$ and $R_6$ can be linked to form 5- to 8- membered ring;

$R_6$ and $R_7$ can be linked to form 5- to 8- membered ring;

Ar' is an aryl group or a heterocyclic group; and

R is a hydrogen atom or an unsubstituted or substituted alkyl group;

(III)

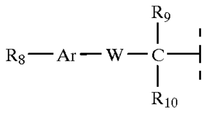

wherein:

W is O, S or Se;

Ar is an aryl group or a heterocyclic group;

$R_8$ is R, carboxyl, $NR_2$, $(OR)_n$, or $(SR)_n$;

n is 1–3

$R_9$ and $R_{10}$ are independently R or Ar';

$R_9$ and Ar can be linked to form 5- to 8- membered ring;

Ar' is an aryl group or a heterocyclic group; and

R is a hydrogen atom or an unsubstituted or substituted alkyl group; and (IV)

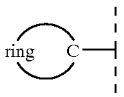

wherein "ring" represents a substituted or unsubstituted 5-, 6- or 7-membered unsaturated ring.

20. A photographic element according to claim 19, wherein Y is $COO^-$, $Si(R')_3$ or X'.

21. A photographic element according to claim 20, wherein Y is $COO^-$ or $Si(R')_3$.

22. A photographic element according to claim 1 or claim 2, wherein $Z-(L-XY)_k$ is a compound of the formula:

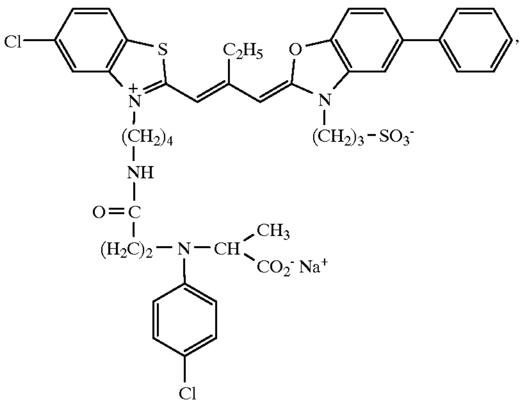
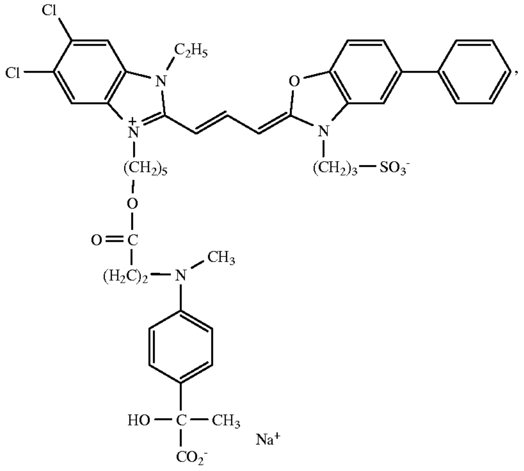
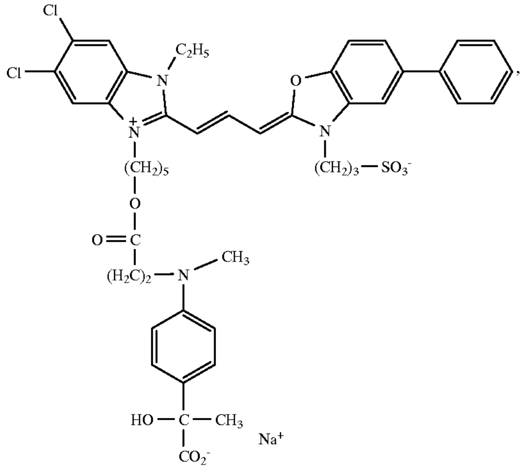
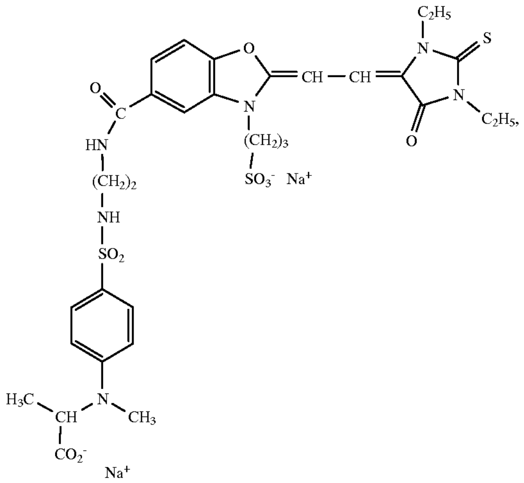
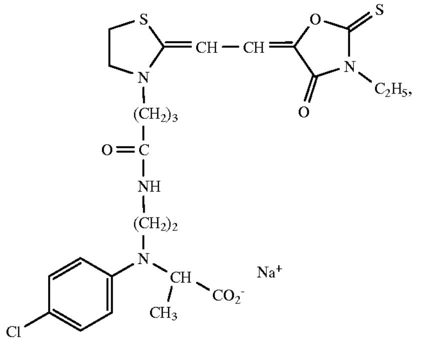
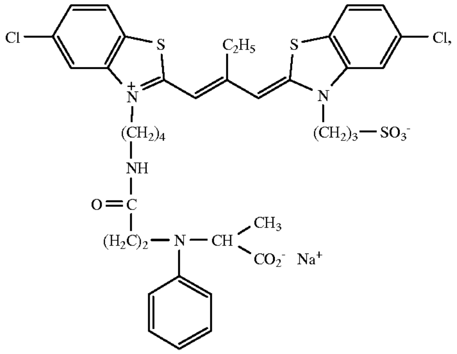

-continued
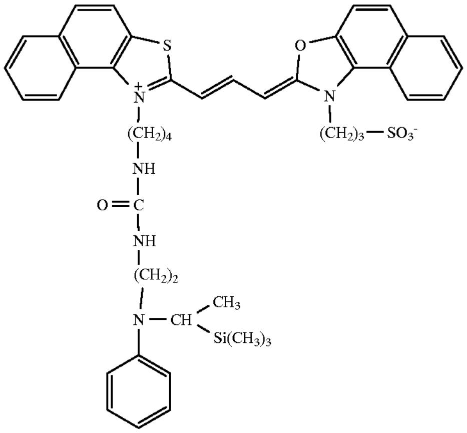
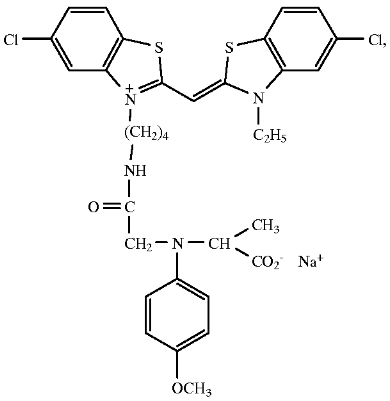
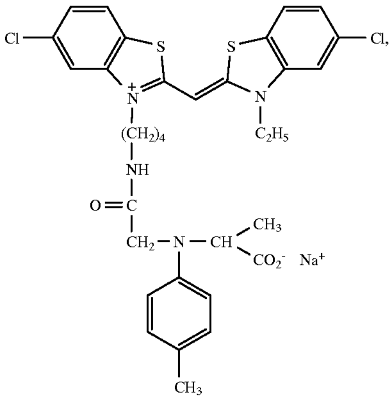
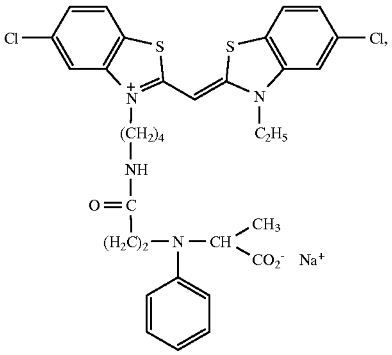
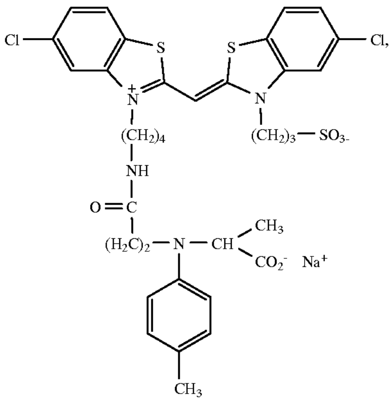
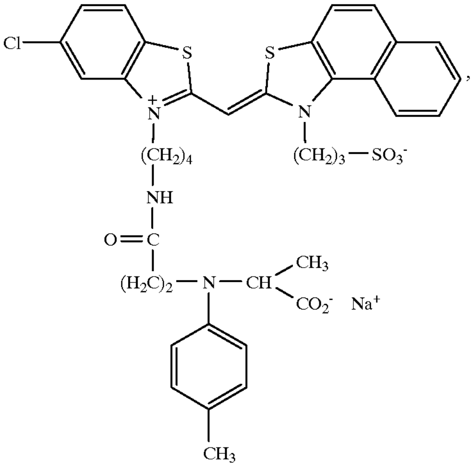

-continued
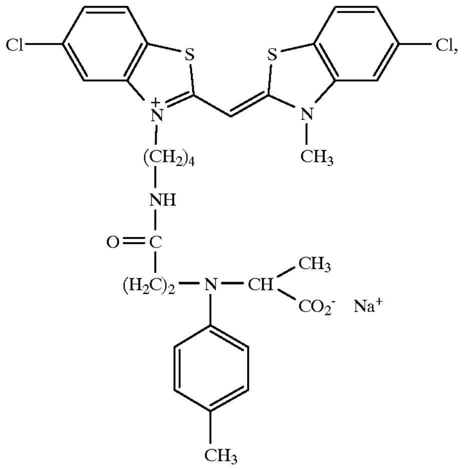
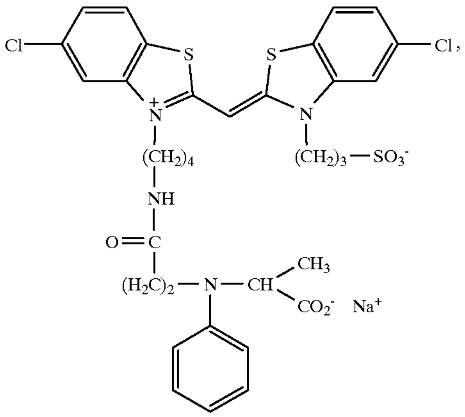
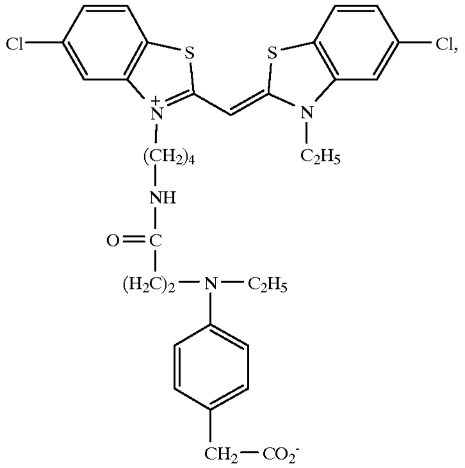
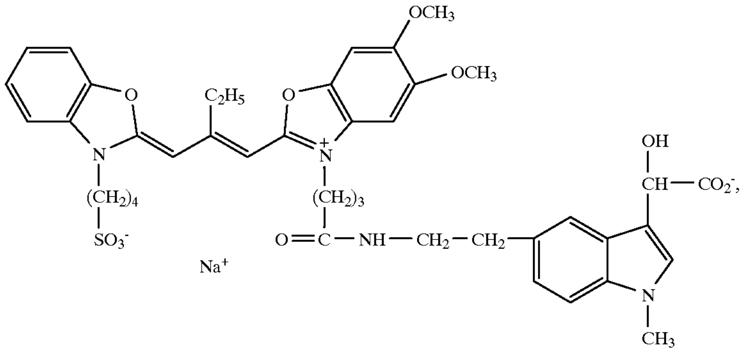

-continued
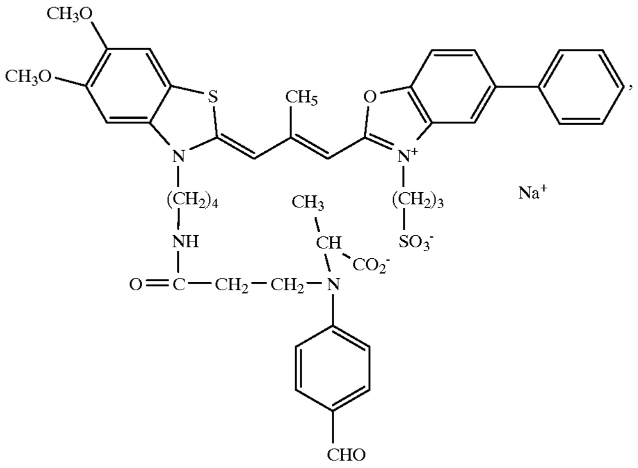
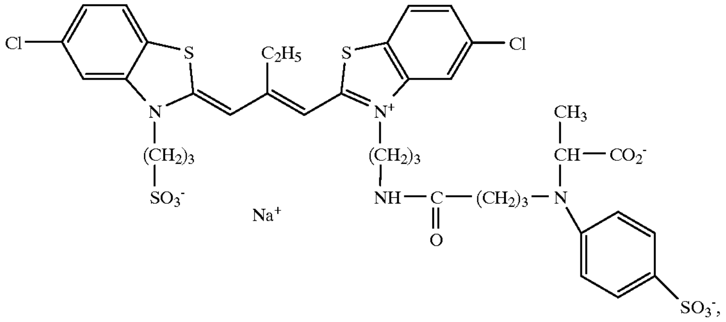
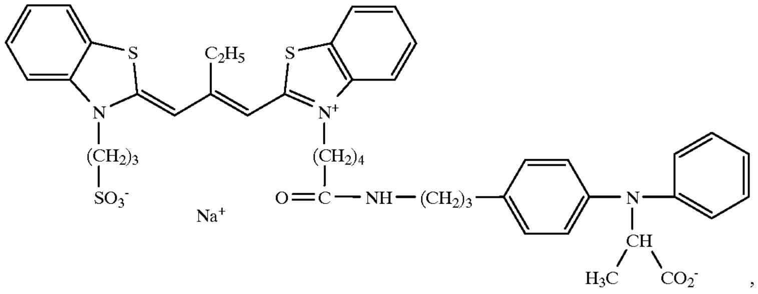
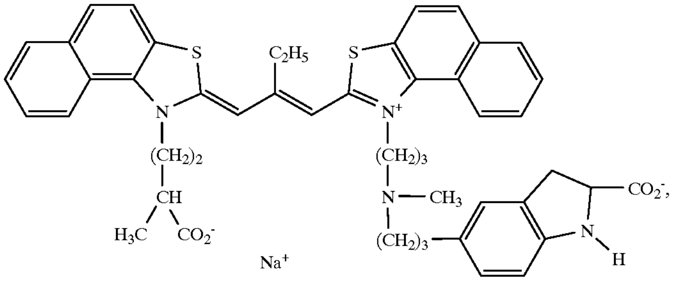

-continued
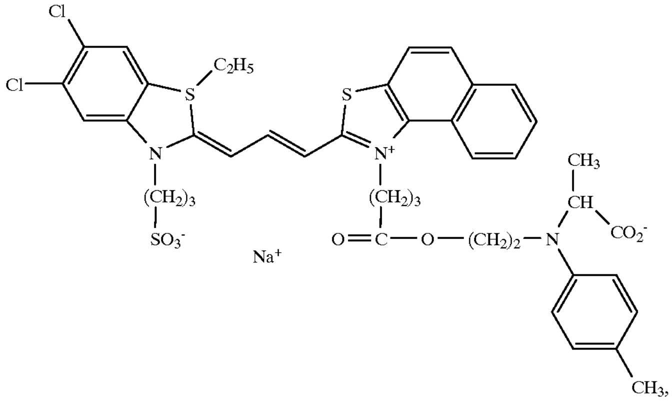
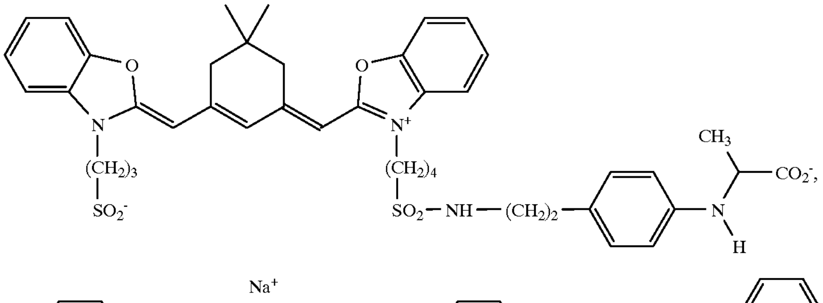
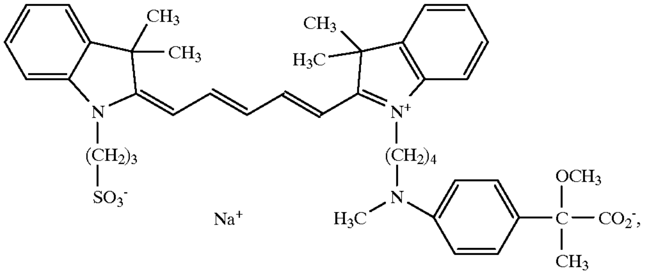
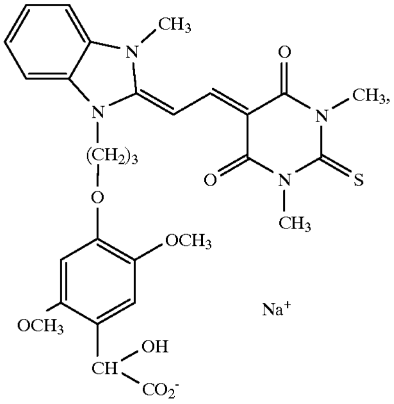
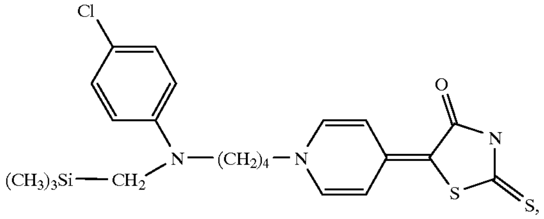
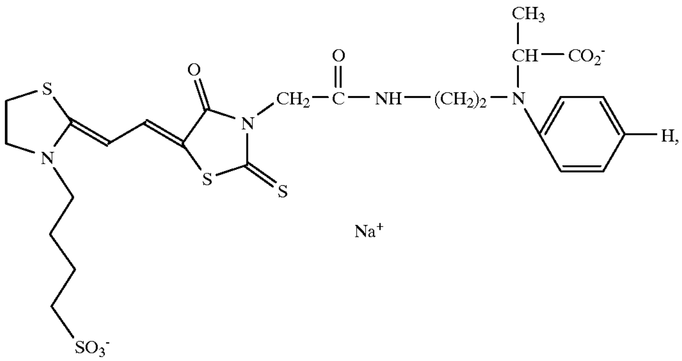

-continued
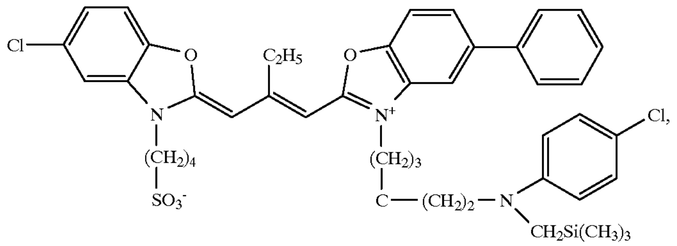
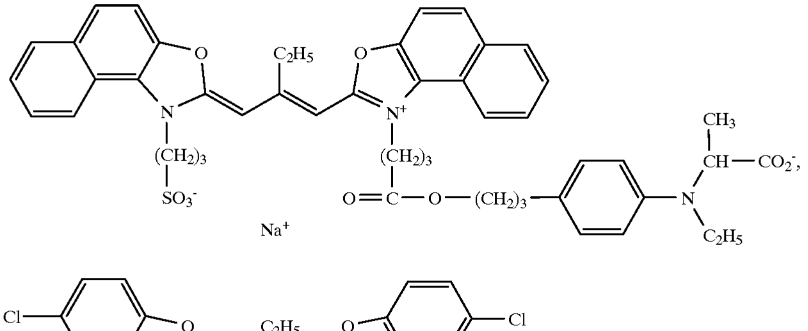
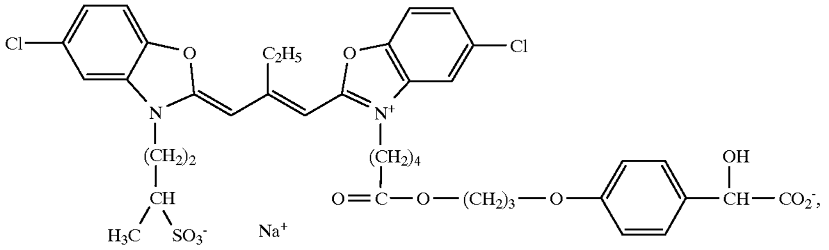
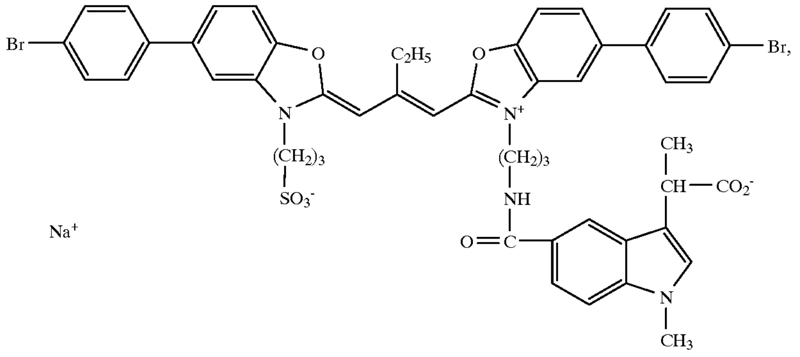
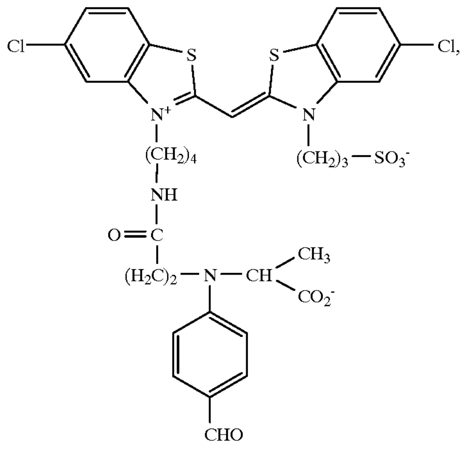
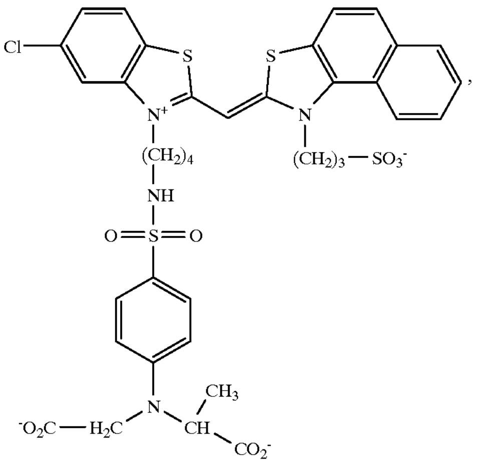

-continued
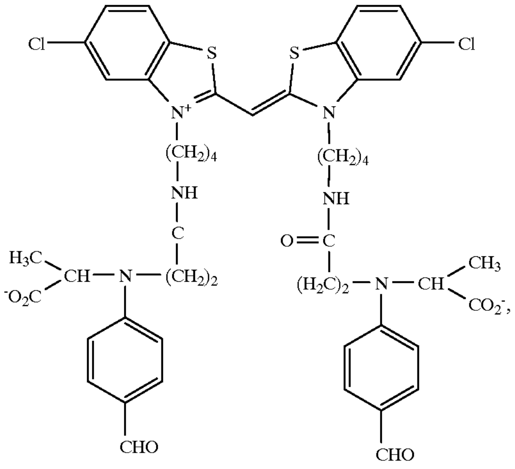
,
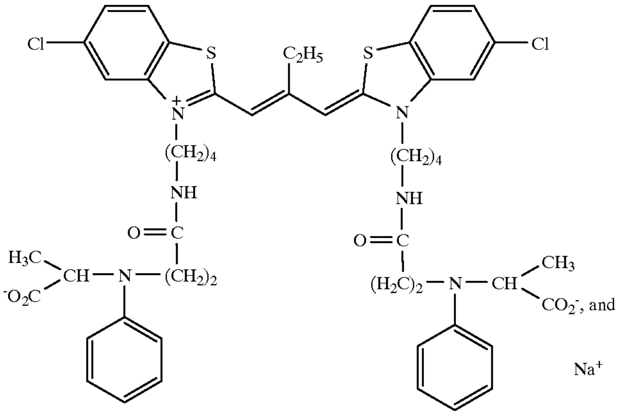
and
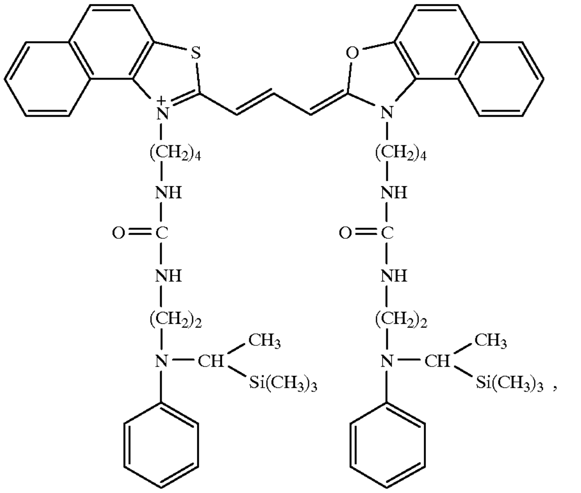
,
23. A photographic element according to claim 22 wherein Z-(L-XY)$_k$ is a compound of the formula:
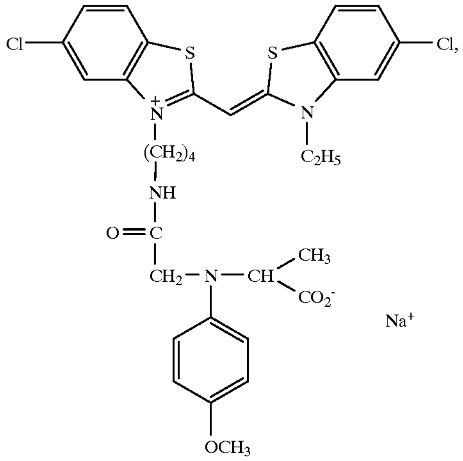
,
-continued
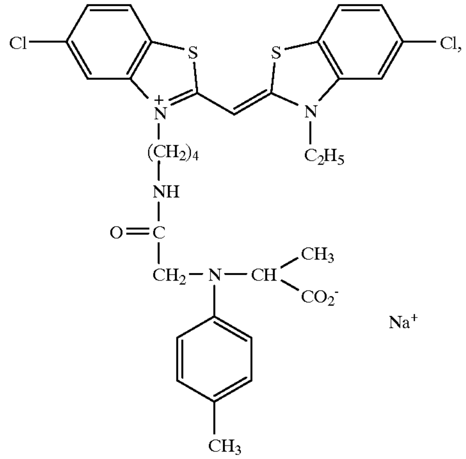
, -continued
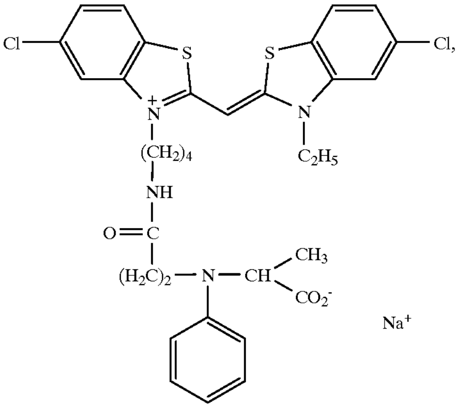
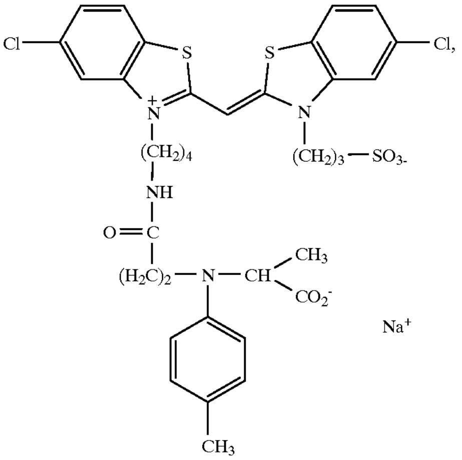
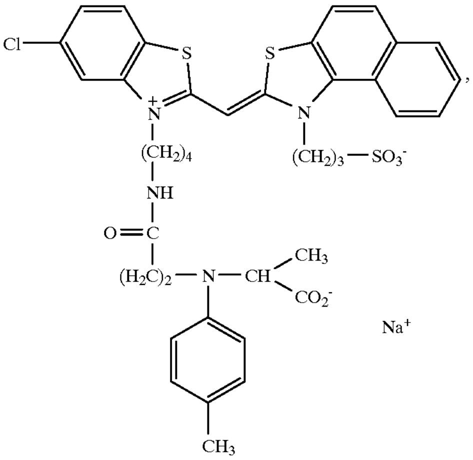
-continued
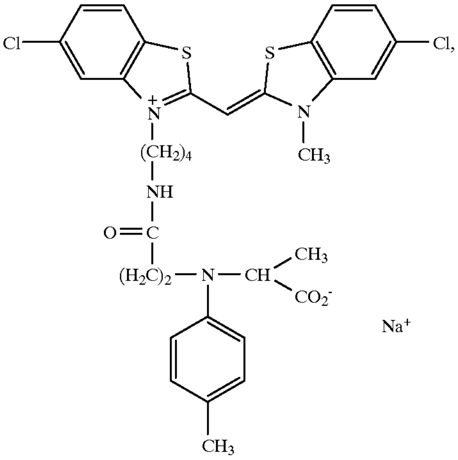
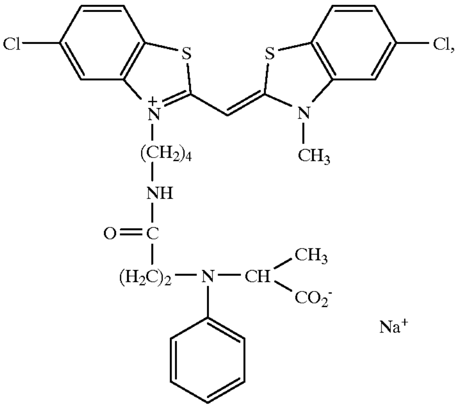
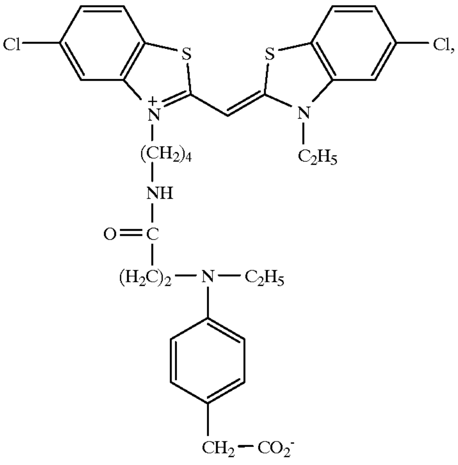

-continued

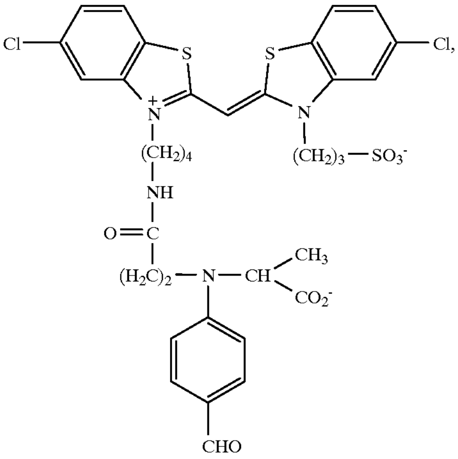

and

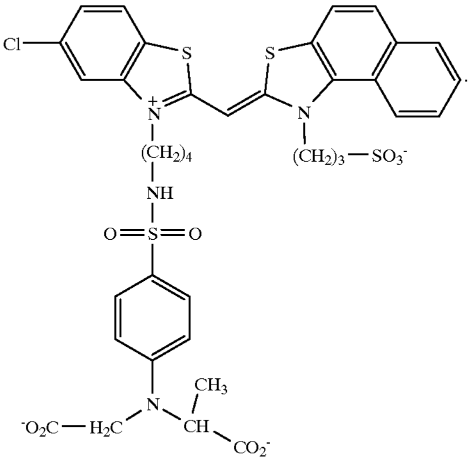

24. A photographic element according to claim 1 or claim 2, wherein the emulsion layer further contains a sensitizing dye.

25. A photographic element according to claim 24 wherein the sensitizing dye is selected from the group consisting of cyanine dyes, complex cyanine dyes, merocyanine dyes, complex merocyanine dyes, styryl dyes, oxonol dyes, hemioxonol dyes and hemicyanine dyes.

26. A photographic element according to claim 1 or claim 2, comprising a plurality of layers wherein one or more of the layers of the element contains a hydroxybenzene compound.

27. A photographic element according to claim 26, wherein the hydroxybenzene compound has the formula:

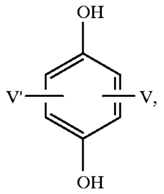

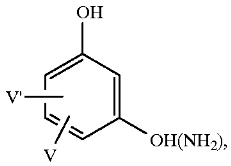

and

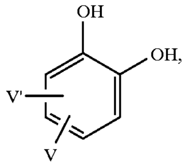

wherein V and V' each independently represent —H, —OH, a halogen atom, —OM (where M is alkali metal ion), an alkyl group, a phenyl group, an amino group, a carbonyl group, a sulfone group, a sulfonated phenyl group, a sulfonated alkyl group, a sulfonated amino group, a carboxyphenyl group, a carboxyalkyl group, a carboxyamino group, a hydroxyphenyl group, a hydroxyalkyl group, an alkylether group, an alkylphenyl group, an alkylthioether group, or a phenylthioether group.

28. A photographic element according to claim 1 or claim 2, wherein the fragmentable electron donor compound Z-(L-XY)$_k$ is added to the emulsion layer after exposure.

* * * * *